US008223377B2

(12) United States Patent
Shah

(10) Patent No.: US 8,223,377 B2
(45) Date of Patent: *Jul. 17, 2012

(54) PRINT WORKFLOW AUTOMATION

(76) Inventor: Pradip K. Shah, North Wales, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/952,247

(22) Filed: Nov. 23, 2010

(65) Prior Publication Data

US 2011/0063677 A1 Mar. 17, 2011

Related U.S. Application Data

(63) Continuation of application No. 11/654,161, filed on Jan. 16, 2007, now Pat. No. 7,855,799.

(51) Int. Cl.
*G06F 15/00* (2006.01)
*B65H 1/00* (2006.01)

(52) U.S. Cl. ...................................... 358/1.15; 271/171

(58) Field of Classification Search ................. 358/1.15
See application file for complete search history.

(56) References Cited

U.S. PATENT DOCUMENTS

| | | | |
|---|---|---|---|
| 4,970,554 | A | 11/1990 | Rourke |
| 4,982,234 | A | 1/1991 | Fillion et al. |
| 5,119,206 | A | 6/1992 | Rourke et al. |
| 5,133,048 | A | 7/1992 | Parsons et al. |
| 5,448,691 | A | 9/1995 | Motoyama |
| 5,467,434 | A | 11/1995 | Hower, Jr. et al. |
| 5,475,801 | A | 12/1995 | Brindle et al. |
| 5,481,353 | A | 1/1996 | Hicks et al. |
| 5,483,653 | A | 1/1996 | Furman |
| 5,524,085 | A | 6/1996 | Bellucco et al. |
| 5,718,520 | A | 2/1998 | MacKay |
| 5,774,661 | A | 6/1998 | Chatterjee et al. |
| 6,057,930 | A | 5/2000 | Blossey et al. |
| 6,100,994 | A | 8/2000 | Schliekelmann et al. |
| 6,173,295 | B1 | 1/2001 | Goertz et al. |
| 6,224,048 | B1 | 5/2001 | Motamed |

(Continued)

FOREIGN PATENT DOCUMENTS

WO WO 02/084582 A3 10/2002

(Continued)

OTHER PUBLICATIONS

B2BeDocuments™ SmartPDFPrintware™, PDF Printing and Finishing Workflow Automation Solution, SmartPDFPrintware™ Implements End-to-End Automated Document Factory, Revision Nov. 7, 2006, 20 pages.

(Continued)

*Primary Examiner* — Saeid Ebrahimi Dehkordy
(74) *Attorney, Agent, or Firm* — Woodcock Washburn LLP

(57) ABSTRACT

Illustrative systems and methods provide a graphical user interface for establishing parameters for printing and finishing print jobs. In an illustrative system and method, print job parameters are defined, for example: by establishing print parameters corresponding to the position of a document in a print job and/or the position of a page in document; by establishing associations between values of fields in file names and print parameters; and by establishing associations between text at a particular position on a page of a document and print parameters. The user's inputs defining the printing and finishing parameters are stored in a file such as, for example, an XML file. The system retrieves the printing and finishing parameters and formats PDL and JCL commands which can be forwarded onto the printing and finishing system.

68 Claims, 98 Drawing Sheets

U.S. PATENT DOCUMENTS

| | | | | |
|---|---|---|---|---|
| 6,271,926 | B1 | 8/2001 | Jacobs | |
| 6,304,732 | B1 | 10/2001 | Myers et al. | |
| 6,335,795 | B1 | 1/2002 | Neuhard et al. | |
| 6,411,314 | B1 | 6/2002 | Hansen et al. | |
| 6,462,756 | B1 | 10/2002 | Hansen et al. | |
| 6,476,938 | B1 | 11/2002 | Soga | |
| 6,509,974 | B1 | 1/2003 | Hansen | |
| 6,519,053 | B1 | 2/2003 | Motamed et al. | |
| 6,549,294 | B2 | 4/2003 | Vidyanand | |
| 6,650,433 | B1 | 11/2003 | Keane et al. | |
| 6,684,260 | B1 | 1/2004 | Foster et al. | |
| 6,744,527 | B1 | 6/2004 | Dorsey et al. | |
| 6,833,925 | B1 | 12/2004 | Igoe et al. | |
| 6,898,604 | B1 | 5/2005 | Ballinger et al. | |
| 6,917,437 | B1 | 7/2005 | Myers et al. | |
| 6,948,115 | B2 | 9/2005 | Aizikowitz et al. | |
| 6,962,449 | B2 | 11/2005 | Lermant et al. | |
| 6,965,445 | B2 | 11/2005 | Dimperio et al. | |
| 6,974,269 | B2 | 12/2005 | Lermant et al. | |
| 7,027,175 | B2 | 4/2006 | Robertson | |
| 7,031,004 | B1 | 4/2006 | Hayward et al. | |
| 7,036,073 | B2 | 4/2006 | Jones et al. | |
| 7,046,385 | B2 | 5/2006 | Mori et al. | |
| 7,058,656 | B2 | 6/2006 | Winiger et al. | |
| 7,092,963 | B2 | 8/2006 | Ryan et al. | |
| 7,097,369 | B2 | 8/2006 | Barry et al. | |
| 7,099,815 | B2 | 8/2006 | Christodoulou et al. | |
| 7,145,670 | B2 | 12/2006 | Keane et al. | |
| 7,855,799 | B2 * | 12/2010 | Shah | 358/1.15 |
| 2001/0027419 | A1 | 10/2001 | Sands | |
| 2001/0047369 | A1 | 11/2001 | Aizikowitz et al. | |
| 2002/0042798 | A1 | 4/2002 | Takei et al. | |
| 2002/0067498 | A1 | 6/2002 | Chapman | |
| 2002/0078012 | A1 | 6/2002 | Ryan et al. | |
| 2002/0114004 | A1 | 8/2002 | Ferlitsch | |
| 2003/0140315 | A1 | 7/2003 | Blumberg et al. | |
| 2004/0107855 | A1 | 6/2004 | Kizaki et al. | |
| 2004/0193465 | A1 | 9/2004 | Sangroniz et al. | |
| 2004/0210818 | A1 | 10/2004 | Jones et al. | |
| 2005/0034030 | A1 | 2/2005 | Wiechers | |
| 2005/0050466 | A1 | 3/2005 | Sangroniz et al. | |
| 2005/0102265 | A1 | 5/2005 | Jones et al. | |
| 2005/0108198 | A1 | 5/2005 | Jones et al. | |
| 2005/0108278 | A1 | 5/2005 | Jones et al. | |
| 2005/0152000 | A1 | 7/2005 | Van de Capelle et al. | |
| 2005/0210227 | A1 | 9/2005 | Emerson et al. | |
| 2005/0262134 | A1 | 11/2005 | Sedky et al. | |
| 2005/0268221 | A1 | 12/2005 | Shur et al. | |
| 2005/0273701 | A1 | 12/2005 | Emerson et al. | |
| 2005/0273704 | A1 | 12/2005 | Dunietz et al. | |
| 2005/0278614 | A1 | 12/2005 | Aizikowitz et al. | |
| 2006/0012817 | A1 | 1/2006 | Wu | |
| 2006/0029414 | A1 | 2/2006 | Wong | |
| 2006/0031758 | A1 | 2/2006 | Shur et al. | |
| 2006/0044597 | A1 | 3/2006 | Dumitrescu et al. | |
| 2006/0080616 | A1 | 4/2006 | Vogel et al. | |
| 2006/0092467 | A1 | 5/2006 | Dumitrescu et al. | |
| 2006/0103869 | A1 | 5/2006 | Kato | |
| 2006/0136816 | A1 | 6/2006 | Jones et al. | |
| 2006/0146353 | A1 | 7/2006 | Yue et al. | |
| 2006/0193006 | A1 | 8/2006 | Lawrence et al. | |
| 2006/0203257 | A1 | 9/2006 | McLuckie et al. | |
| 2006/0224606 | A1 | 10/2006 | Sedky et al. | |
| 2007/0091331 | A1 * | 4/2007 | Ohashi | 358/1.2 |
| 2008/0276251 | A1 | 11/2008 | Morales et al. | |

FOREIGN PATENT DOCUMENTS

| | | |
|---|---|---|
| WO | WO 2008/088702 | 7/2008 |

OTHER PUBLICATIONS

B2BeDocuments™ Products, SmartPDFPrintware™ for Xerox, http://www.b2bedocurnents.com/html/products.html, Nov. 8, 2006, 2 pages.

Great Britain Application No. 0911304.4: Examination Report dated Aug. 4, 2011, 3 pages.

Great Britain Application No. 0911304.4: Examination Report dated Mar. 29, 2011, 2 pages.

Great Britain Application No. 0911304.4: Examination Report dated Sep. 30, 2010, 4 pages.

Materials Submitted to Registrar of Copyrights, Copyright Office, Registration # TXU-1-265-282, Oct. 17, 2005, 46 pages.

Materials Submitted to Registrar of Copyrights, Copyright Office, Registration # TXU-1-279-318, Jan. 23, 2006, 45 pages.

* cited by examiner

912

912

912

912

1512

1510

1512

1512

1512

1518

1512

PRINT WORKFLOW AUTOMATION

CROSS-REFERENCE TO RELATED APPLICATIONS

The present application claims priority to and is a continuation of U.S. Non-provisional patent application Ser. No. 11/654,161 filed on Jan. 16, 2007, the contents of which are hereby incorporated by reference in their entirety.

TECHNICAL FIELD

The disclosed systems and methods relate to automated printing and finishing of electronic documents.

BACKGROUND

In printing and finishing systems, such as those from Xerox, Canon, HP, Kodak, Kyocera Mita, and others, the content of a page that is to be printed is typically defined using a Page Description Language (PDL). There are several PDL's currently in use. For example, Postscript, Printer Control Language (PCL) by Hewlett Packard, Variable-data Intelligent Postscript Printware (VIPP) defined by Xerox, Microsoft's XML Paper Specification Document (XPS), and Adobe Acrobat PDF are all PDL's used in a variety of document composition systems to define the content of electronic pages.

Generally, a print job may contain one or more electronic documents and each electronic document may comprise one or more electronic pages. While PDL instructions are used to define the contents of a particular page, instructions written in a Job Control Language (JCL) define other printing and finishing parameters associated with a print job. For example, JCL instructions may define the size and source of the paper on which to print, how and where a document is to be bound, the number of copies to be printed, etc. Job control languages that are currently in use include, for example, Printer Job Language (PJL) from Hewlett Packard, Xerox Printing Instruction Format (XPIFF), and Microsoft "Print Tickets."

A print job that is transmitted to a printing and finishing system will typically comprise PDL commands to define what is to be printed and JCL commands to define how it is to be printed. The JCL instructions are typically sent first, followed by the PDL instructions. There are several exemplary PDL/JCL combinations that are used by present day printing and finishing systems. For example, Hewlett Packard printing equipment uses a PCL and PJL combination. Xerox printing and finishing equipment is designed to receive Xerox's VIPP and XPIFF. Some printing and finishing equipment is adapted to receive Postscript including the "setpagedevice" and "procset" commands. Adobe Acrobat PDF is often used as a PDL along with device-dependent JCL's such as, for example, Adobe Job Definition Format (JDF) and XPIFF. Microsoft has recently introduced a printing language combination Microsoft XPS with "Print Tickets."

The advance of computer technology and the wide accessibility of document authoring software have allowed individuals and corporations to create complex electronic documents that are diverse in their composition and makeup. The ease with which documents can now be created has increased the expectations for printing and finishing. For example, it is frequently requested that documents, or specific subsets of pages in a document, be printed on a particular size and color paper and/or be folded, punched, and/or stapled in a particular manner. Printing and assembling documents in these specialized fashions traditionally has been accomplished manually.

For large corporations, printing and finishing of documents is often performed by an in-house Print Service Provider (PSP). Individuals and small corporations typically use public PSPs for printing documents. Both in-house and public PSPs generally prefer to automate the printing function as much as possible and thereby avoid the expense and potential error introduced by manually collating and finishing documents.

A few off-the-shelf print workflow software packages such as, for example, EFI Compose, Xerox FreeFlow Process Manager, and Xerox FreeFlow MakeReady, provide for load balancing of jobs between printing systems. However, these packages and others like them offer only very limited automation of printing and finishing tasks.

An option for automating the printing and finishing of print jobs is to create custom print application programs for each unique print job. A custom printing and finishing program can process PDL files and output a print data stream with finishing JCL commands that can be consumed directly by most production printing systems.

A downside to preparing custom programs is that a program needs to be prepared for each unique print job. Further, there are very few individuals that have the programming skills necessary to write custom programs for printing and finishing. Accordingly, having a custom program written is often too expensive and time consuming to be practicable.

Moreover, custom programs are typically written for a specific printing system and can quickly become obsolete if the target printing system is upgraded. Invariably, when new printing equipment is installed, the newer replacement printing and finishing system has upgraded software that is incompatible with that used by the older printing system. Custom programs written for the older system likely will not process correctly in the replacement printing and finishing system.

Therefore, due to the expense and limited useful lifetime of custom programs, printing and finishing print jobs is often not accomplished automatically. Rather, the most practicable alternative in many instances is to print and finish jobs using manual labor.

SUMMARY

Applicants disclose illustrative systems and methods for automated printing and finishing of electronic documents.

An illustrative system comprises a computerized application that is adapted to be communicatively coupled to printing and finishing equipment and operable to communicate instructions (PDL/JCL) to that equipment. The system comprises a program adapted to provide a graphical user interface with which users may define printing and finishing rules, i.e. parameters, for print jobs. The system allows users to create and implement print job workflows. The printing and finishing rules established by the user, i.e. the workflows, are stored for later retrieval. In an illustrative embodiment, the user-identified rules are stored in an XML file in an electronic folder along with the electronic document files that are to be printed as part of the print job. The documents that are to be printed may be formatted in any one of numerous different file types including, for example, Adobe Acrobat PDF and Microsoft Windows XPS. An illustrative system employs the user-defined rules and the electronic document files to create instructions (PDL/JCL) for printing and finishing the print job. These instructions are transmitted to the printing equipment which performs the physical printing and finishing.

The illustrative systems and methods provide a mechanism to capture and save the rules/parameters of the user in connection with printing and finishing of a print job. In other words, the system provides an automated method for a user to define a print job workflow. The saved parameters may be updated to address changes in the user preferences or to address an unforeseen document property or finishing attribute. Further, the user's intents with respect to the print job can be viewed as independent of any particular printing and finishing system. Thus, it is possible to quickly and easily print and finish a previously defined print job on a new and different print system.

In an illustrative embodiment of the system, print job parameters, i.e. rules, may be defined, for example: by establishing print parameters corresponding to the position of a document in a print job and/or the position of a page in document (i.e., "the position" method or mode); by establishing associations between values of fields in file names and print parameters (i.e., the "file name" method or mode); by establishing associations between text at a particular position on a page of a document and print parameters (i.e., the "text-on-page" method). Upon receiving a user input selecting one of the modes, the system provides a graphical user interface for receiving the user's inputs that define the printing and finishing parameters. The user's inputs defining the printing and finishing parameters are stored in a file such as, for example, an XML file. The system retrieves the printing and finishing parameters and formats PDL and JCL commands which can be forwarded onto the printing and finishing system.

An illustrative system is adapted to allow users to associate particular media types with specific page sizes in a print job. The system is programmed to identify a first page having a first size and a second page having a second size in a document that is to be printed. The illustrative system is further adapted to receive an input associating the first size and a first media, and to receive an input associating the second size and a second media. The system stores the association between the first size and the first media and the association between the second size and the second media in a file such as, for example, an XML file. The illustrative system is further adapted to create machine readable instructions for printing the electronic document. The instructions created by the system comprise instructions for printing pages of the electronic document having the first size on the first media and for printing pages of the electronic document having the second size on the second media. These instructions are transmitted to the printing and finishing equipment which uses the instructions to print and assemble the document.

According to another aspect of an illustrative embodiment, the system is adapted to allow users to define printing rules or parameters for particular subsets of pages in a document. The system is programmed to identify a plurality of pages comprised in an electronic document. The system is also programmed to receive a first input identifying a first subset of the plurality of pages, and to receive a second input identifying a printing option to be performed on the first subset of the plurality of pages. The system stores the information identifying the printing option to be performed on the first subset of the plurality of pages and creates machine readable instructions for printing the electronic document using the information. The instructions created by the system comprise instructions for implementing the selected printing option in connection with the first subset of the plurality of pages.

According to another aspect of an illustrative embodiment of the disclosed systems and methods, the system is adapted to provide a user interface with which users may associate printing rules with the values of fields contained in the names of files that are to be printed. The illustrative system is adapted to identify a plurality of electronic files, where each electronic file has a unique file name comprising a plurality of fields, and each field comprises at least one alpha-numeric character that is separated from an adjacent field by a field separation character. The illustrative system is adapted to display the file name for each of the plurality of electronic files and receive an input identifying the character separator employed to delineate between the fields in each of the file names of the plurality of electronic files. The system is further adapted, for each of the plurality of electronic files, to parse the file name to identify each of the plurality of fields, identify the at least one alpha-numeric character comprised in each of the plurality of fields, and display the at least one alpha-numeric character comprised in each field. The illustrative system will receive an input identifying a first printing parameter to be controlled by the value of the at least one alpha-numeric character comprised in a first field of each file name, and receive an input identifying a second printing parameter to be controlled by the value of the at least one alpha-numeric character assigned to a second field. The illustrative system then generates instructions for printing the plurality of files. For each of the plurality of files, the value of the at least one alpha-numeric character in a first field is used to determine instructions relating to the first printing parameter, and the value of the at least one alpha-numeric character in a second field is used to determine instructions relating to the second printing parameter.

According to still another aspect of the illustrative embodiments of the disclosed systems and methods, the system is adapted to associate printing rules with text appearing at particular locations on a page. An illustrative system is adapted to receive an electronic file comprising a plurality of electronic documents and display the electronic file. The illustrative system is adapted to receive a first input identifying a first text item located in a first area of a first page in the file, and to receive a second input identifying the first text item as a first document delineator. The system stores the first text item and the identification of the first text item as a first document delineator. A third input identifying a second text item that is located in a second area of the page is received along with a fourth input identifying the second text item as a second document delineator. The second text item and the identification of the second text item as a second document delineator are stored. The illustrative system is adapted to identify the first page as the beginning of a first document. The system is further adapted to identify the first text item located in the first area of a second page in the electronic file and confirm the existence of the second text item in the second area of the second page. The system identifies the second page in the electronic file as the beginning of a second document.

Other features of illustrative embodiments are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

In the drawings.

DETAILED DESCRIPTION OF ILLUSTRATIVE EMBODIMENTS

Illustrative embodiments of systems and methods for automated printing and finishing of electronic documents are described below with reference to FIGS. 1-19. It will be appreciated by those of ordinary skill in the art that the description given herein with respect to those figures is for exemplary purposes only and is not intended in any way to limit the scope of the potential embodiments. All questions regarding the scope of potential embodiments may be resolved by referring to the appended claims.

Figure 1:
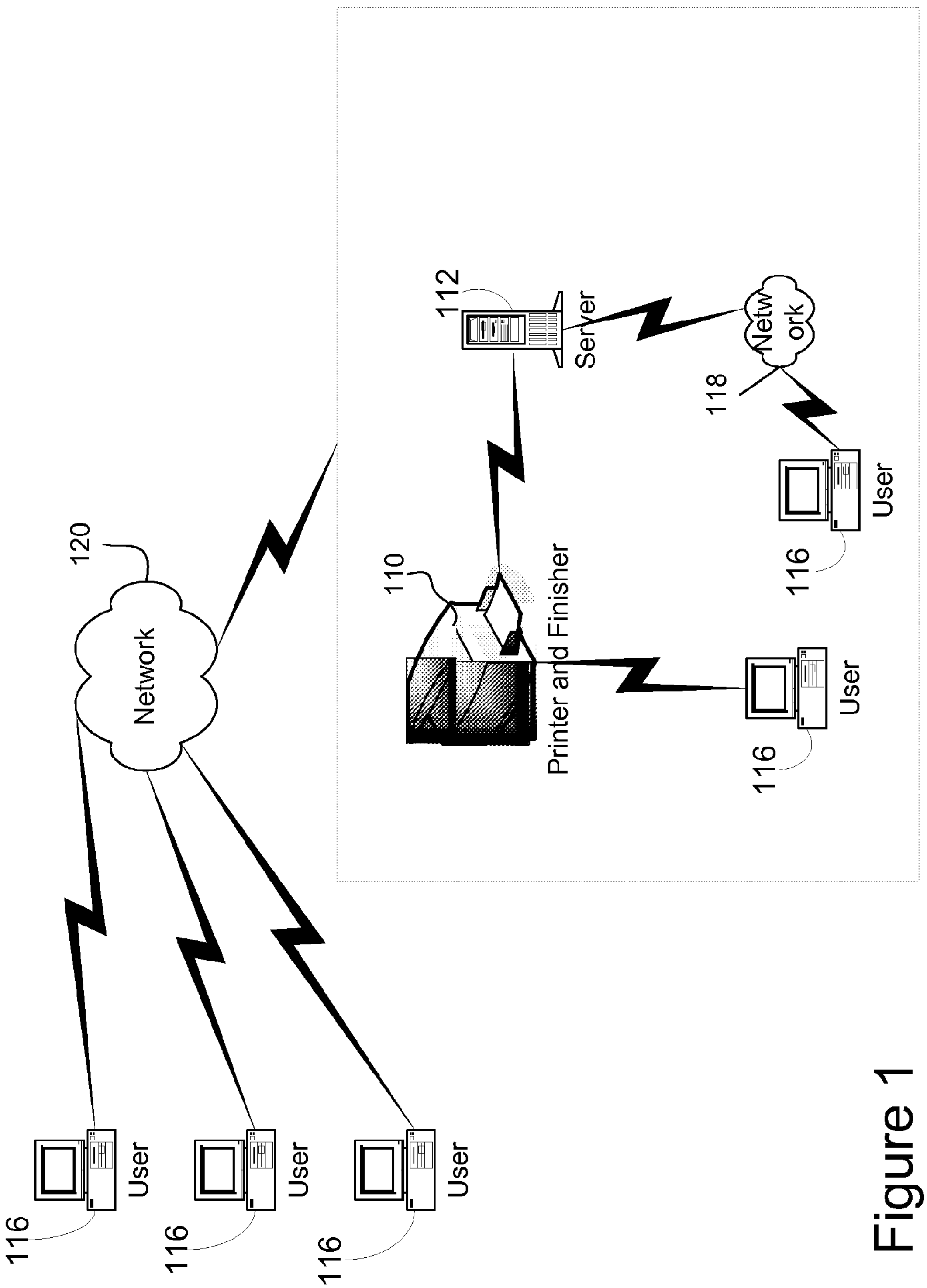
FIG. 1 is a high level diagram of a network for establishing print parameters and printing print jobs.

FIG. 1 is a high level diagram of an illustrative system for automated document printing and finishing. Printing and finishing system 110 is operable to print and finish documents in response to instructions and may be, for example, any of the type of modern printing systems offered by companies such as Xerox, HP, etc. Those skilled in the art appreciate that while system 110 is depicted in FIG. 1 as monolithic device, it may in fact comprise numerous components. In an illustrative embodiment, printing and finishing system 110 is adapted to receive page definitions defined using a PDL and document formatting in a JCL.

System 110 is communicatively coupled to server 112. Server 112 comprises computing hardware and related software for forwarding instructions for printing of documents to system 110. Server 112 may be configured with communications software to allow for communications with user systems 116 via a local area network or the Internet. Those skilled in the art appreciate that server 112 may comprise a plurality of physical machines.

User systems 116 may be used to create instructions (both PDL and JCL) for printing and finishing print jobs, and forwarding those instructions for printing. User systems 116 may be personal computers, hand-held computing systems, or even wireless phones. Systems 116 comprise application software that provides a graphical user interface for defining rules/parameters for printing and finishing print jobs. In an alternative embodiment, the application for collecting user printing parameters may be a client-server application with the server residing at server 110. Systems 116 are operable to communicate over networks including, for example, local network 118 and the Internet 120, to transmit information, including printing instructions, to server 112. Indeed, user systems 116 are configured to communicate with server 112 to define print jobs for automatic printing and finishing as described below. User systems 116 may also be coupled to communicate directly with printing system 110 without server 112.

Figure 2:
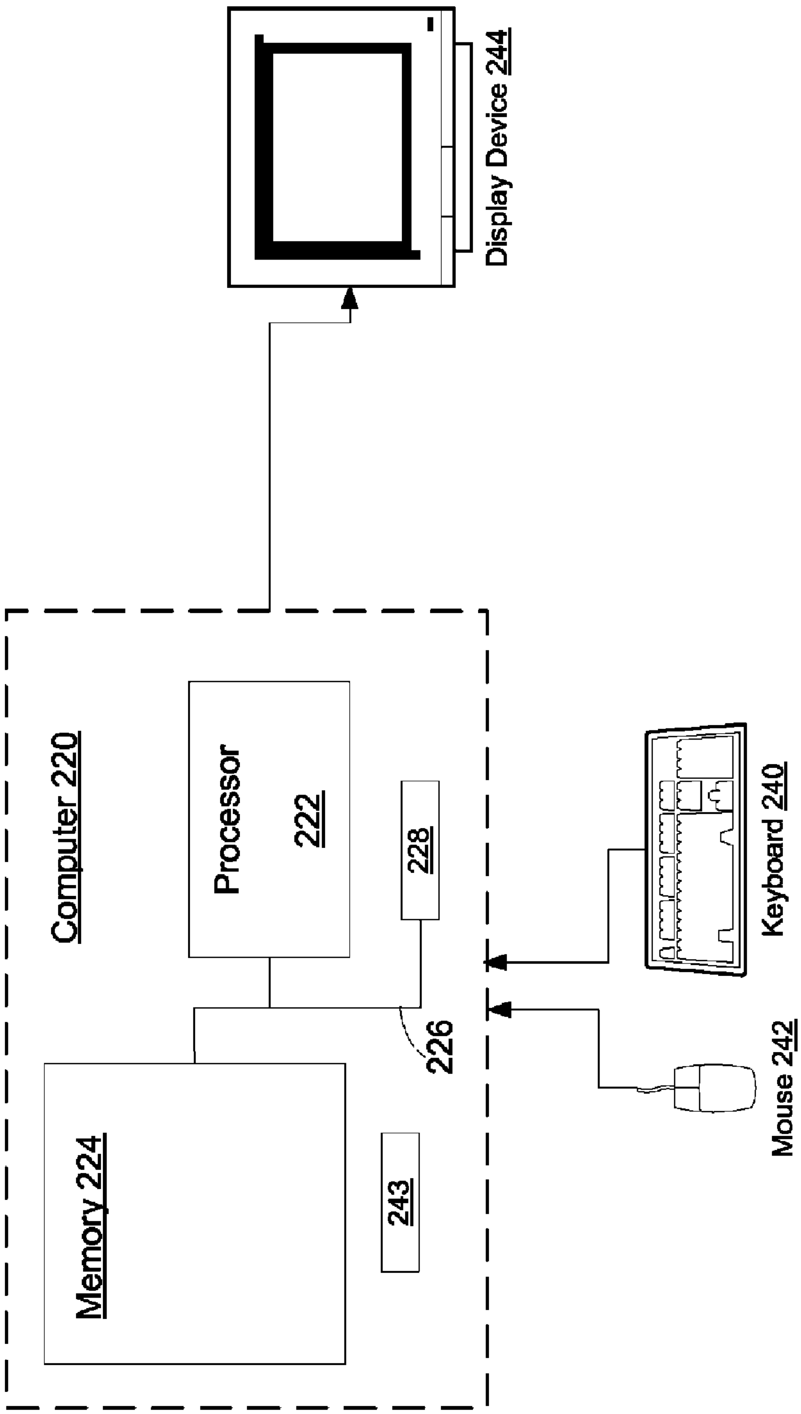
FIG. 2 is a diagram of a computing system for use in the disclosed embodiments.

Server 112 and user systems 116 may be generic computing systems. FIG. 2 is a block diagram of a computing system suitable for this use. As shown, computing device 220 includes processing unit 222, system memory 224, and system bus 226 that couples various system components including system memory 224 to the processing unit 222. The system memory 224 might include read only memory (ROM) and random access memory (RAM). The system might further include hard-drive 228, which provides storage for computer readable instructions, data structures, program modules and other data. A user may enter commands and information into the computer 220 through input devices such as a keyboard 240 and pointing device 242. A monitor 244 or other type of display device is also connected to the system for output. Communications device 243, which may be, for example, a modem or network interface card, provides for communications over networks 112 and 118. Processor 222 can be programmed with instructions to interact with other computing systems so as to perform the methods described below with reference to FIGS. 6 through 19. The instructions may be received from networks 112, 118 or stored in memory 224 and/or hard drive 228. Processor 222 may be loaded with any one of several computer operating systems such as, for example, Windows 2000, Windows 2003, Windows XP Professional, Windows Vista, Apple Mac OS or Linux.

Figure 3:
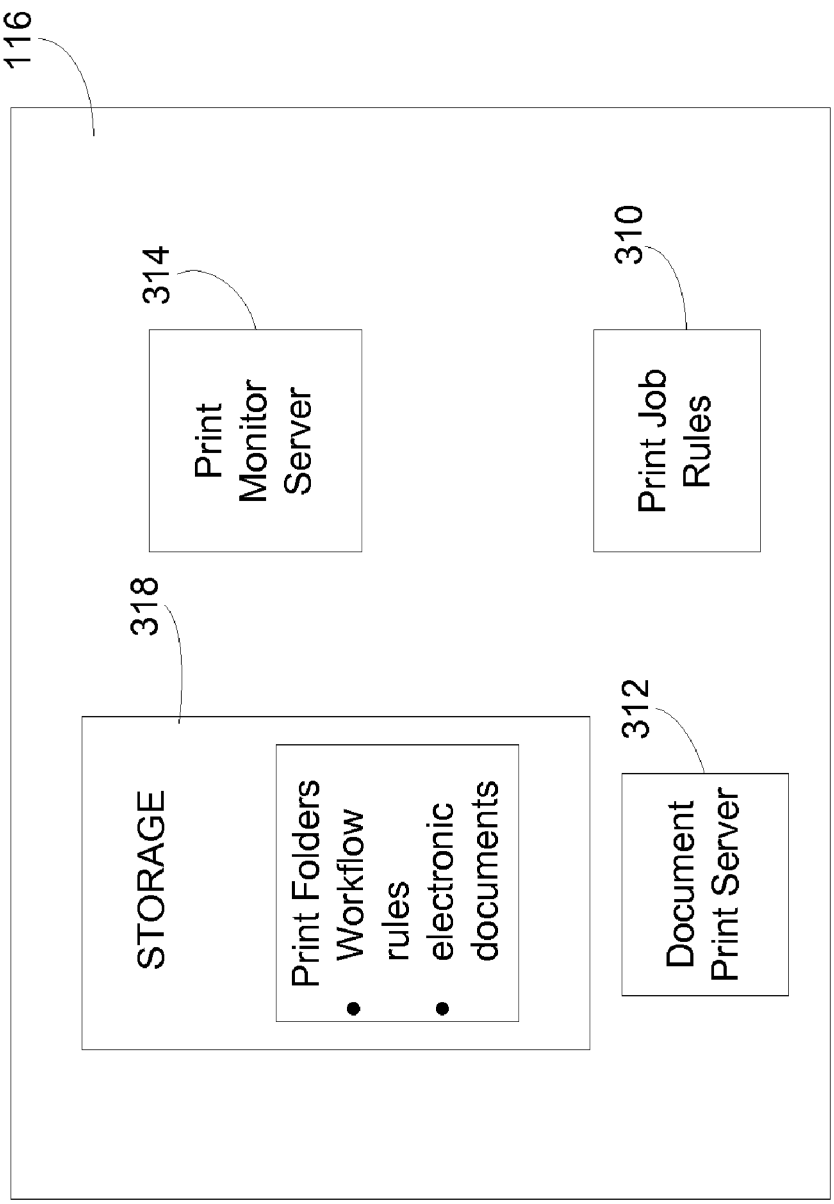
FIG. 3 is a block diagram depicting functional components of a software application.

FIG. 3 is a diagram of functional components of user systems 116. As shown, user systems 116 comprise print job rules application 310, document print server 312, print monitor server 314, and storage 318. Print job rules application 310 provides an interface for users to define the print parameters for print jobs and to save the user-defined parameters for use in printing and finishing of the print job. An exemplary interface adapted to receive user inputs defining printing and finishing rules is described below with reference to FIGS. 9 through 19.

Print monitor server 314 operates to automatically monitor print jobs that have been queued for production. As described in further detail below, in an illustrative embodiment, documents that are to be printed are generally stored in a print job work folder. Documents that a user wishes to have printed may arrive in a folder at intervals or across a period of time. Accordingly, as described below with reference to FIG. 9F, an illustrative embodiment will accept user inputs defining the particular hours, days, months, and/or intervals that a particular print job should be printed. According to a feature of the illustrative systems, the print monitor server 314 will monitor those user-defined printing instructions and initiate the printing of the documents at the specified time/date/interval.

Document print server 312 takes the print jobs that have been identified for printing, generates the PDL and JCL instructions, and transmits the instructions to the actual printing and finishing device.

Storage 318 operates as a memory to store information for use by the other components. For example, storage 318 may contain the print jobs, the related document files, and the user-defined printing parameters or rules for the jobs. In an illustrative embodiment, these materials may be stored in an electronic work folder that may be referred to as a "Hot Folder." The file in which the user-defined rules are stored may be referred to as the print job rules file.

It should be noted that user system 116 might comprise a single computing machine or a plurality of computing machines. Furthermore, print job rules application 310, document print server 312, and print monitor server 314 may be comprised in one or more software applications and further may be located on one or more computing systems.

Figure 4:
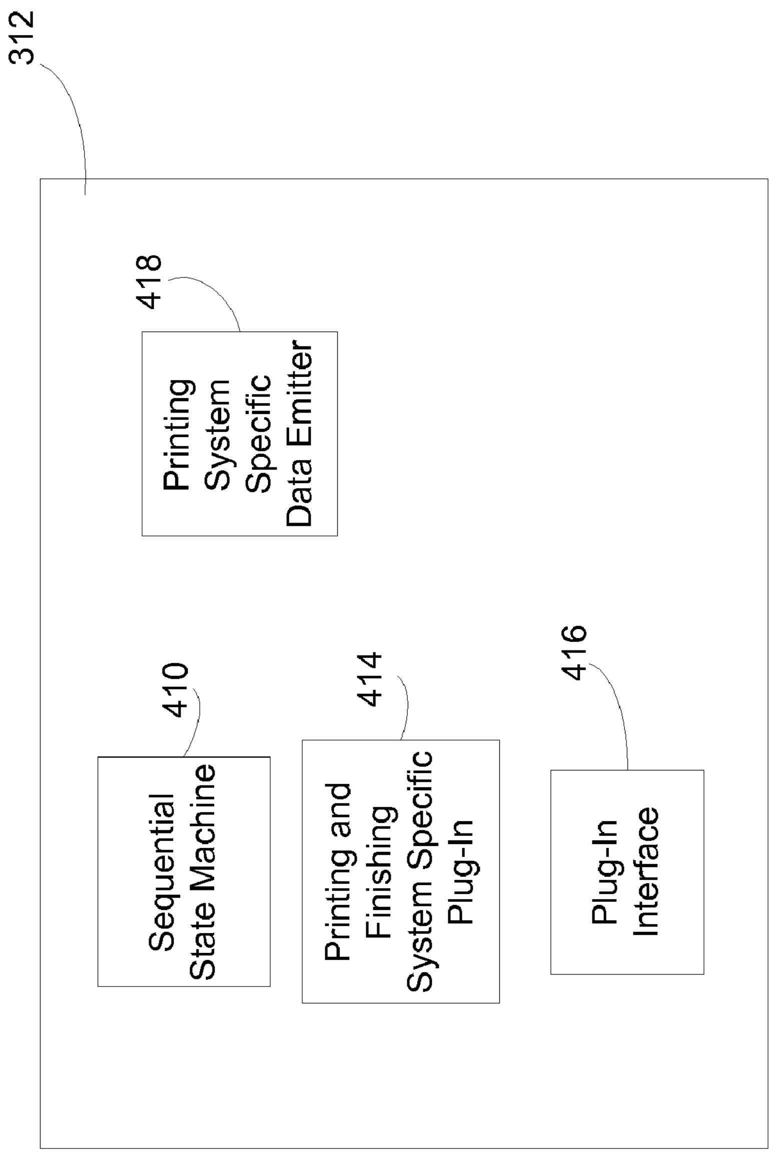
FIG. 4 is a block diagram depicting functional components of print server software.

FIG. 4 provides a view of the functional components of document print server 312. As shown, document print server 312 may comprise sequential state machine 410, printing and finishing system specific plug-ins 414, plug-in interface 416, and printing system specific data emitter 418. Sequential state machine 410 operates to parse the rules for a particular print job, which may be stored in a file such as, for example, an XML file, and process the document files that are contained in the print job. Sequential state machine 410 then generates JCL and PDL instructions that a printing and finishing system can interpret. In order to accommodate different printing and finishing machines that are designed to process different command formats, document print server 312 may comprise plug-ins 414 that allow for generating command streams for a particular printing and finishing machine. Plug-in interface 416 operates as an interface between the various plug-ins that may be used and the remainder of document print server 312. Printing system specific data emitter 418 transmits the JCL and PDL specific commands to the printing and finishing equipment.

Figure 5:
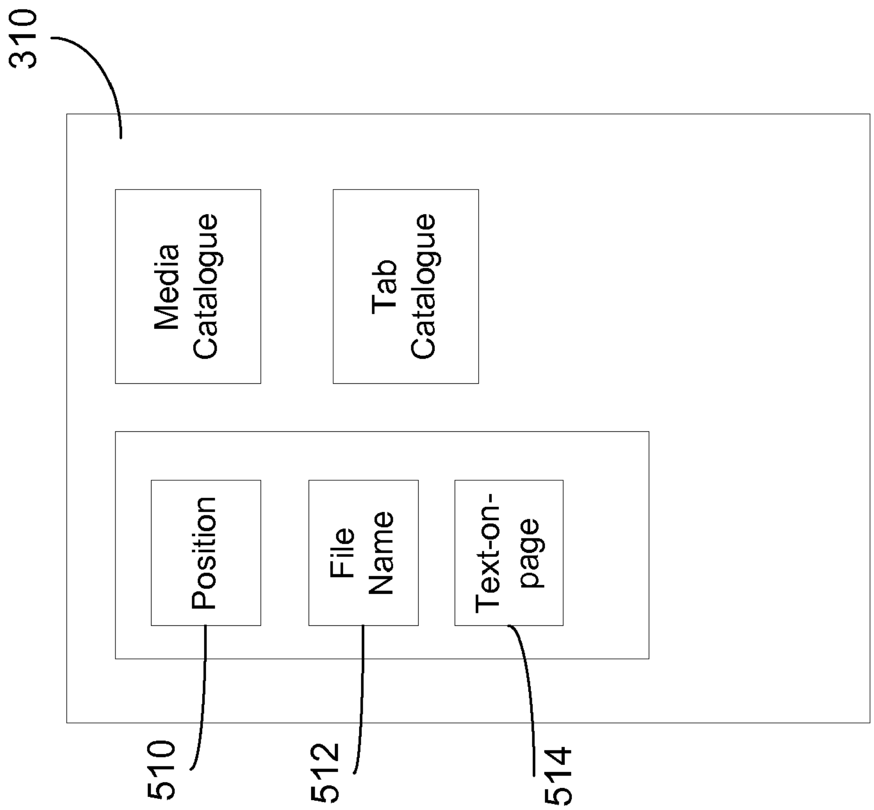
FIG. 5 is a block diagram depicting functional components of an application for defining printing and finishing rules for a print job.

FIG. 5 provides a view of the functional components of print job rules application 310. Print job rules application 310 operates to provide an interface via which users may define the rules for processing a particular print job. In an illustrative embodiment, there are three primary methods or modes for defining the rules for a print job: position 510; file name 512; and text-on-page 514. The position method/mode 510 refers to defining the rules for printing and finishing a print job based upon the position of documents in a print job folder and/or the position of pages in the document. The file name 512 method/mode refers to defining the rules for printing and handling a print job based upon the names of the files in the print job. The text-on-page 514 method/mode refers to the defining the rules for printing and handling a print job based upon the text that appears on the pages of the document being printed. Print job rules application also comprises a media catalogue that allows a user to define the characteristics of a particular media and save the characteristics with an easily recallable name. A tab catalogue allow a user to define the characteristics of a particular tab media and to save the characteristics with an easily recallable name.

Figure 6:
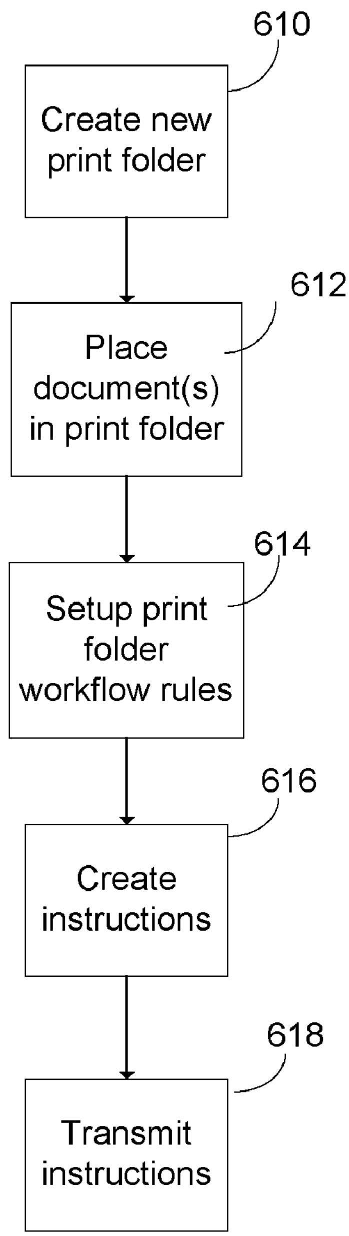
FIG. 6 is a flow chart of a process for defining printing and finishing rules for a print job.

FIG. 6 is a flowchart of an illustrative process for printing. As shown, at step 610, the user creates a new print job work folder in which the documents comprised in the print job and the rules or parameters for printing are to be held. In an illustrative embodiment, the print job work folders may be referred to as "Hot Folders." At step 612, the user places the electronic files that comprise the components of the print job in the print job work folder. At step 614, the parameters/rules for printing the print job are defined by the user employing, for example, one of the position 510, file name 512, or text-on-page 514 modes as described below in connection with FIGS. 9 through 19. These printing and finishing parameters/rules are saved with the component electronic files in the print job work folder. The file in which the rules are saved may be, for example, an XML file and may be referred to as the print job rules file. In an illustrative embodiment, each print job may have a print job rules file. At step 616, the document print server 312 employs the rules/parameters defined by the user to create the JCL and PDL commands for printing and finishing the particular print job. At step 618, the instruction stream is transmitted to the printing and finishing system where the document is physically created.

Figure 7:
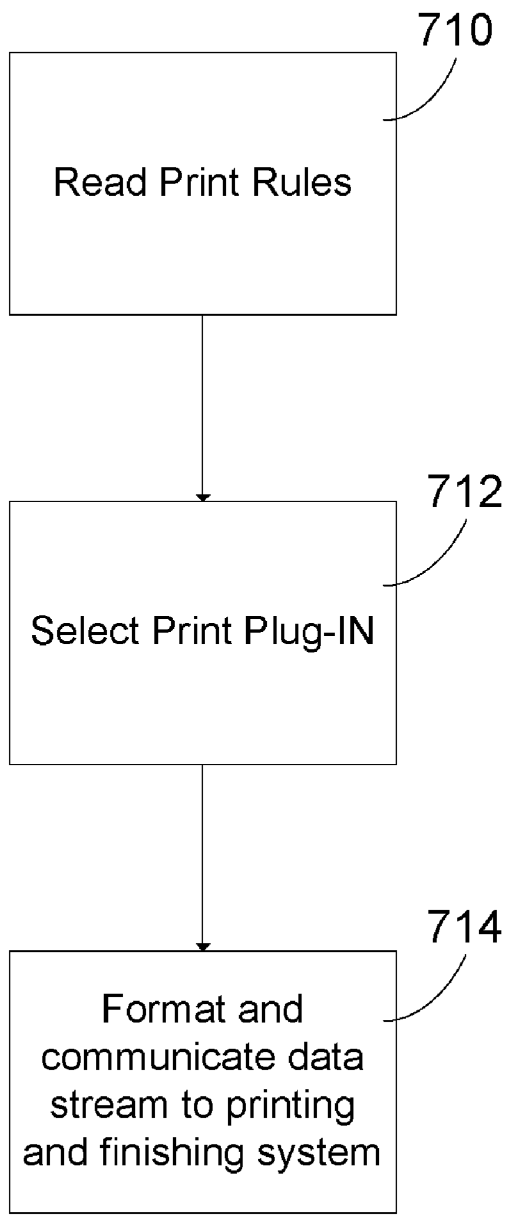
FIG. 7 is a flow chart of a process for printing a print job having defined printing and finishing parameters.

FIG. 7 is a flowchart of an illustrative process for creating the JCL and PDL instruction stream. At step 710, document print server 312 reads the user-defined rules for the print job and identifies the printing and finishing system which has been selected for printing the job. In an illustrative example, the user-defined rules are stored in the print job work folder with the files in which the document pages are stored. It should be noted that the user-defined rules may be edited so as to change the intended target printing and finishing system. Thus, the printing and finishing of a document is device independent allowing a print job to be easily adapted to new printing and finishing machines. At step 712, document print server 312, having determined the system identified in the user-specified rules, selects the appropriate plug-in for creating instructions for the printing and finishing system that will be used for creating the printed document. At step 714, document print server 312 creates and formats the JCL and PDL instructions for the identified printing and finishing system.

Figure 8:
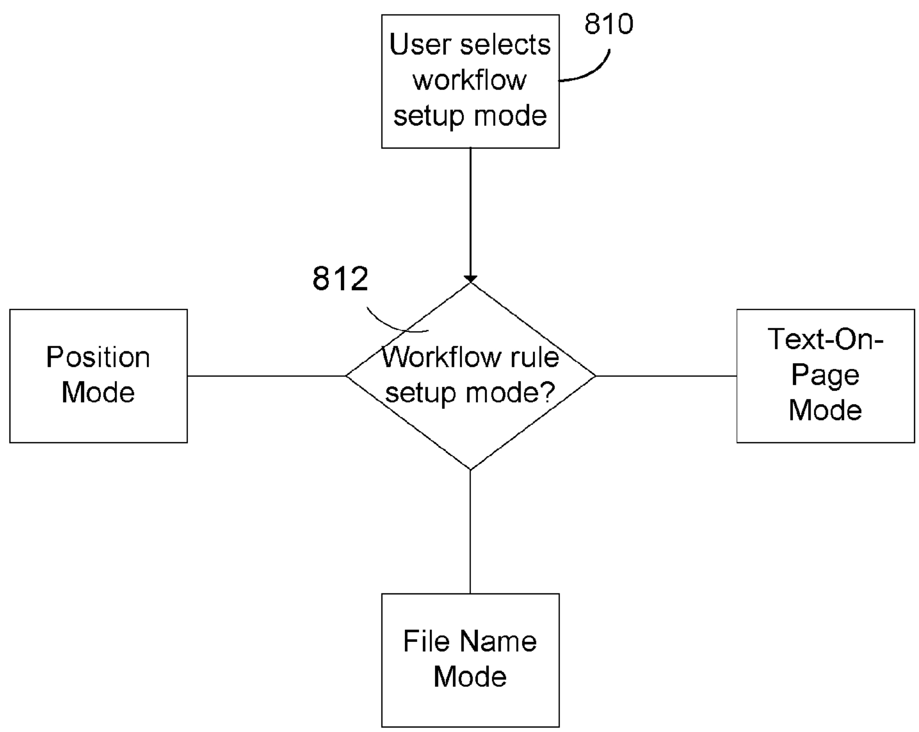
FIG. 8 is a flow chart of a process for defining printing and finishing parameters.

FIG. 8 is a flowchart of an illustrative process employed by print job rules application 310. As shown, at step 810, the user selects the method or mode by which he/she wishes to define the rules or print parameters. The user may provide an input identifying one of the three provided modes: position, file name, or text-on-page. At step 812, depending upon the user's input, the user is directed to the appropriate portion of the user interface functionality for defining the printing and finishing parameters as discussed below. Those skilled in the art will appreciate that the application for gathering user-specified rules for printing may have been written in any suitable application programming environment including, for example, a Web-ready application for access over the Internet.

Figure 9A:
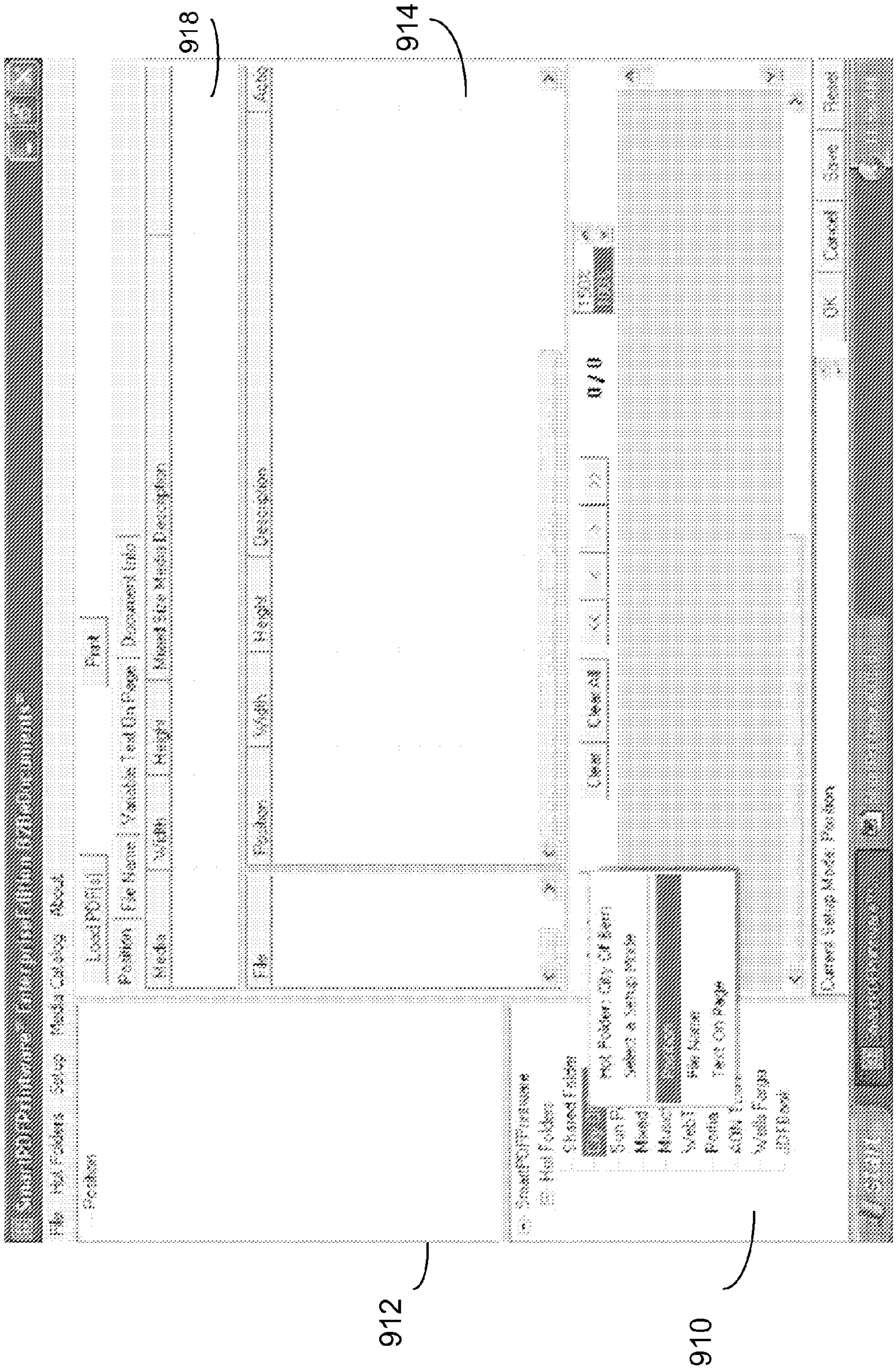
FIGS. 9A through 9G depict illustrative data screens that may be used in an exemplary system to define print rules for a print job using the position of a document or page.

FIG. 9A provides an illustrative user interface screen that may be used to define print rules for a print job by employing the position mode, i.e. the position of documents within the print job and/or the position of pages in a document as a focus for defining the rules. As shown, the illustrative screen comprises a folder panel 910 for displaying the print job work folders, identified as "Hot Folders," which hold print jobs. The folders may correspond to print jobs that have previously been defined as well as new folders that require user input to specify printing rules. A user may select a particular folder in panel 910 with a pointing device and thereafter specify using a pop-up pull-down menu whether it is desired to specify the print parameters for the print job by position, file name, or text-on-page. In the particular example depicted in FIG. 9, the user has selected the folder titled "City of Bern" and has selected via the pop-up pull down menu to define the print parameters for the print job with reference to the position of documents in the print job.

Figure 9B:
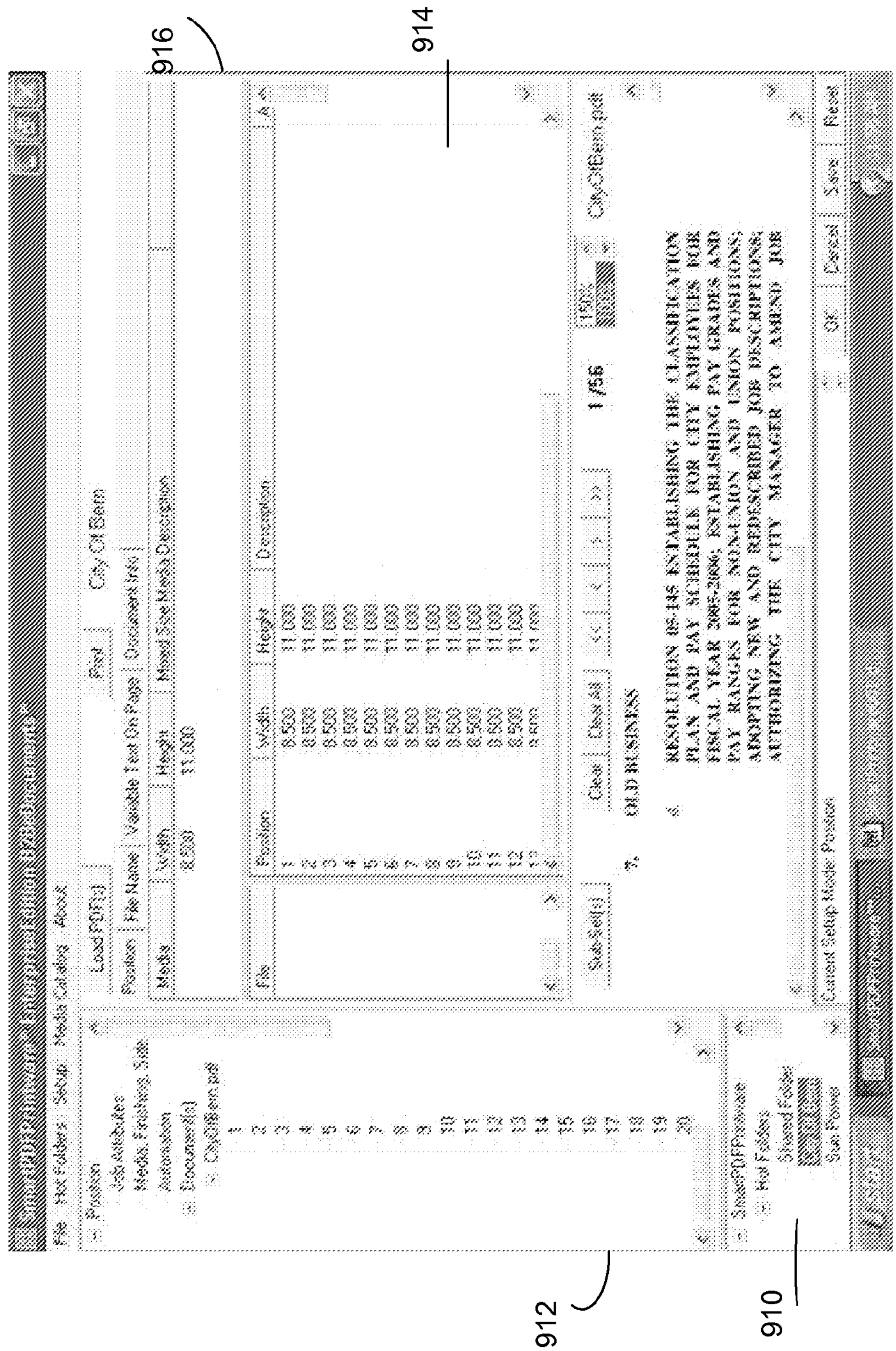

FIG. 9B provides an illustrative user interface screen for defining print rules for the print job with reference to the position of pages in the document. As shown, print job attribute panel 912 provides a hierarchical display of the attributes that have been assigned to the print job. For the selected print job folder of "City of Bern," in panel 912 a hierarchical display of the titles of the files in the folder, which in this example is "CityOfBern.pdf" and the page numbers comprised in the file are shown. Also displayed are any print parameters or rules relating to the Attributes, Automation, and Media, Finishing, Sides, and Output. As the user specifies printing and finishing parameters for a print job, the hierarchical display of the attributes in print job attribute panel 912 are updated to reflect the parameters specified by the user. Furthermore, the hierarchical print job attribute panel 912 can receive inputs to define printing and finishing parameters. For example, the user may interface with hierarchical display to define parameters including: inserting covers, inserting exceptions to printing parameters for particular pages; inserting separation sheets between pages or documents; inserting tabs between pages, documents, groups, subsets, etc.; inserting slip sheets; creating subsets and defining specific printing and finishing parameters; and creating groups.

Also depicted in FIG. 9B is a page listing panel 914 which lists each page in a selected document. In the illustrative example, the pages displayed are those corresponding to "CityOfBern.pdf" identified in panel 912. In page listing panel 914, each page has an entry identifying the position of the page in the document, the width of the page, the height of the page, and any description of the page.

Image panel 916 displays an image of the page in panel 914 that is selected. In the example illustrated in FIG. 9B, an image of the first page is displayed.

Mixed media size panel 918 displays all of the different media sizes that are contained in the document. When a document is selected to define printing parameters, print job rule application 310 scans the document to identify all of the different media sizes contained in the document. Each unique media size is displayed in the mixed media size panel 918. As described below, the various sized media can be identified as "normal" or "exception."

Figure 9C:
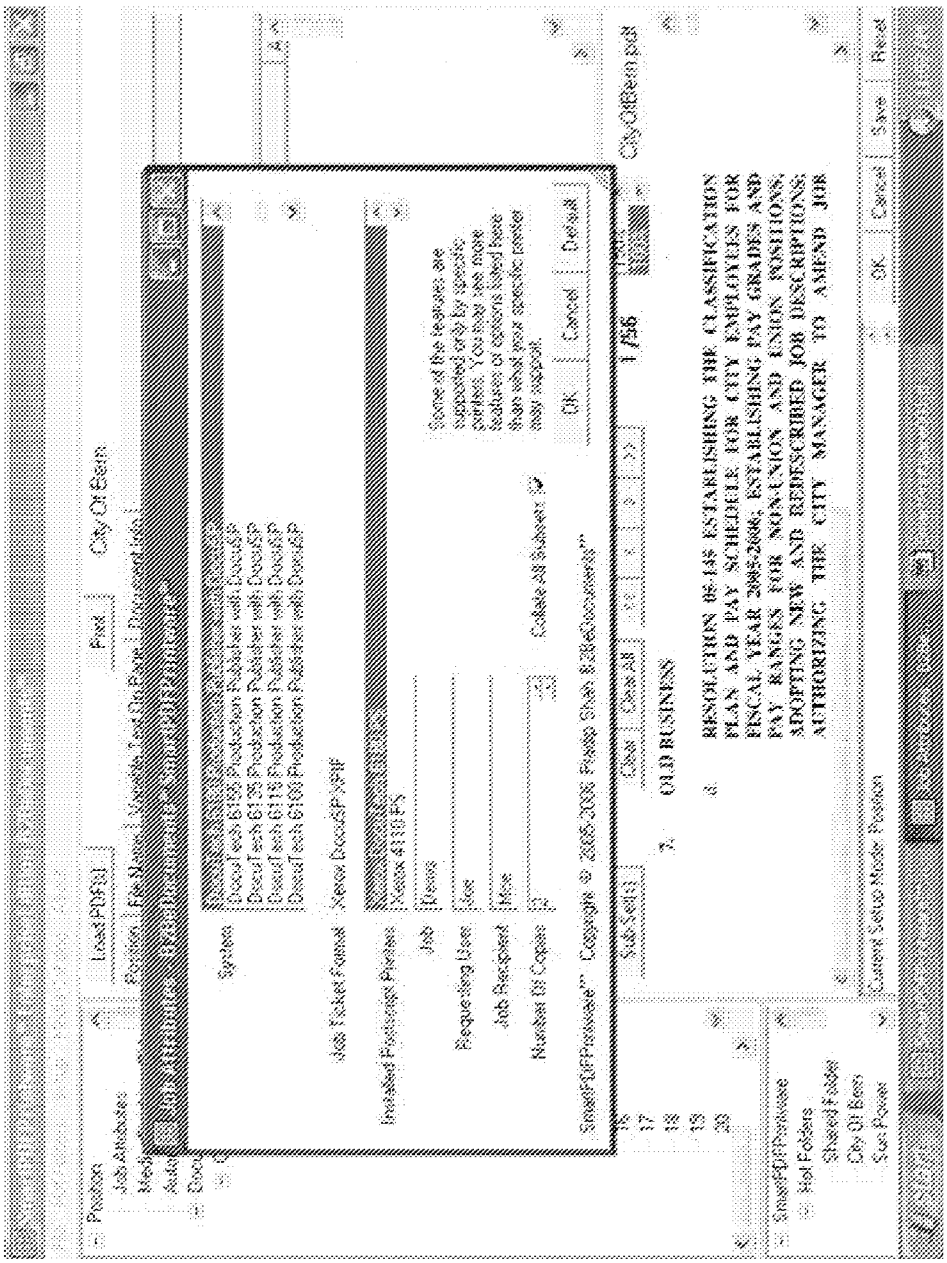
Figure 9D:
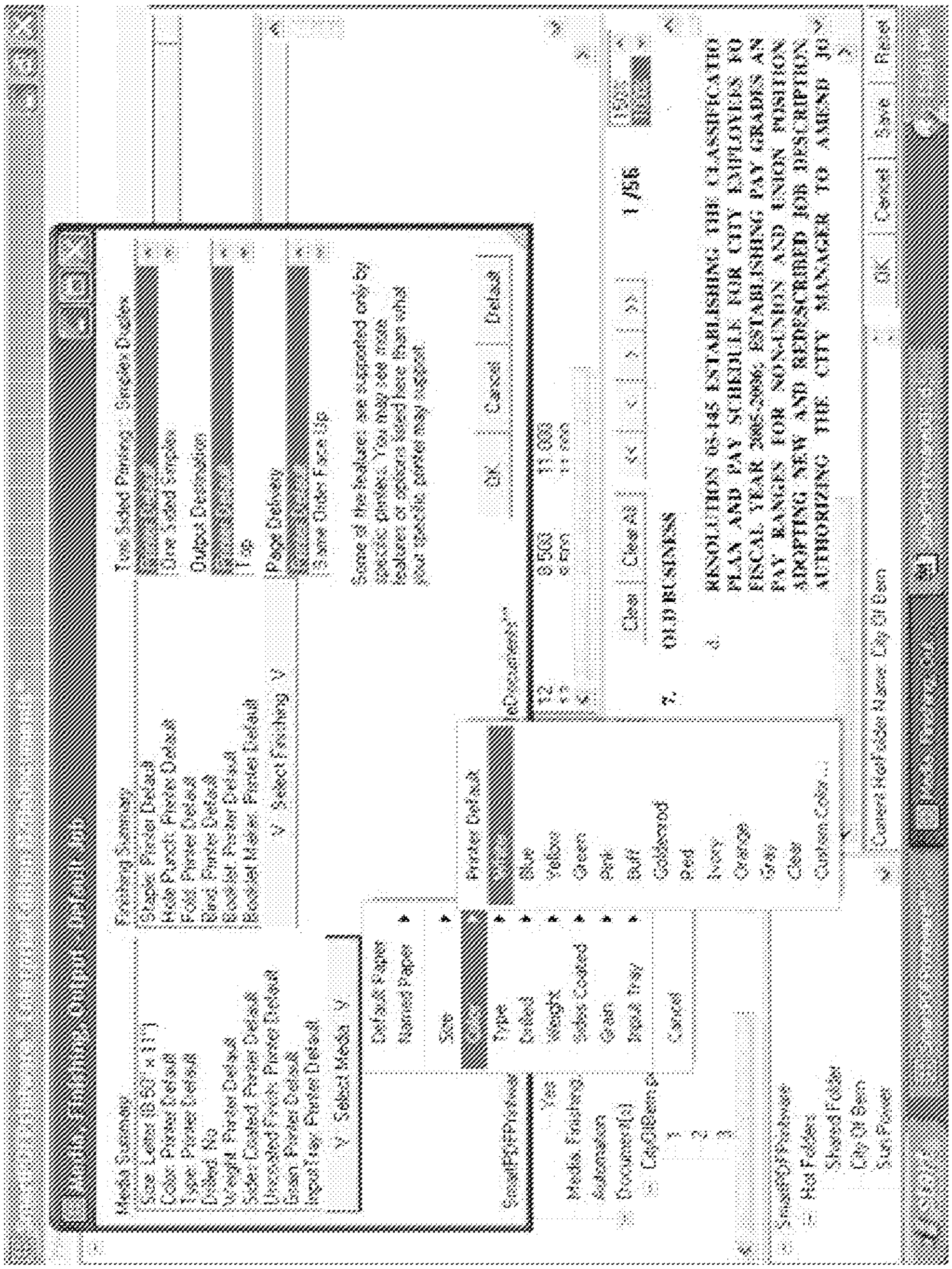
Figure 9E:
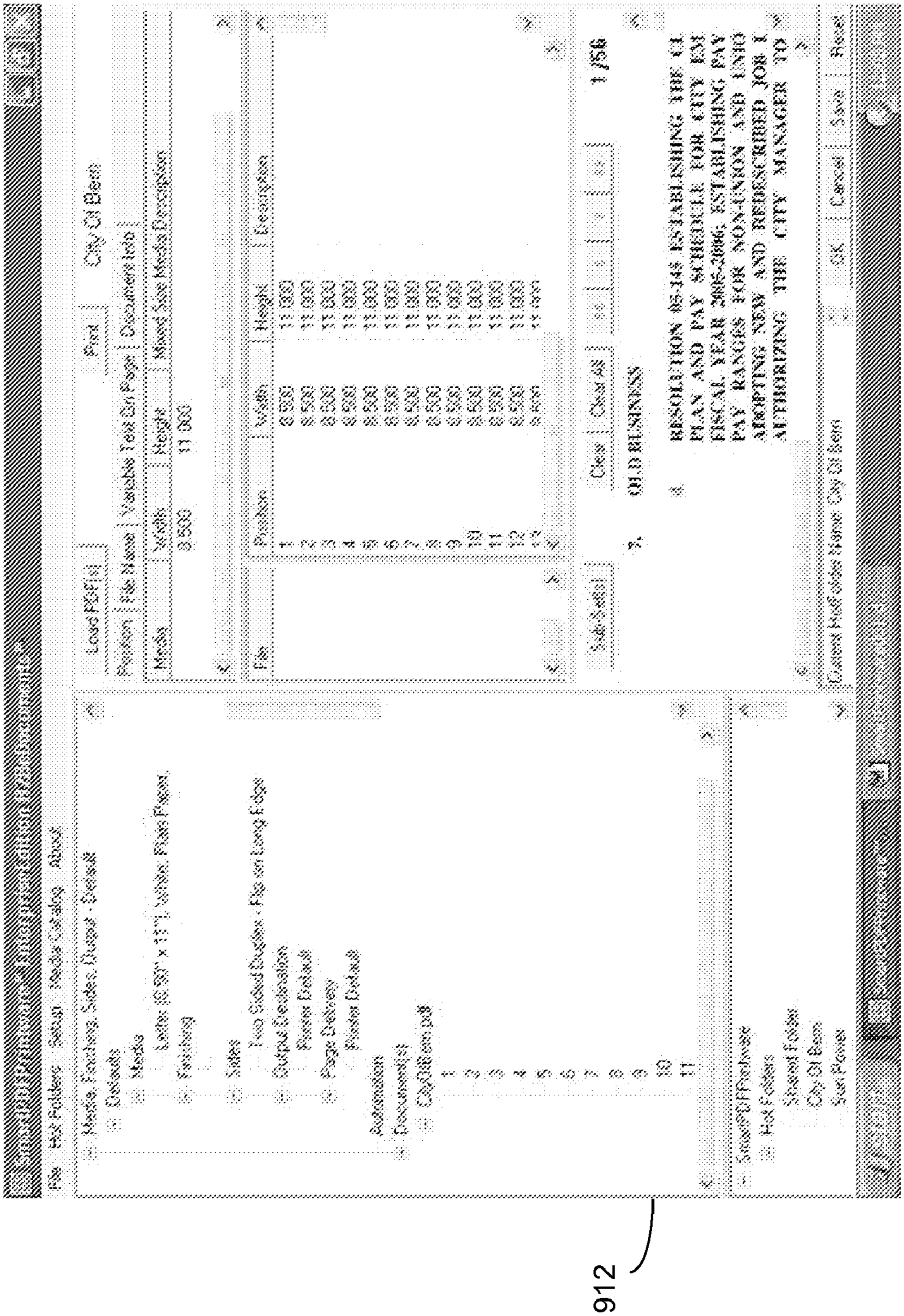
Figure 9F:
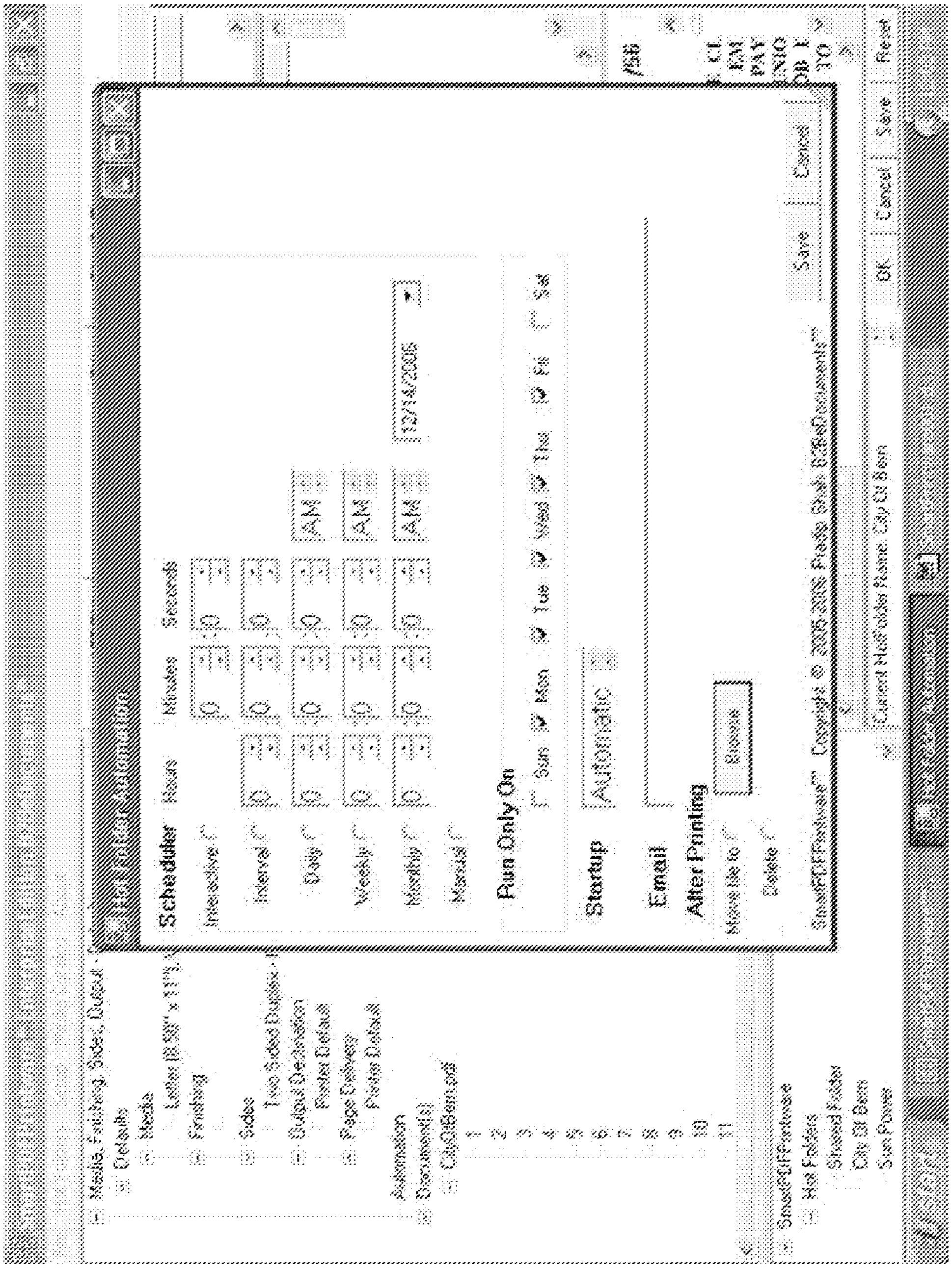
Figure 9G:
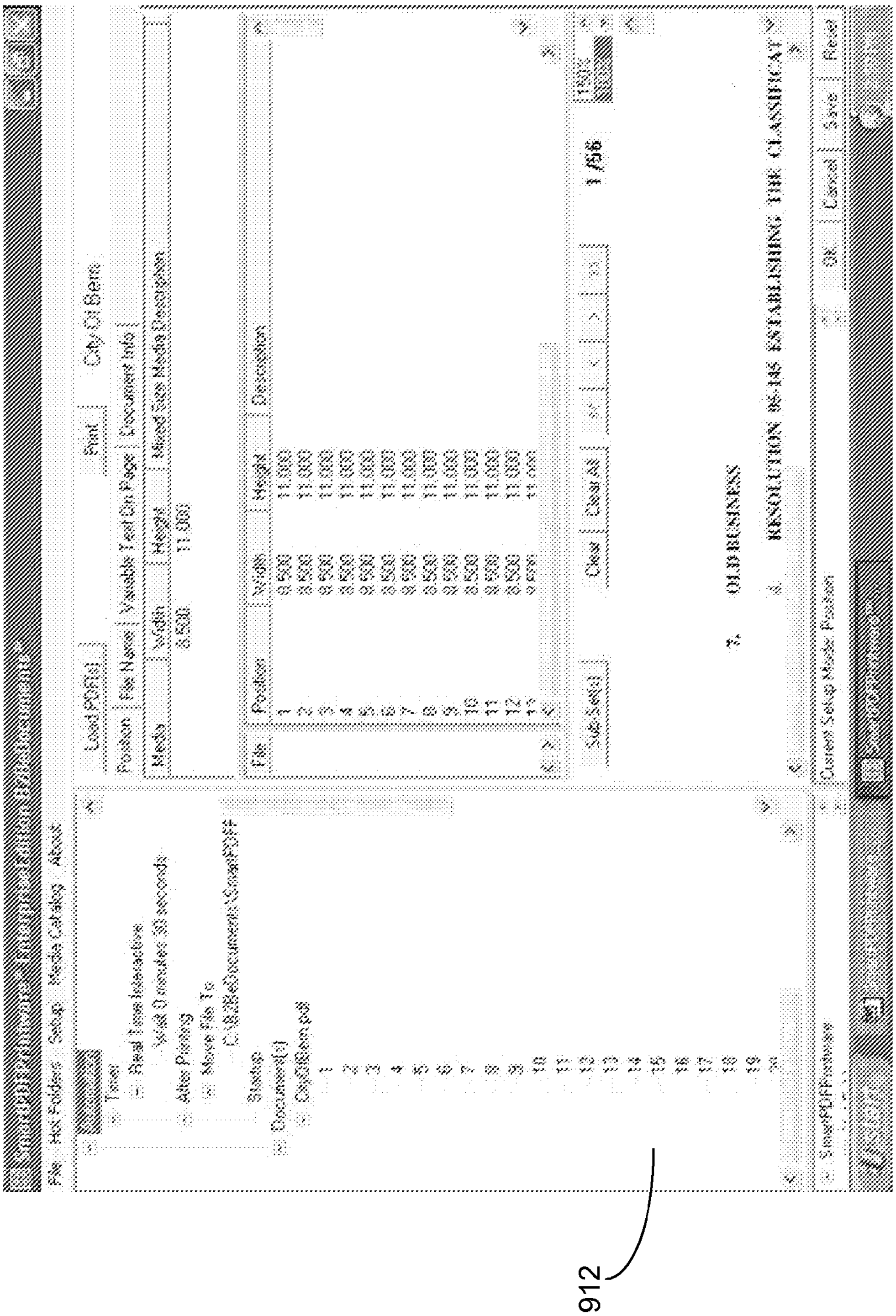

A user may wish to specify job attributes for the print job by double clicking on the "Job Attributes" entry that appears in panel 912. In an illustrative system, a pop-up window such as depicted in FIG. 9C is displayed. The user may specify printing parameters including the specific printing and finishing system for which the print job is to be formatted. The print job rule application 310 automatically determines the JCL format that is required for communication with the selected system. In this particular example, the user may also specify which of the installed printers should be used. Additionally, the user may specify a name for the job, the requestor, the intended recipient and the number of copies that are requested. As shown in FIG. 9E, the information entered by the user in the job attributes pop-up window appears in the print job attribute panel 912.

A user may also specify media default parameters by clicking on the "Media, Finishing, Sides" item in the hierarchical listing of print job attribute panel 912. Doing so results in a pop-up window such as that illustrated in FIG. 9D. As shown, the user may specify defaults for numerous media attributes (size, color, type, drilled, weight, sides coated, uncoated finish, grain, and input tray) and finishing attributes (staple, hole punch, fold, binding, booklet, and booklet maker) using pull down menus. Additionally, the user may specify defaults regarding two sided printing, output destination, and page delivery. After the user enters the desired values for the printing and finishing parameters, the selected values are shown in print job attribute panel 912 as depicted in FIG. 9E.

An illustrative system allows for a user to specify that the print job be automated, i.e. automatically printed at a particular date, time, and/or interval. This feature is especially useful in situations where the documents in a print folder are frequently updated at scheduled times and suitable for printing at scheduled intervals. Users may specify the automated printing for a folder by double clicking on the "Automation" entry in the hierarchical list shown in attribute pane 912. Doing so results in a pop-up window such as that illustrated in FIG. 9F. As shown, the user may specify to have the print job run, for example, on an hourly, daily, weekly, or monthly interval. A user may also specify that the print job be run immediately or after a user-defined waiting period. Furthermore, it is possible to limit the run to specific days of the week. Users can also specify that a job status email be generated and sent to a particular email address when the print job is run. Furthermore, the user may specify to either delete or move the files after printing. When a user completes his selections, the results are reflected in print job attribute pane 912 as shown in illustrative screen 9G. The results are also stored in the print job rules file for the particular print job. The print monitor server 314 will monitor the print job as specified by the user and as saved in the print job rules file.

Figure 10A:
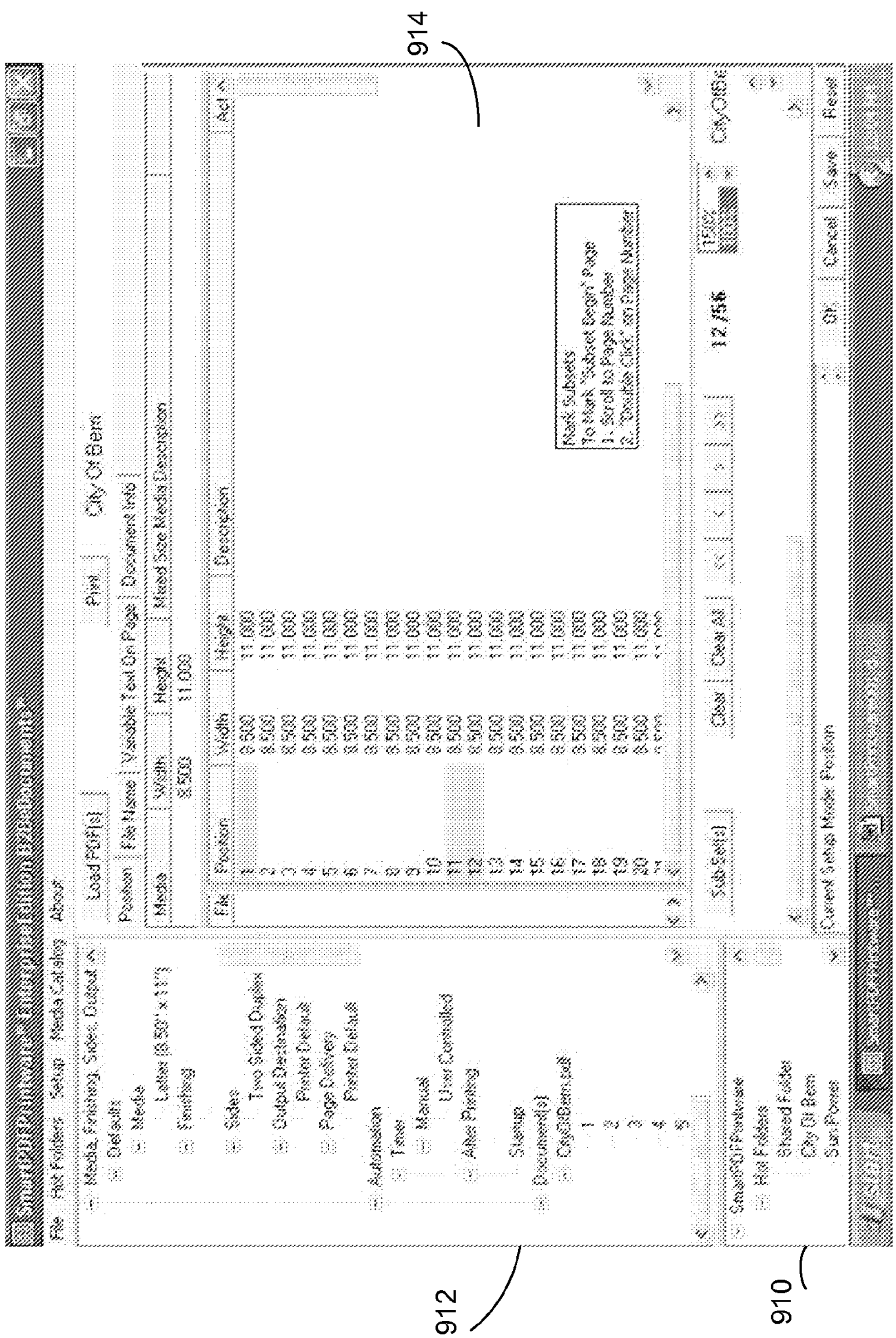
FIGS. 10A through 10H depict illustrative data screens that may be used in an exemplary system to define document subsets and define print rules relating to those subsets.
Figure 10B:
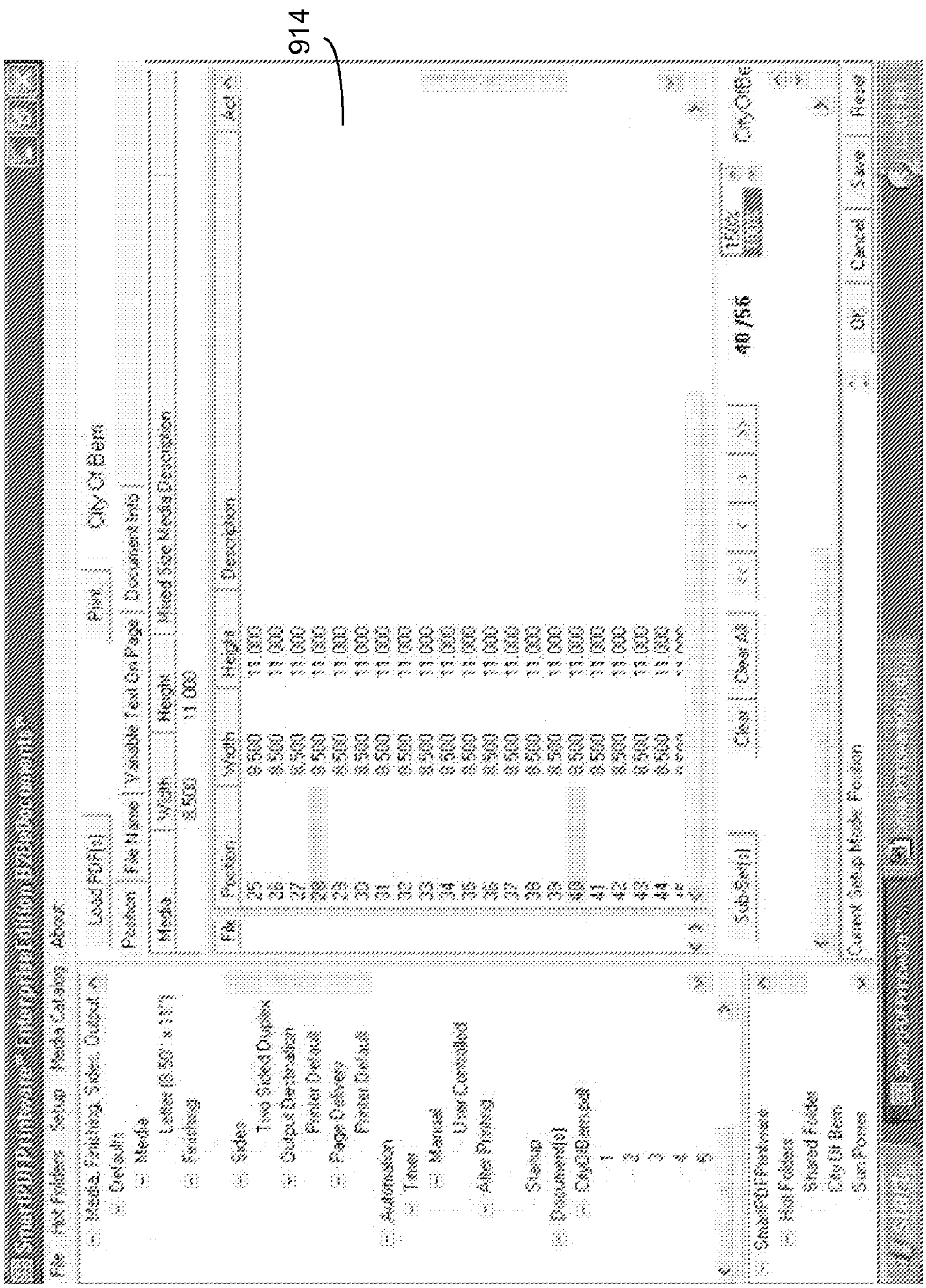
Figure 10C:
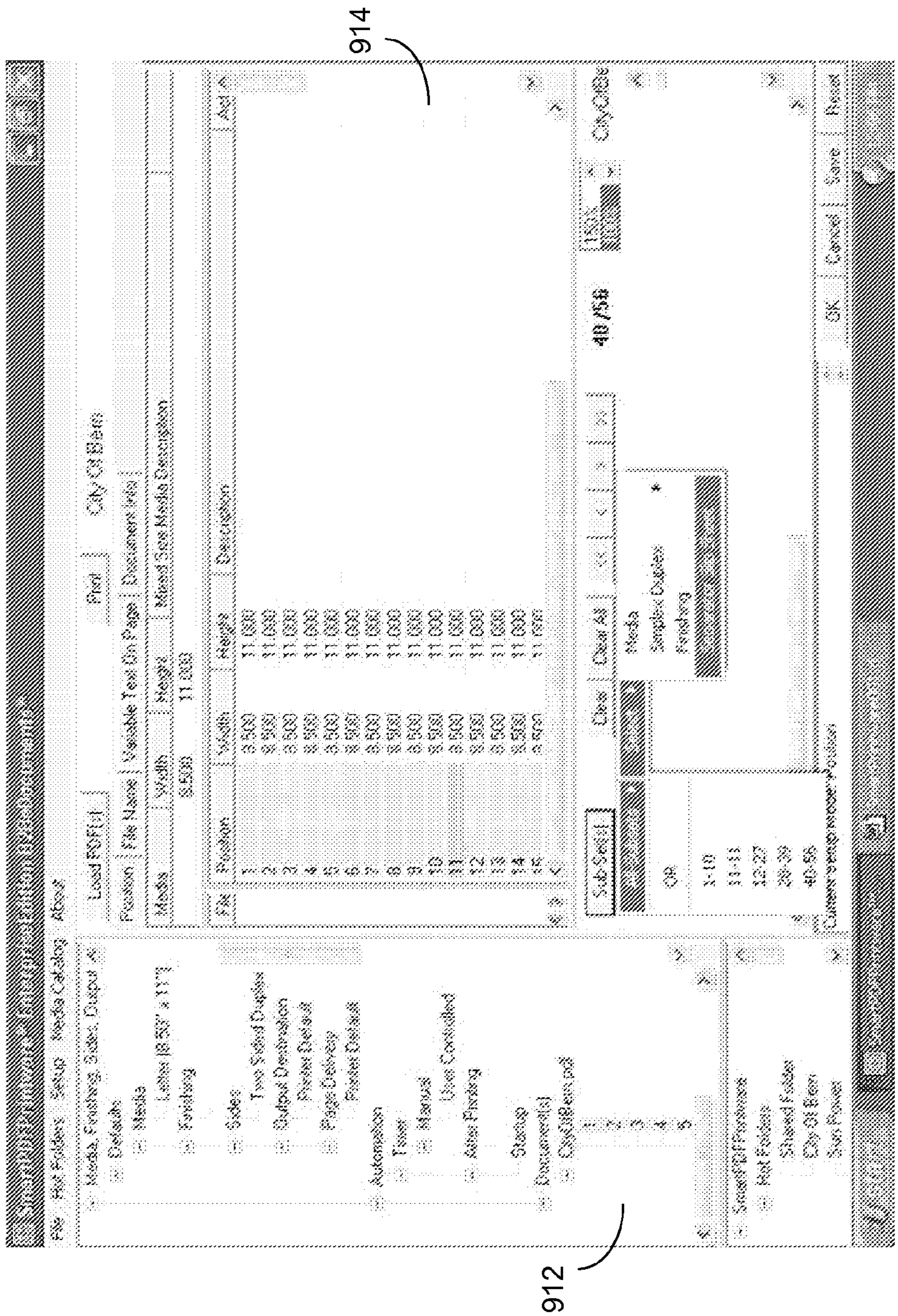
Figure 10D:
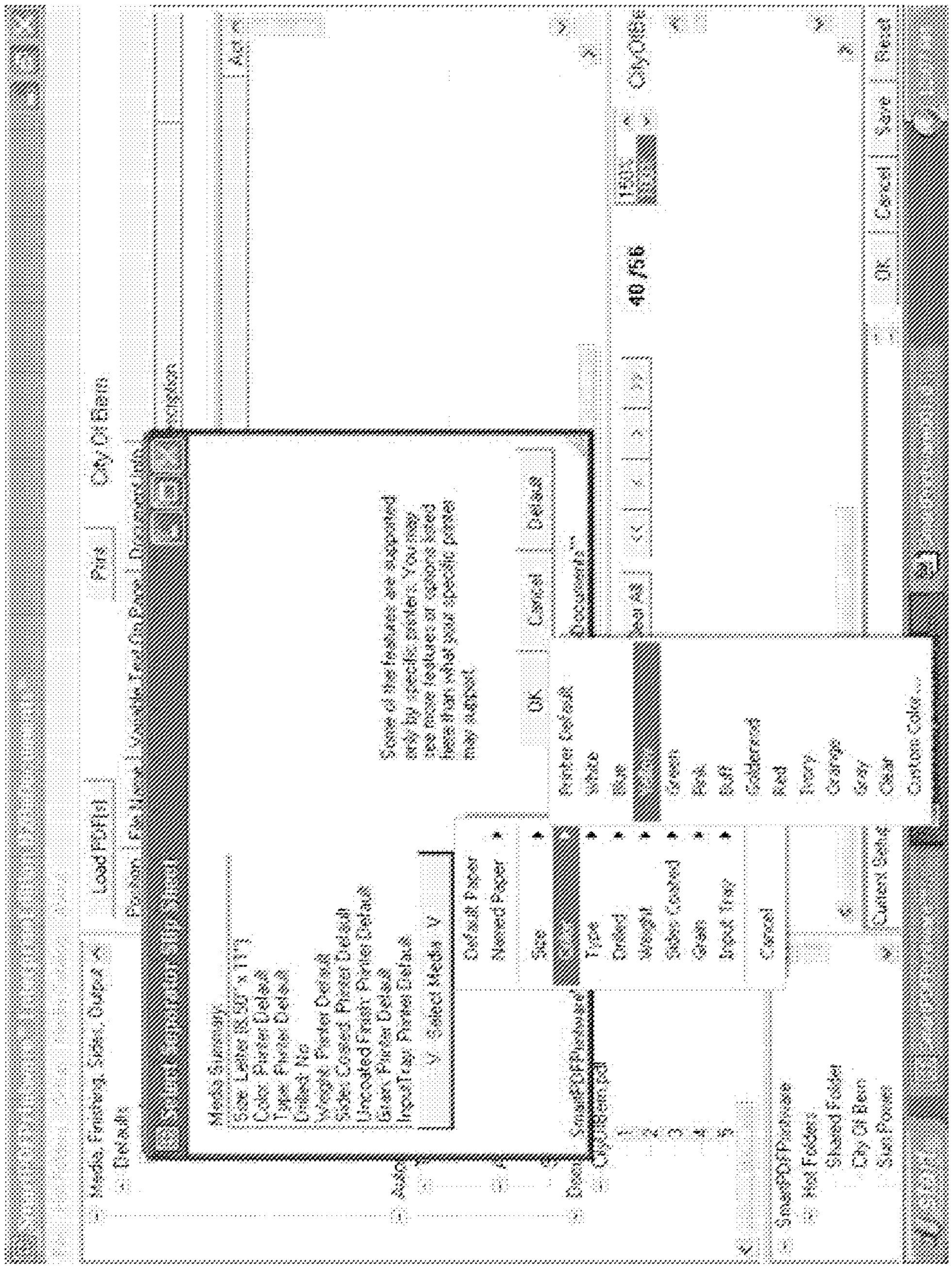

Users may also specify particular printing parameters or rules for subsets of pages in a document. The printing parameters that a user may specify for a subset can be defined to be different from any general printing and finishing parameters that may have been defined for the document. FIG. 10A depicts an illustrative user interface screen that may be used to define subsets of pages and thereafter define printing parameters for those subsets. In an illustrative embodiment, a user may specify subsets of documents by identifying the beginning page of each document subset. In the exemplary screen depicted in FIG. 10A, the user has specified a first subset including pages 1 through 10 by first identifying page 1 as the beginning of a subset and thereafter identifying page 11 as the beginning of a second subset. Pages are noted as having been identified as the beginning page to a subset by highlighting the page number in page listing panel 914. A user may specify the beginning page of a document subset by, for example, double clicking on the page number in the page listing panel 914. As shown in FIGS. 10A and 10B, subsets have been defined comprising pages 1 through 10, 11 (a one page subset), 12 through 27, 28 through 39, and 40 through 56.

Once the subsets have been defined, a user may specify printing and finishing parameters for those subsets. As shown in the illustrative screen of FIG. 10C, a user may view the defined subsets via the button titled "Sub-Sets." The user may select to define printing parameters relating to all of the subsets by selecting the appropriate item in the pull down list. A user selecting to define printing parameters or rules for all of the subsets may select to specify parameters relating to the media for printing, finishing properties, whether to insert separator sheets, and whether simplex or duplex printing should be used. In the exemplary screen depicted in FIG. 10C, a user has selected to define printing parameters for all subsets, and in particular has selected via the menu selections to insert a separator slip sheet with respect to all subsets. FIG.

Figure 10E:
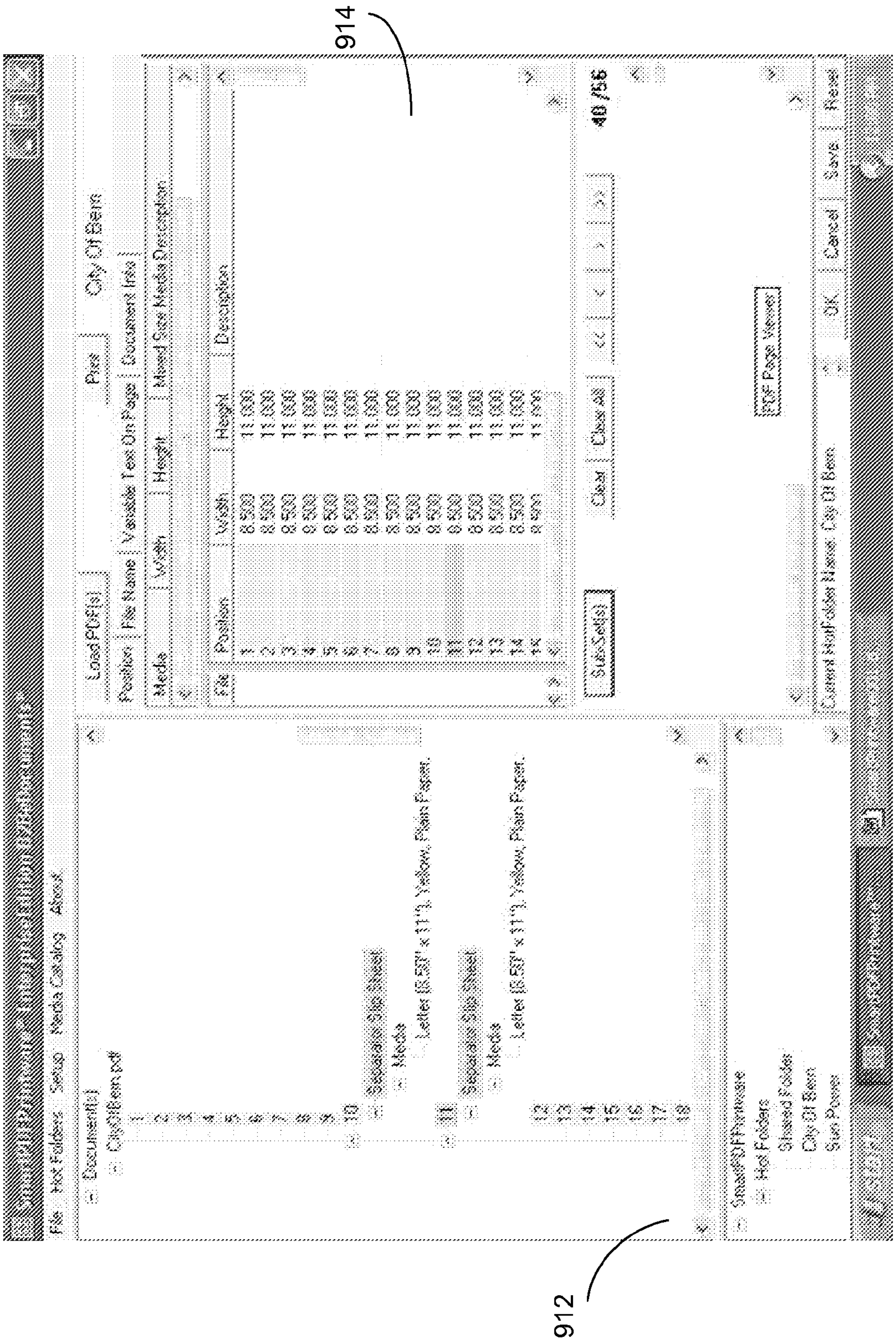

10D is an exemplary screen depicting a pop-up window for defining a separator slip sheet. As shown, the user may specify a number of printing and finishing parameters (media/paper size, media color, media type, whether the media is drilled, the media weight, whether the media is coated, the grain of the paper, and the input tray from which the paper should be drawn) relating to a slip sheet that is to follow each of the selected subsets of documents. As shown in FIG. 10E, after the user has selected the printing parameters for the separator slip sheets, the selections are depicted in the hierarchical page listing shown in print job attribute panel 912. The separator slip sheets are depicted hierarchically under the last pages of each subset. Also listed are the details relating to the media that was selected and defined by the user for the slip sheet.

Figure 10F:
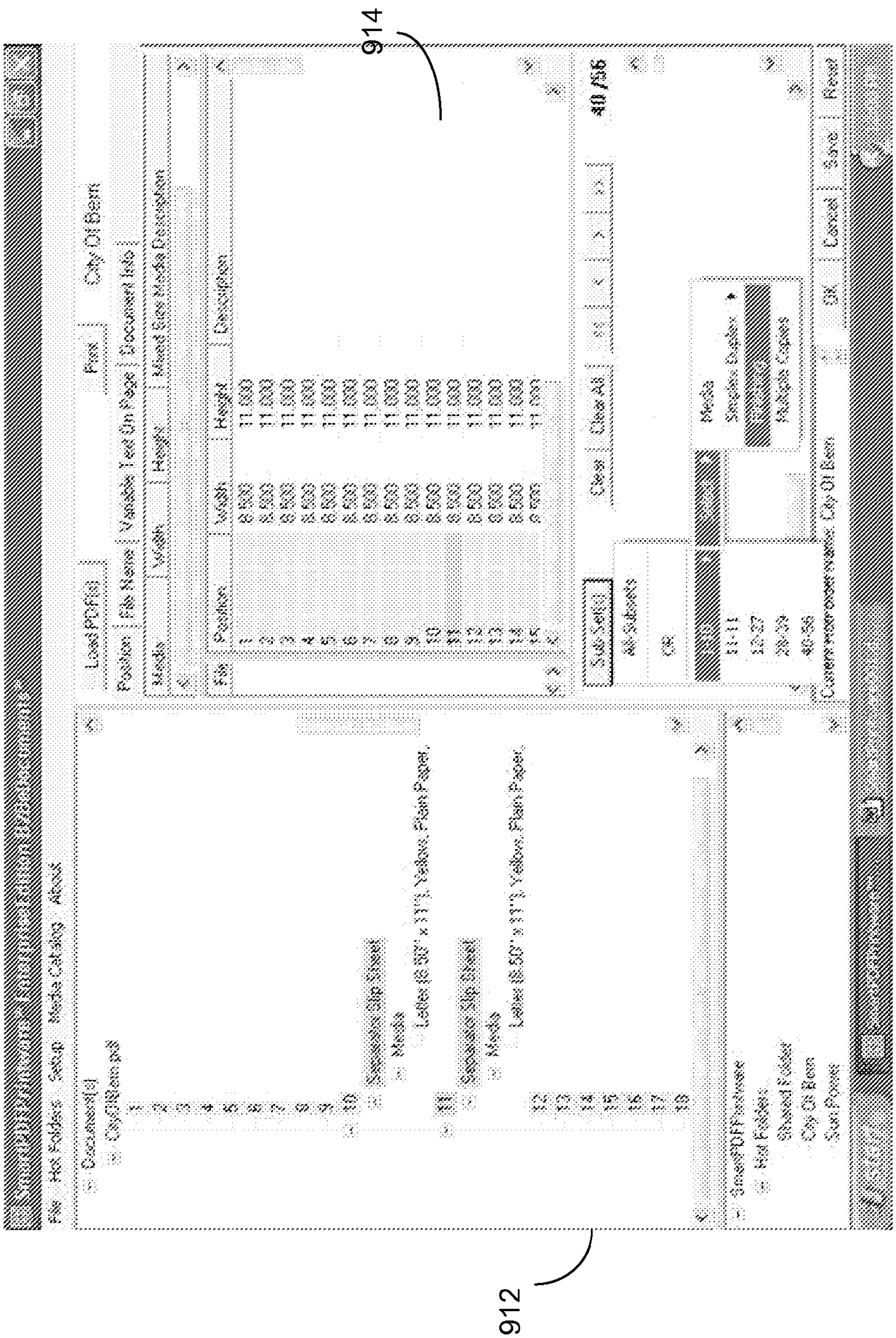
Figure 10G:
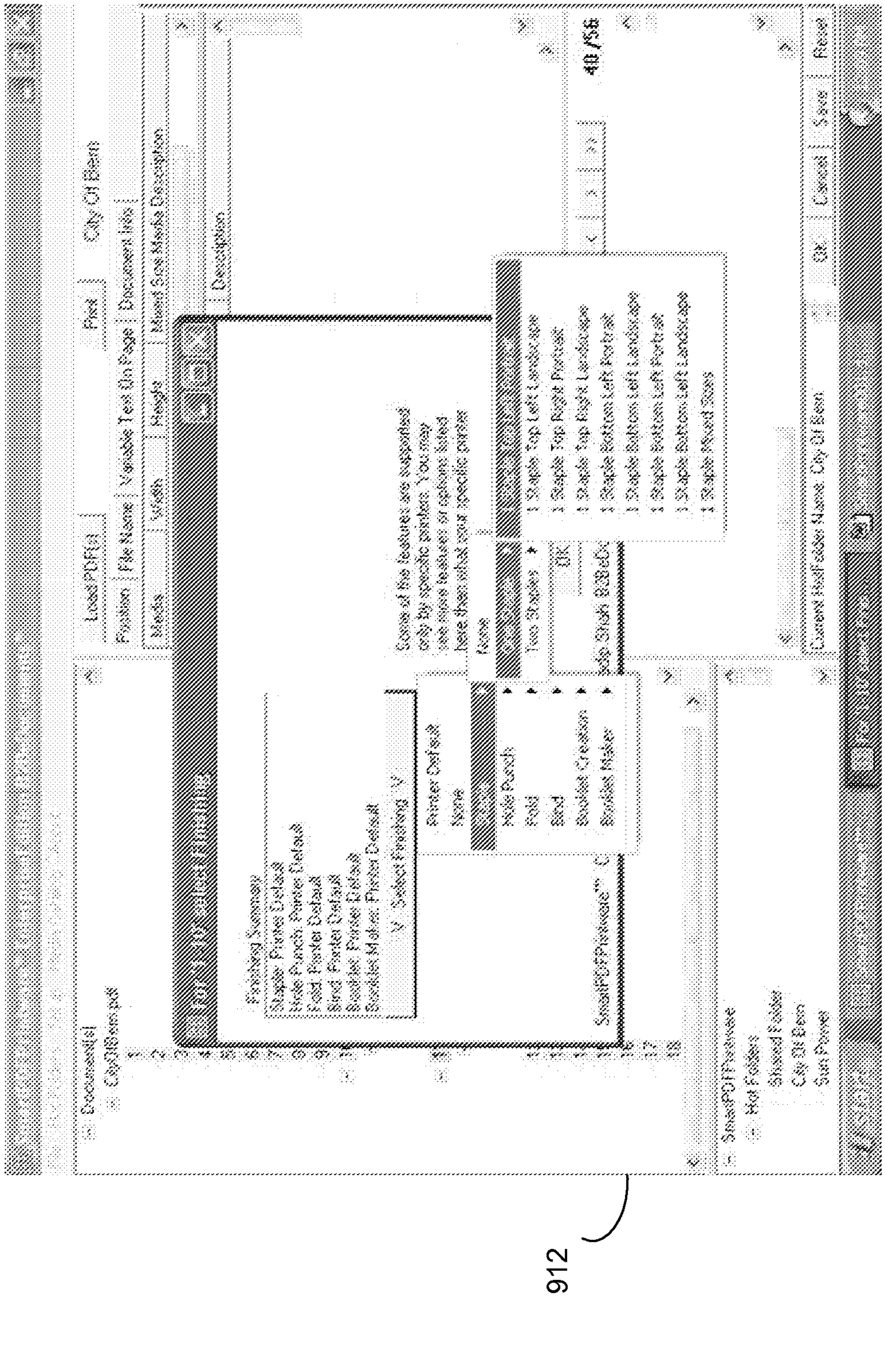
Figure 10H:
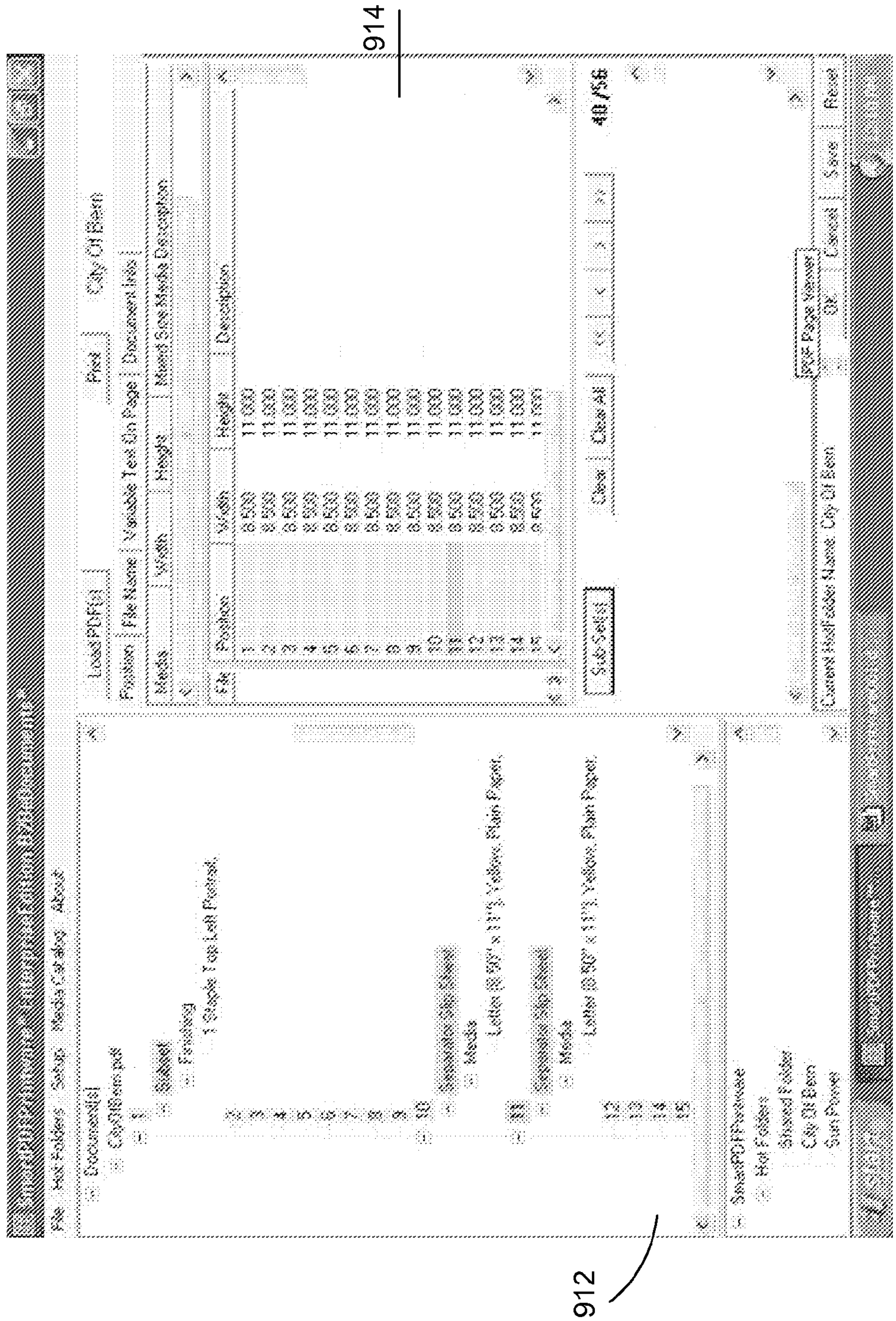

As depicted in FIG. 10F, a user may also wish to specify printing parameters specific to a particular page subset. In an illustrative embodiment, the user may select to specify parameters for the media type associated with a subset, the finishing type for a subset, the number of copies that should be made of a subset, and whether the document should be printed in simplex or duplex. FIG. 10G depicts an illustrative screen depicting a scenario wherein the user selected to specify finishing parameters for a selected subset. As shown, the system presents the user with a pop-up window that allows the user to specify finishing parameters including, for example, how and where to staple the subset, whether or not to hole punch the subset, whether to fold the subset, whether to bind the subset, whether to create a booklet out of the subset, etc. After the user has finished defining the finishing parameters for the subset, those parameters are depicted in the hierarchical page listing shown in print job attribute panel 912. As shown in FIG. 10H, hierarchically indented under the first page of the corresponding subset are a representation of the finishing attributes as defined by the user. The representation specifies that the printing attributes apply to the subset as opposed to the particular page under which the entry appears.

Figure 11A:
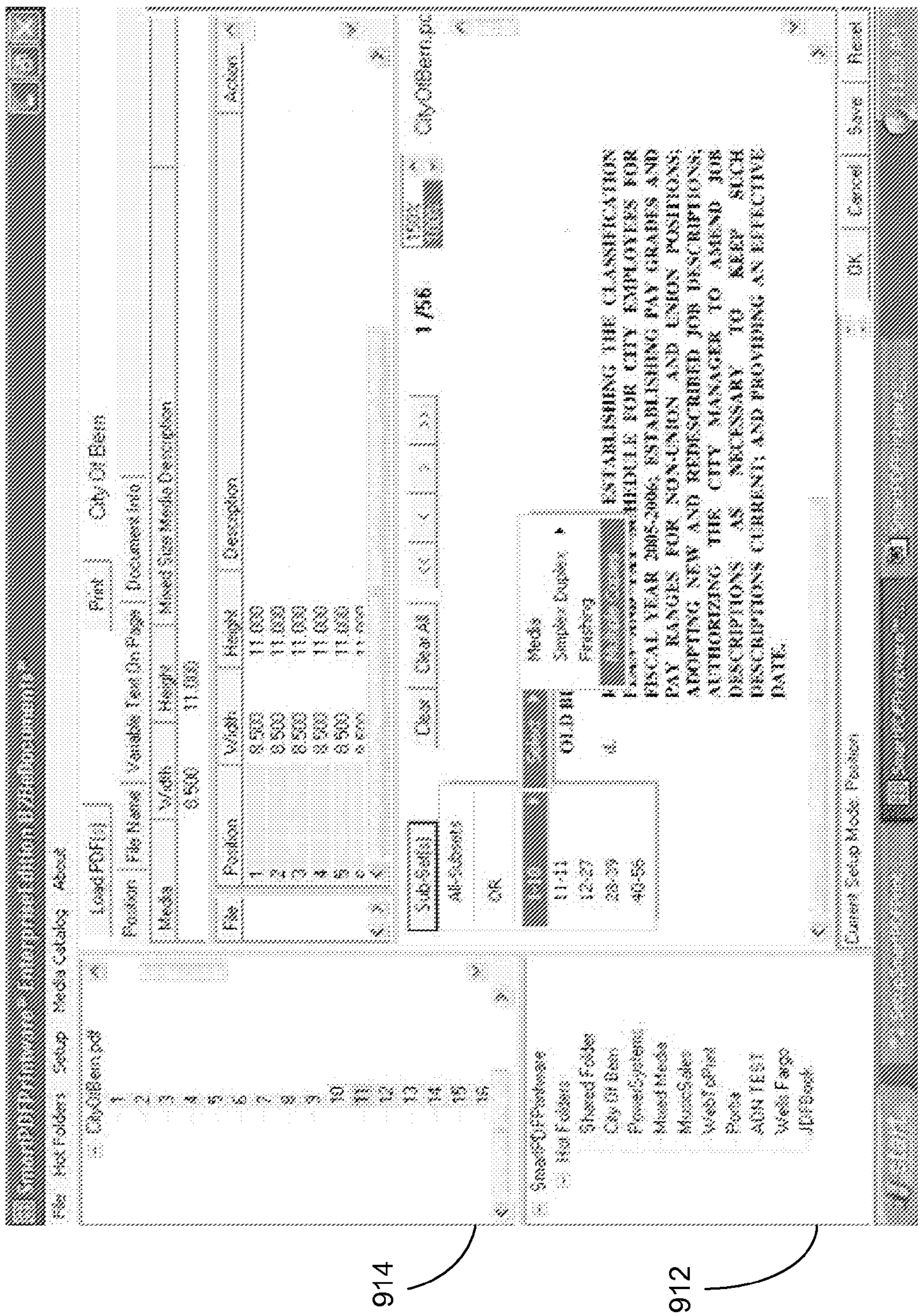
FIGS. 11A through 11E depict illustrative data screens that may be used in an exemplary system to define print rules relating to document subsets.
Figure 11B:
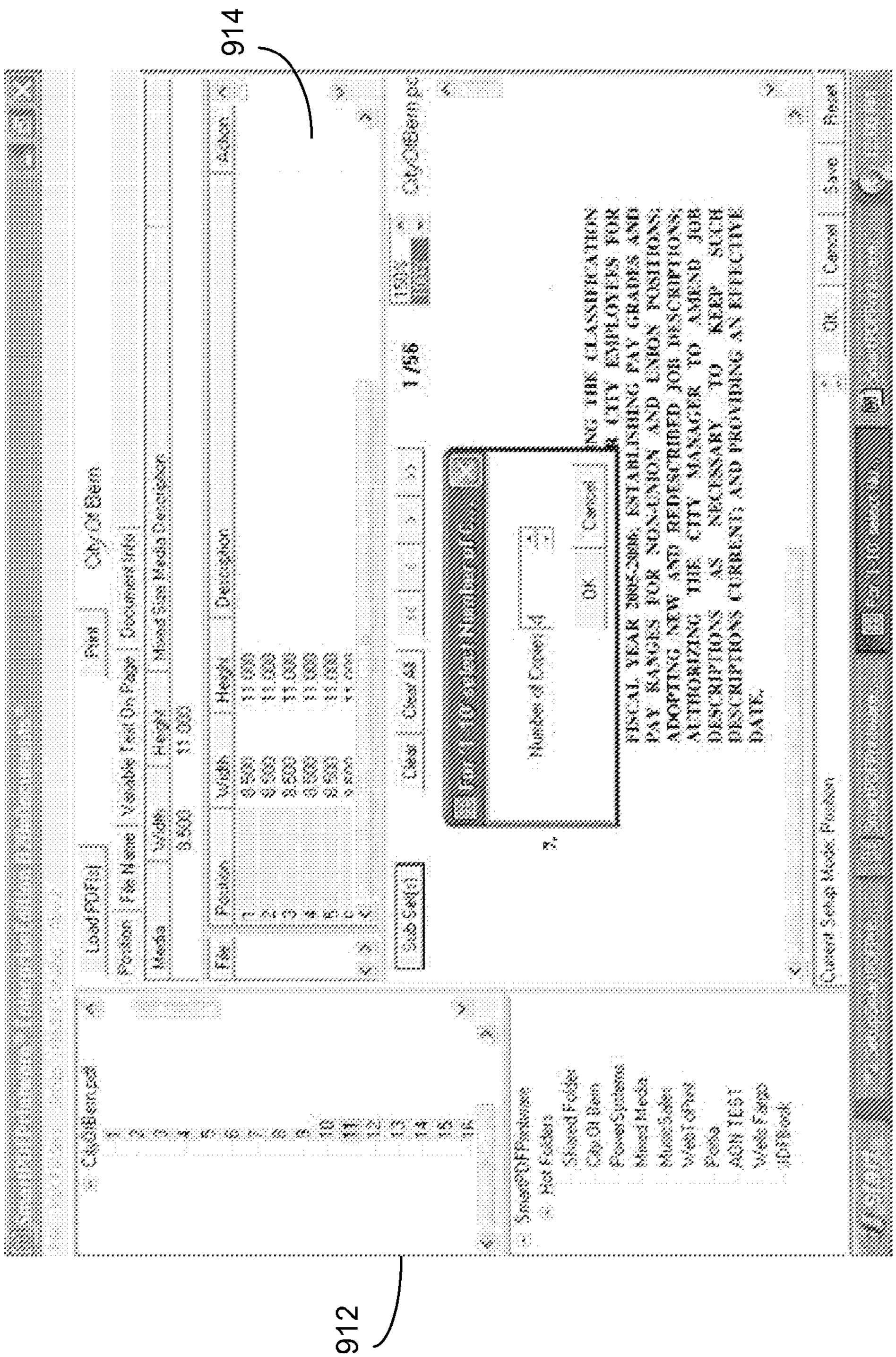
Figure 11C:
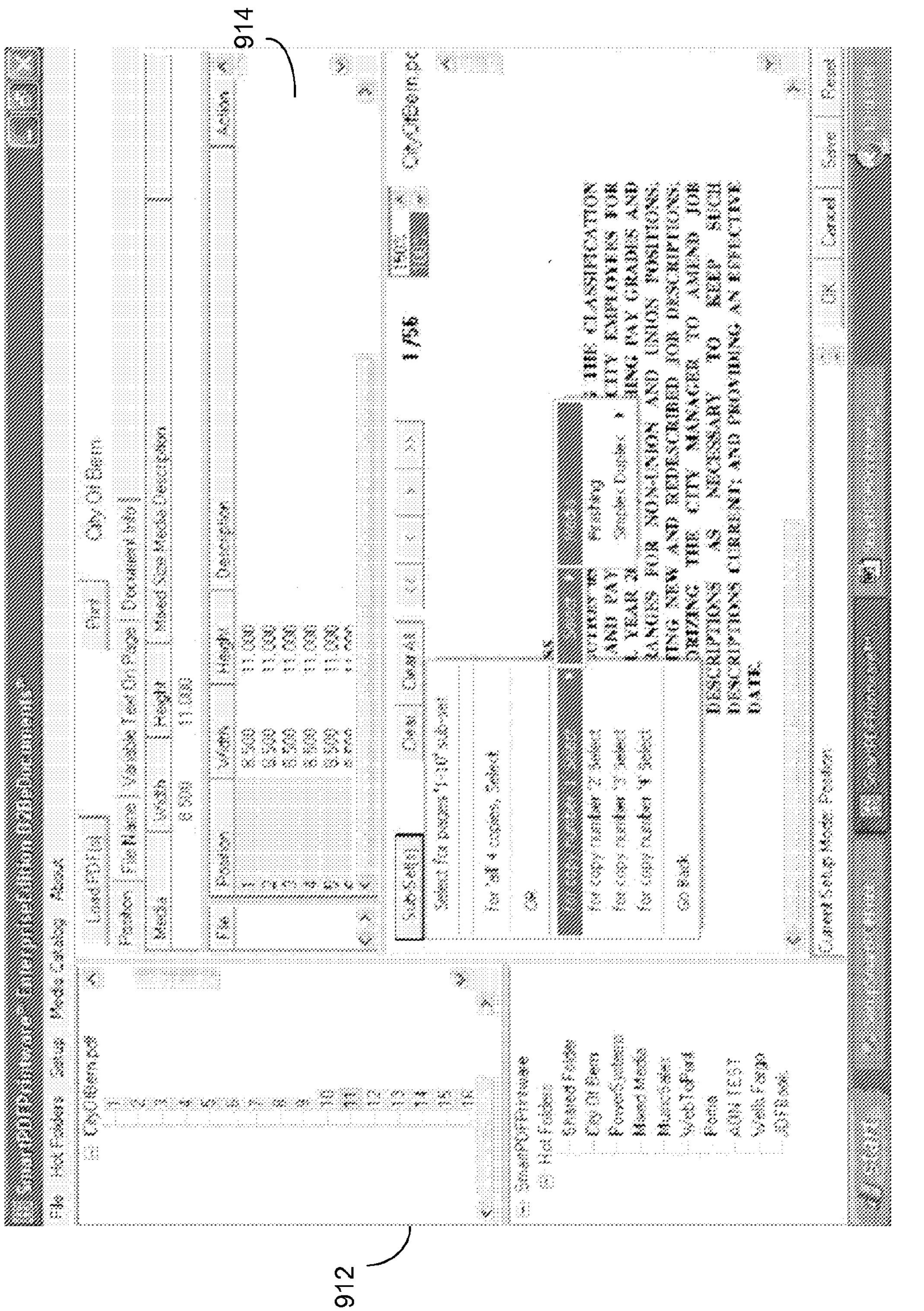
Figure 11D:
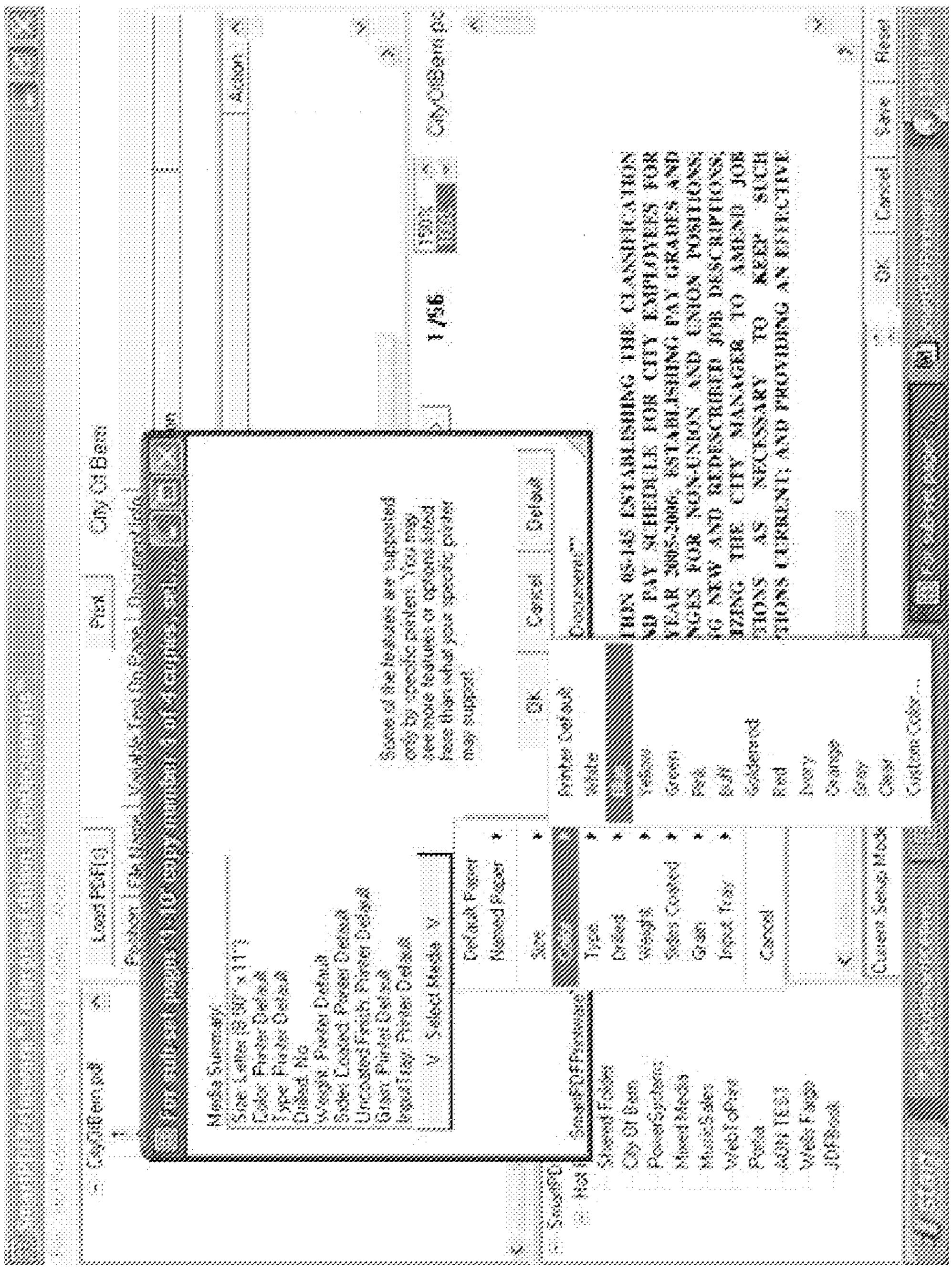

In addition to allowing users to define parameters relating to the media, finishing, and simplex/duplex process, an illustrative system also allows users to elect to print multiple copies of a subset of pages and to define separate printing and finishing parameters for each copy. As shown in FIG. 11A, the user may select from a pull down menu to print multiple copies of a particular subset of pages. The user is present ed with a pop-up window such as that shown in FIG. 11B and may then select the number of copies that is desired. Thereafter, and as depicted in FIG. 11C, the illustrative system allows users to select from a pull down menu to define the media or finishing characteristics, or whether to print in simplex or duplex for a particular one of the copies of the subset. An illustrative system allows the user to print each copy on a different media and to finish each copy with a different finishing such as stapling, punching, folding, or preparing a booklet. Thus, one copy of a subset may be printed on white media and be stapled, another copy may be printed on blue media and be folded, etc. FIG. 11D depicts an illustrative pop-up window that an illustrative system may present to the user for purposes of specifying the media characteristics for a particular subset of documents. After the user specifies the desired print and finishing parameters for a subset, those parameters or rules are displayed hierarchically under the particular subset in the hierarchical page listing shown in print job attribute panel 912.

Figure 11E:
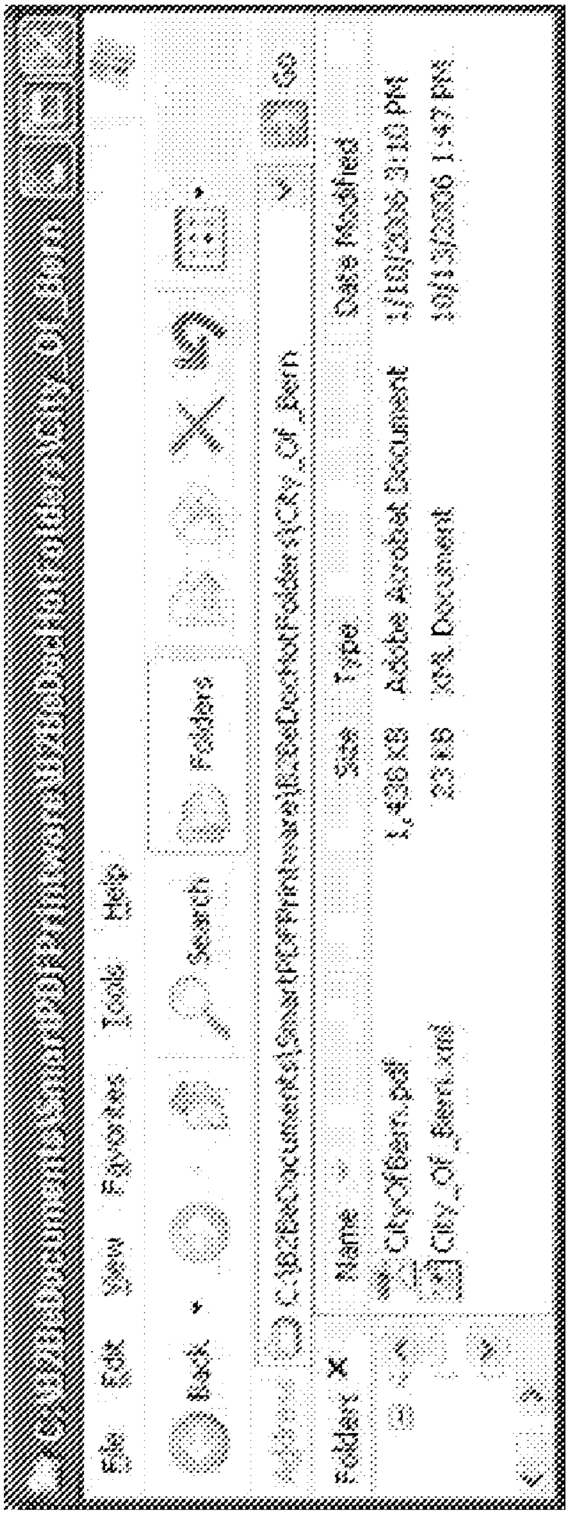

It should be noted that as the user specifies printing rules or parameters for a print job, the user's selections are stored for later retrieval and processing at the time of actual printing and finishing. In an illustrative embodiment, the user-specified parameters are saved to an XML file, which may be referred to as the print job rules file. The print job rules file may be stored in a print job folder along with the electronic files that are comprised in a print job. FIG. 11E is an illustrative depiction of a browser window showing a pdf file and a corresponding XML file located in a print job folder. As shown, in an illustrative example, the name of the XML file corresponds to that of the print job folder.

Figure 12A:
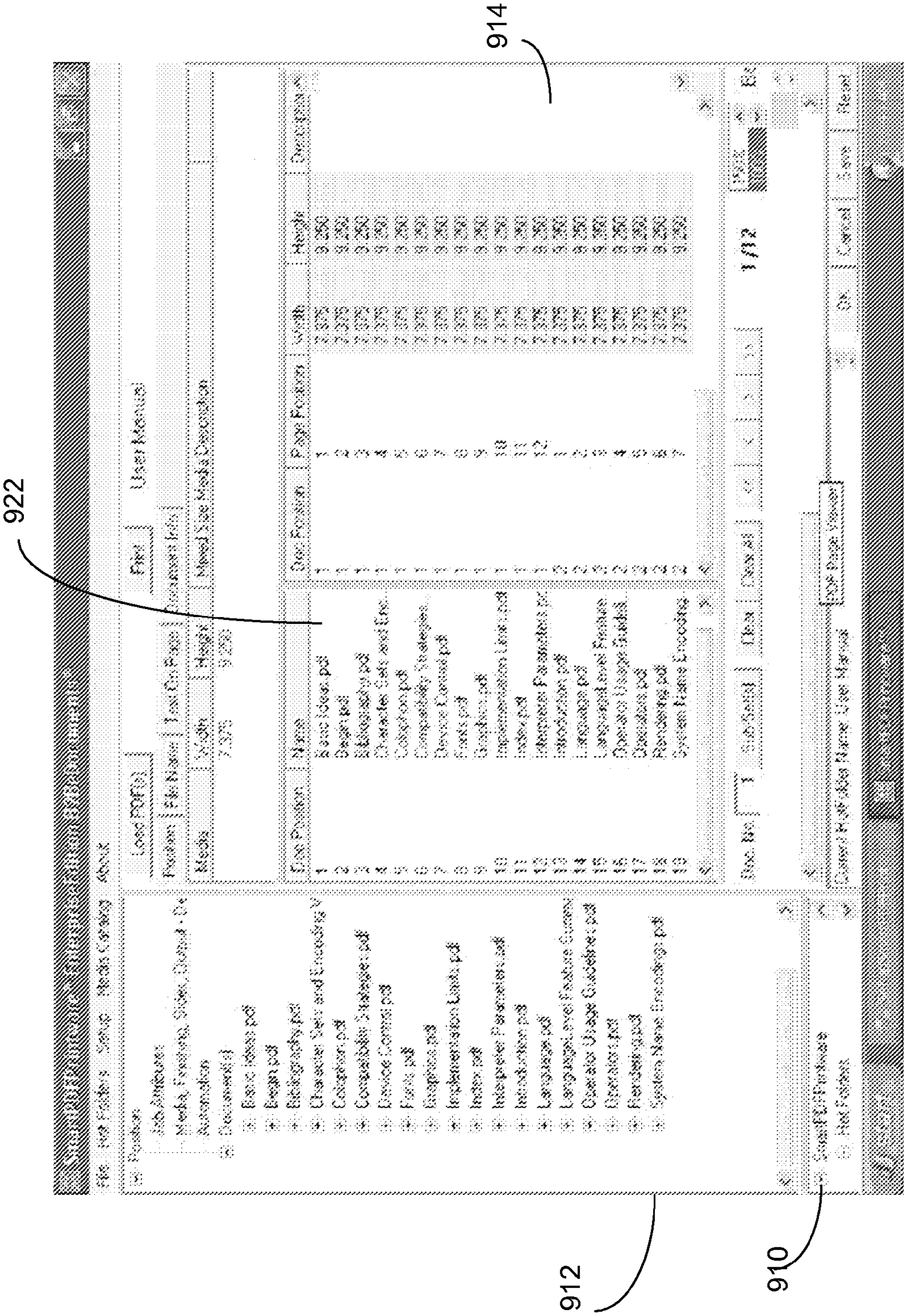
FIGS. 12A through 12G depict illustrative data screens that may be used in an exemplary system to define printing and finishing rules relating to the position of a document relative to others in a print job.
Figure 12B:
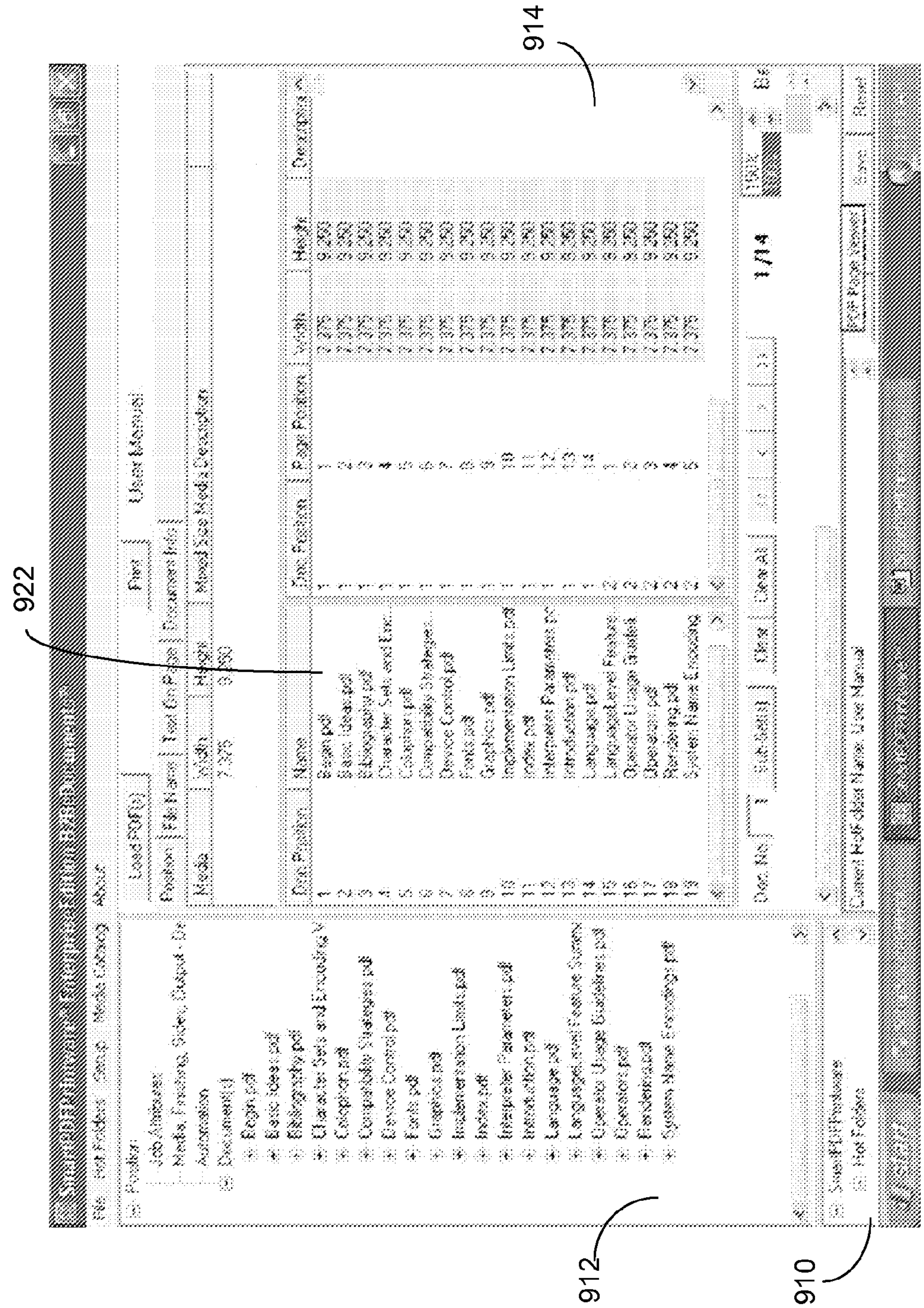
Figure 12C:
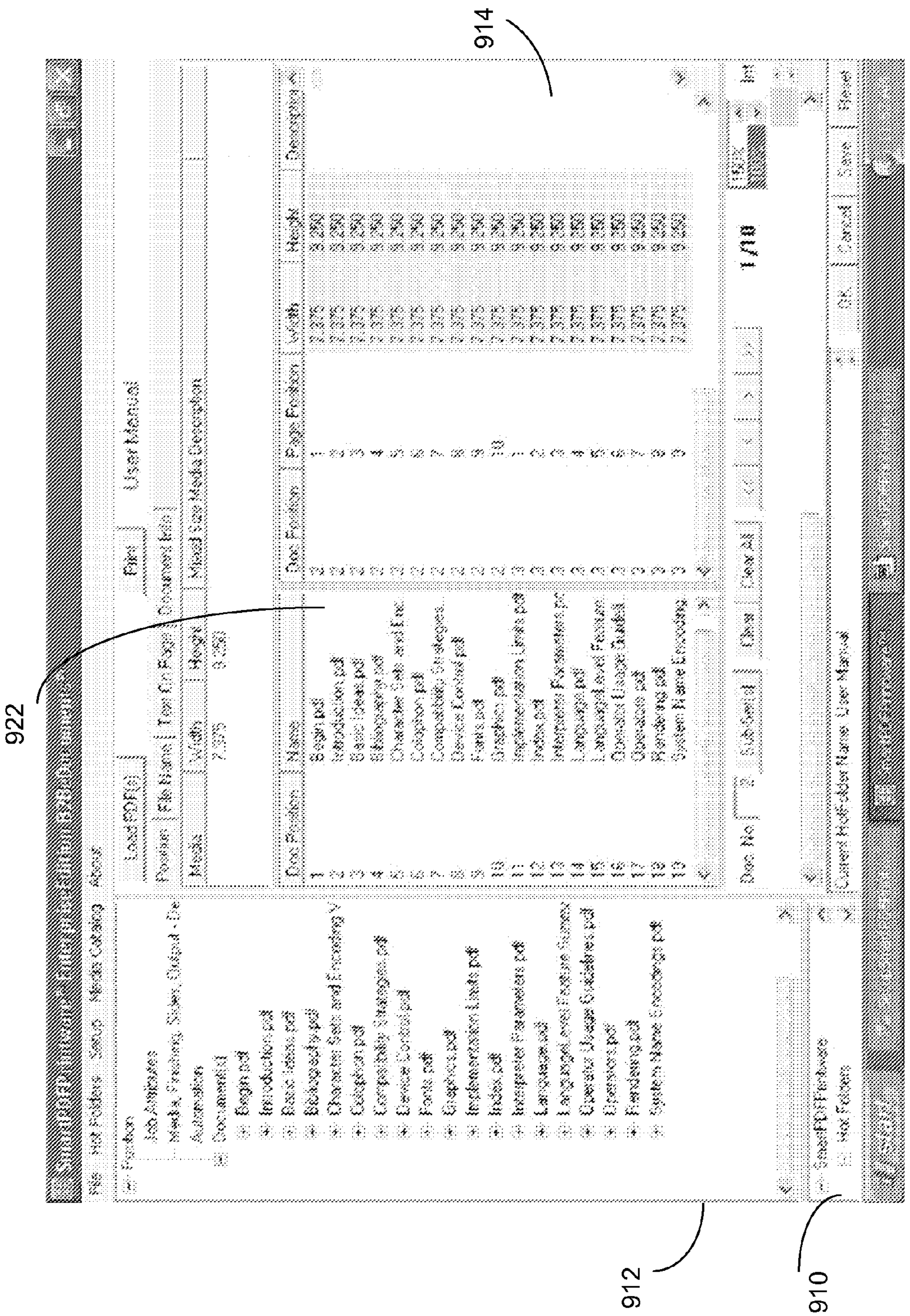

The position method of defining printing rules may involve not only the position of a page within a document, but also the position of a document relative to others in a print job. FIGS. 12A through 12F illustrate a use of the position of a document relative to others in the print job to control printing and finishing parameters. In FIG. 12A, a file listing panel 922 is positioned to the left of page position panel 914. The list of files in the panel corresponds to the order in which the files will be printed as part of the print job. In file listing panel 922 shown in FIG. 12A, a file titled “Begin.pdf” is listed second from the top. An illustrative system is adapted to allow a user with a pointing device to select a file in the list and drag it to a different position in the list. As illustrated in FIG. 12B, the file “Begin.pdf” has been dragged to the top of the list and therefore would be the first file to be printed as part of the particular print job. Similarly, as illustrated in FIG. 12C, the file “Introduction.pdf” has been dragged to the second position identifying it as the second document to be printed as part of the print job.

Figure 12D:
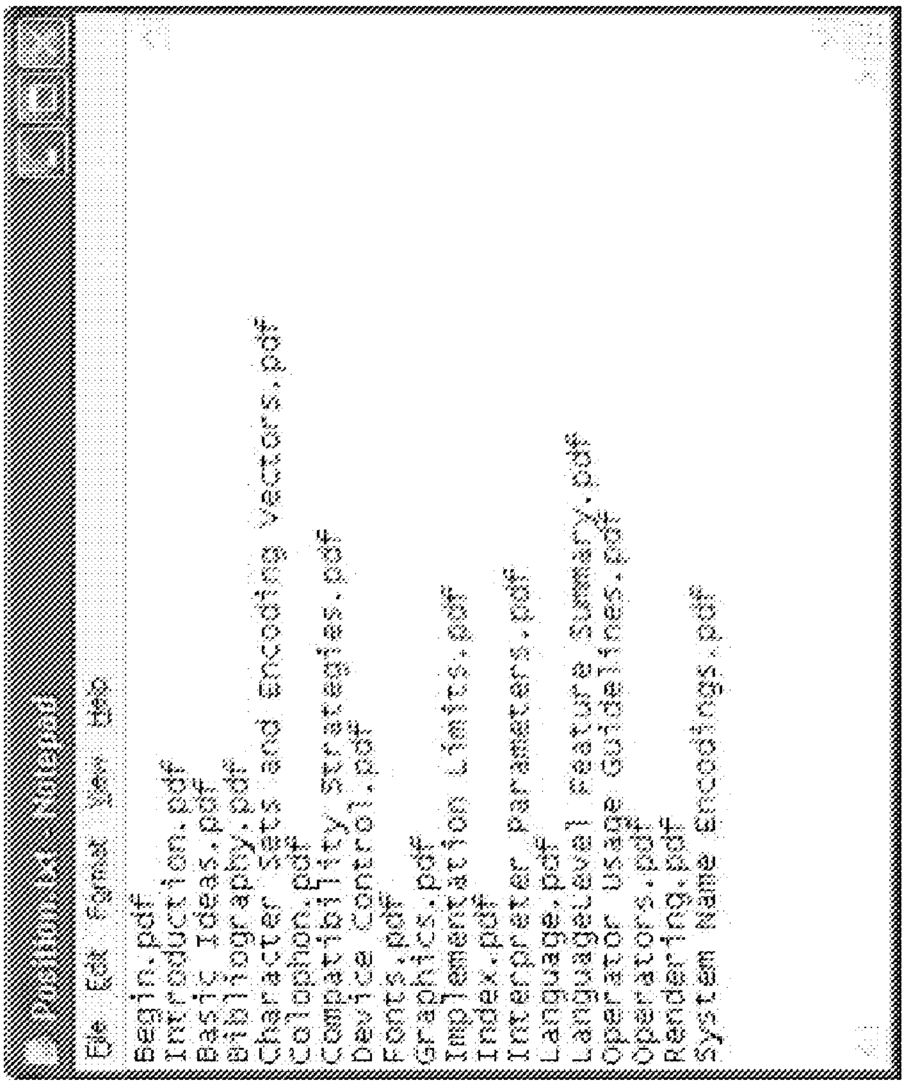

In an illustrative embodiment, the position of document files relative to others in the print job is stored in a file which may be, for example, a text file. The contents of an exemplary position file are shown in FIG. 12D. As shown, the text file “Position.txt” comprises a listing of the files in the order that was specified by the user. Upon opening a print job workflow in the position mode, an illustrative system reviews the print job folder for a position text file. If such a file is located in the directory, the illustrative system prompts the user as to whether or not he/she wishes to have the documents organized in the order set out in the document. If so, the documents are presented to the user in the prescribed relative order. Thereafter, any changes a user may make in the order of the documents are stored in the position.txt file located in the print job work folder.

Figure 12E:
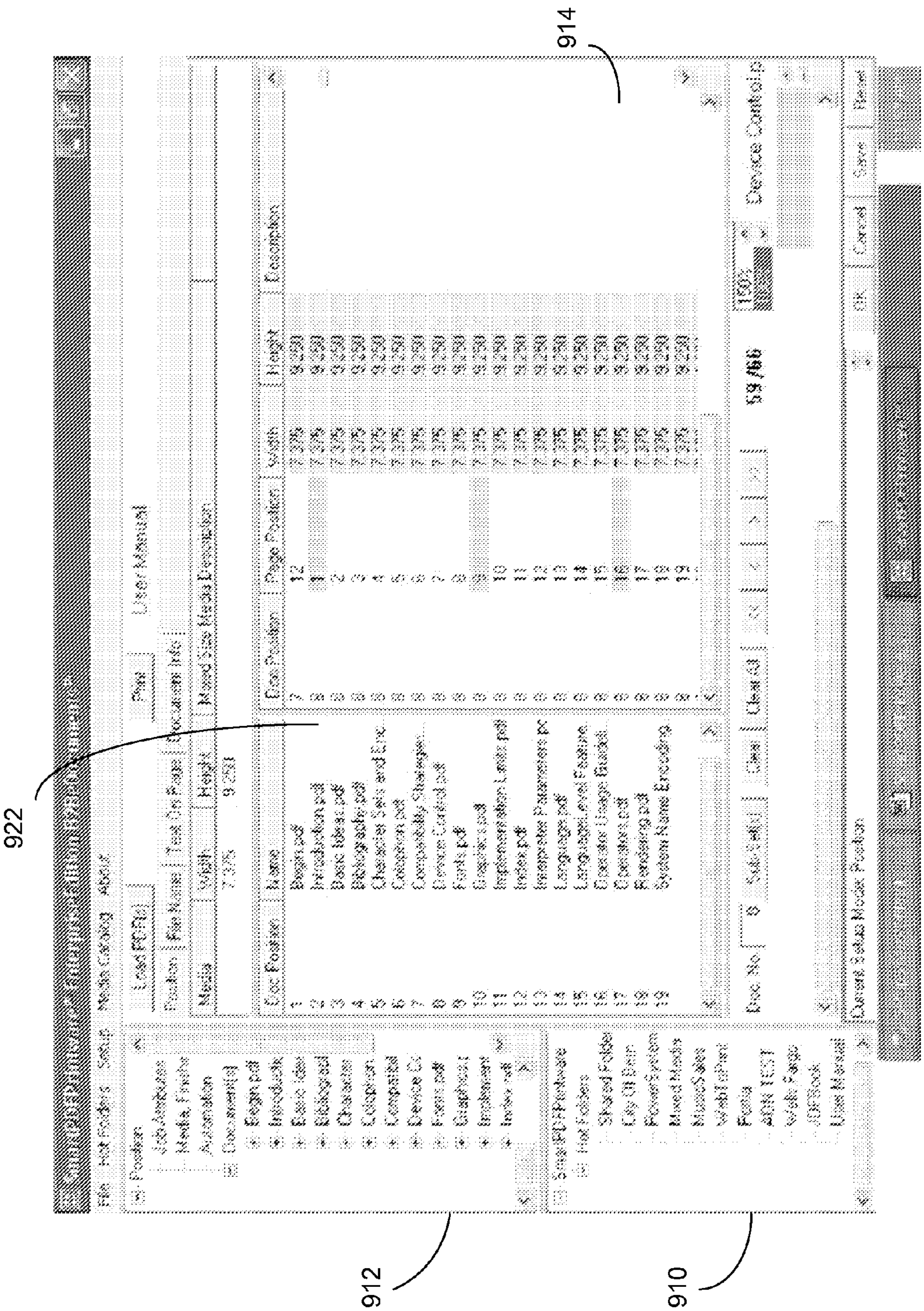
Figure 12F:
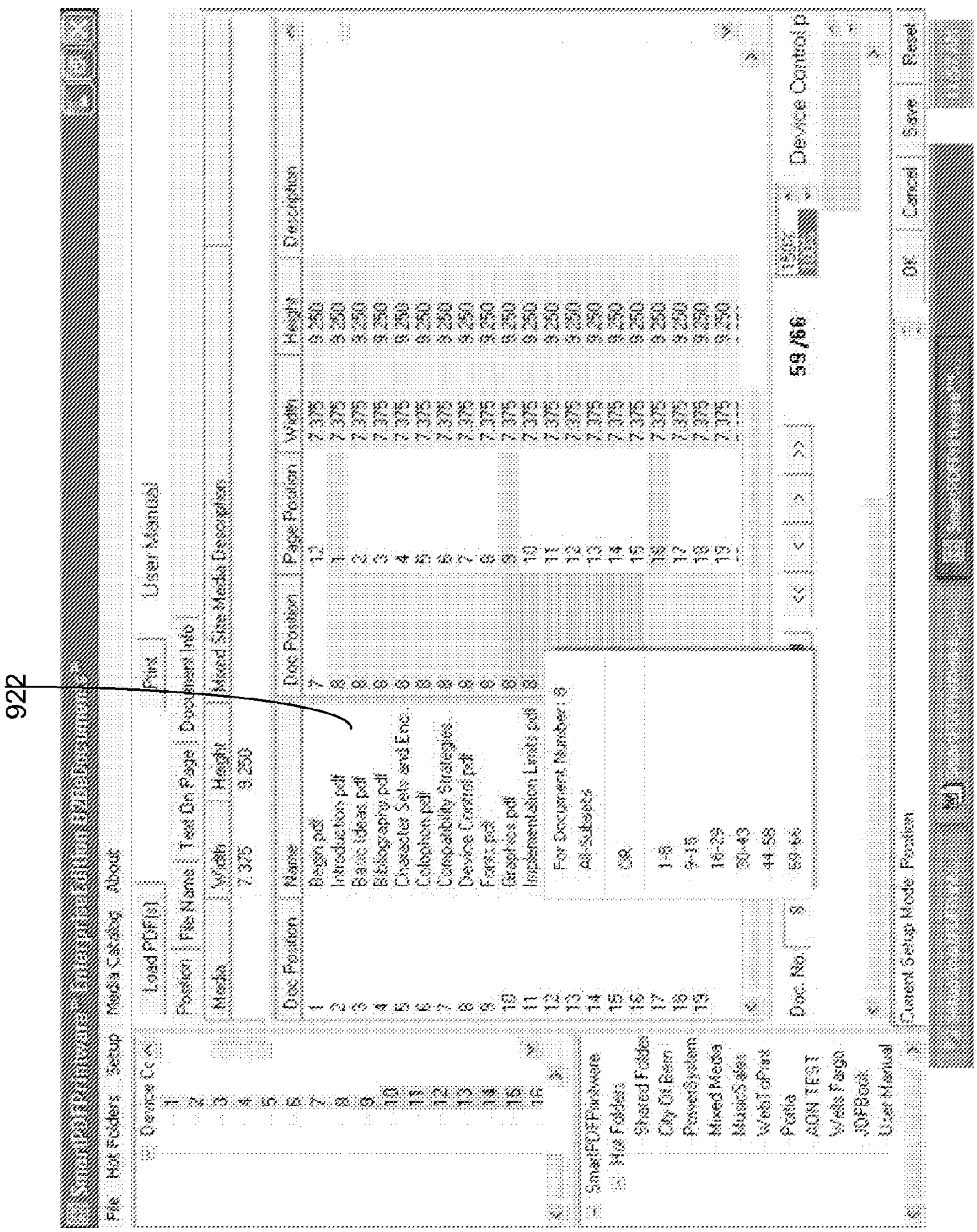

The previously described capabilities with respect to defining subsets and printing parameters relating to those subsets applies as well to situations wherein the order of printing is controlled by the relative positioning of documents. Thus, as illustrated in FIGS. 12E and 12F, upon selection of a document in document listing panel 922, a user may define subsets relating to the selected document and set parameters for the subsets using the techniques as discussed above in connection with FIGS. 10 and 11. In the particular example of FIGS. 12E and 12F, document number 8 has been selected, allowing the user to specify subsets relating to the pages comprised in that document.

Figure 12G:
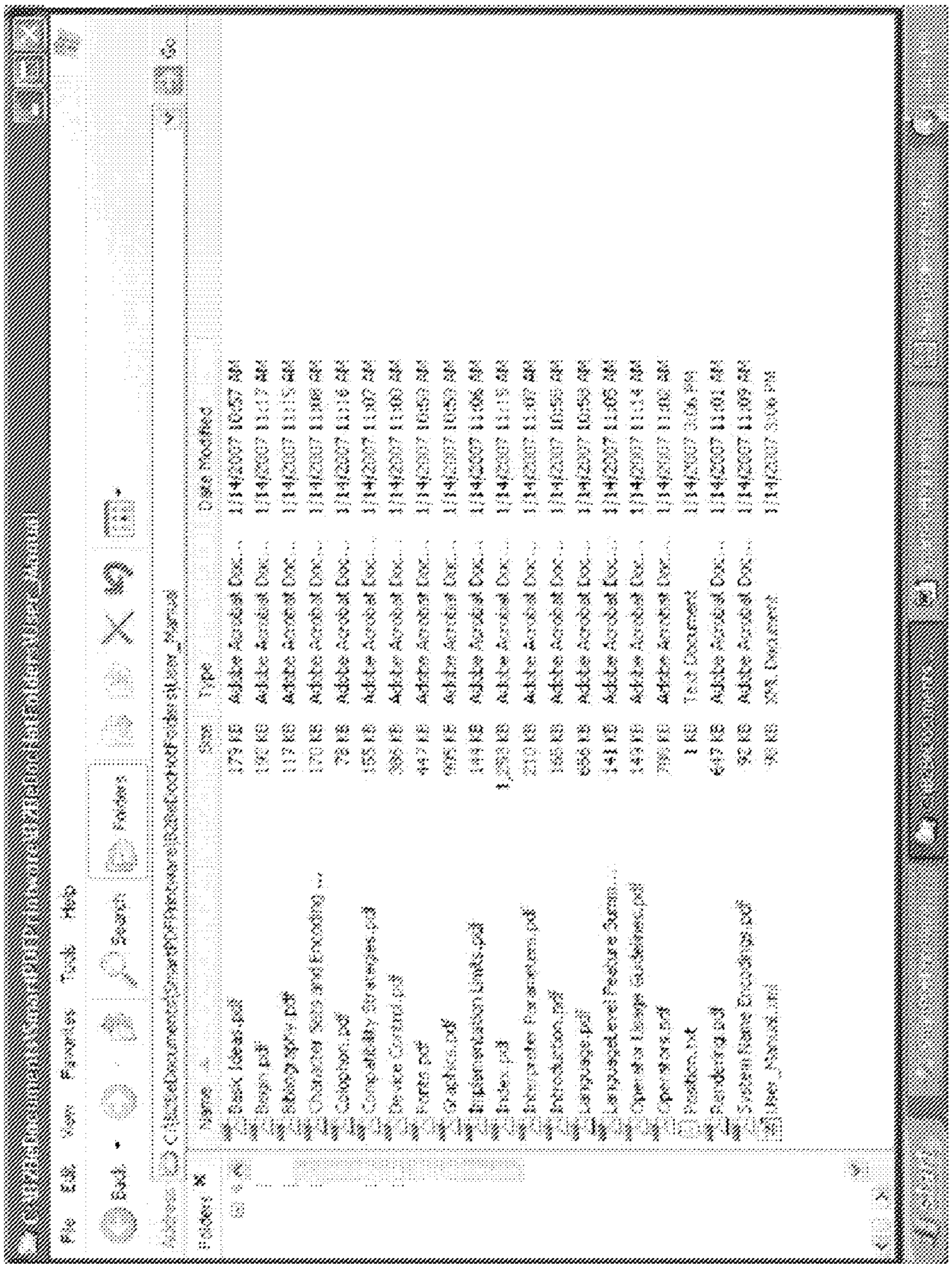

Thus, the illustrative system allows users to specify printing parameters by controlling the position of documents relative to other documents, and also to control printing parameters relating to subsets within those documents. The user defined printing and finishing parameters are stored in one or more files for later retrieval and amendment or for use in printing. Similarly, the position of a file relative to others is likewise stored for later retrieval and for use in printing and finishing. An illustrative screen depicting the contents of a print job folder is depicted in FIG. 12G. As shown, the folder contains both a position.txt file for storing the relative position of files and a XML file for storing the remainder printing and finishing parameters.

Another feature of an illustrative system that applies in both the "position" mode and "file name" mode of defining print and finish rules for a print job is the ability for users to specify and define a first media type to be the "normal" or default type for printing of a print job. Likewise, a user may specify and define additional media types as "exceptions" to the normal media values. Still further, the system allows users to specify media types on a per-page basis to deviate from any "normal" and "exception" media pages that have been defined.

In an illustrative system, upon receiving an indication from the operator that he/she wishes to define the printing and finishing parameters for a print job using the position of the pages, the system automatically scans the documents in the print job to identify the various page sizes that exist in the documents. The illustrative system may then list the page sizes in the documents and allow the user to specify whether the particular page size should be associated with a specific media.

Figure 13A:
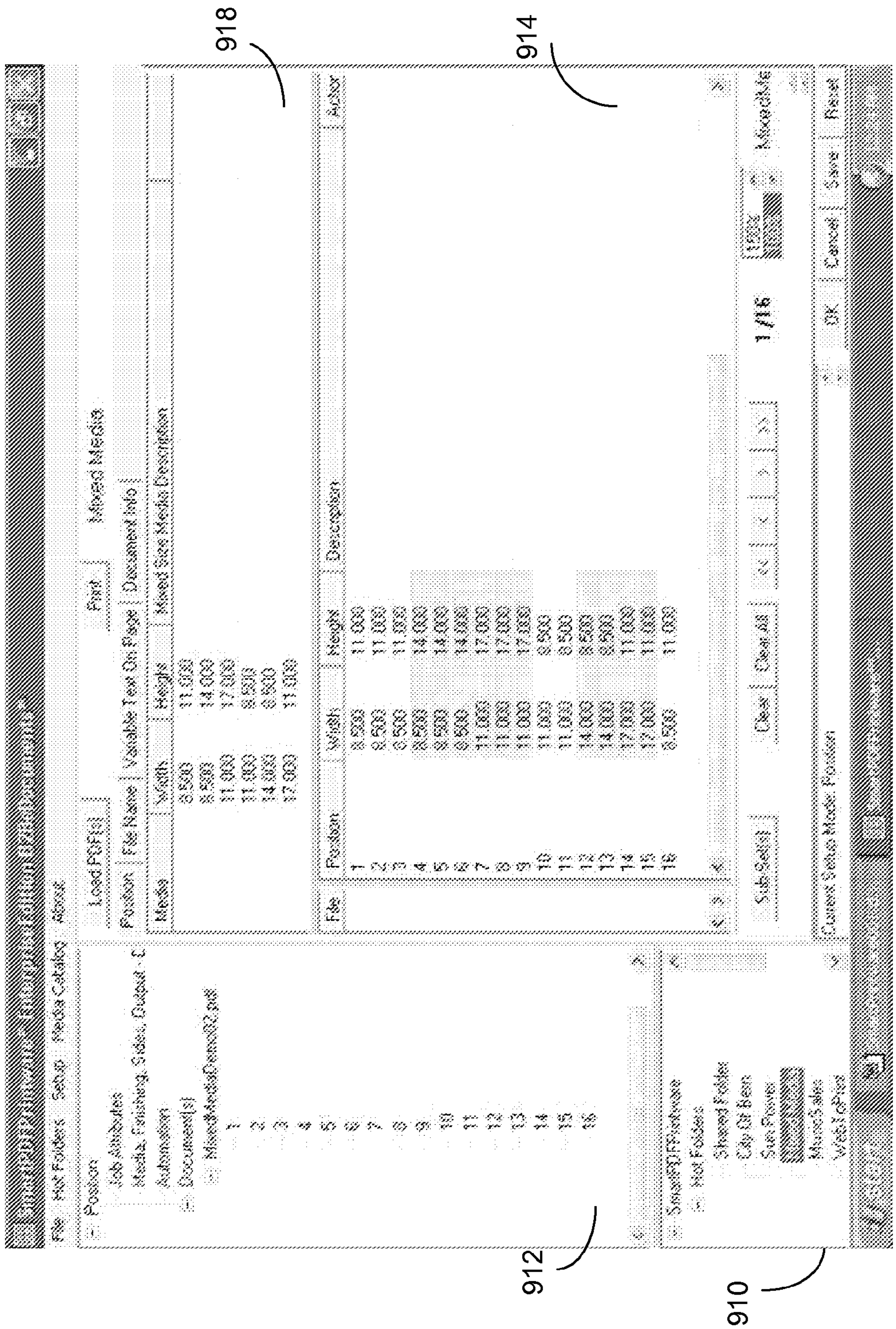
FIGS. 13A through 13H depict illustrative data screens that may be used in an exemplary system to define printing and finishing rules relating to page sizes comprised in a print job.
Figure 13B:
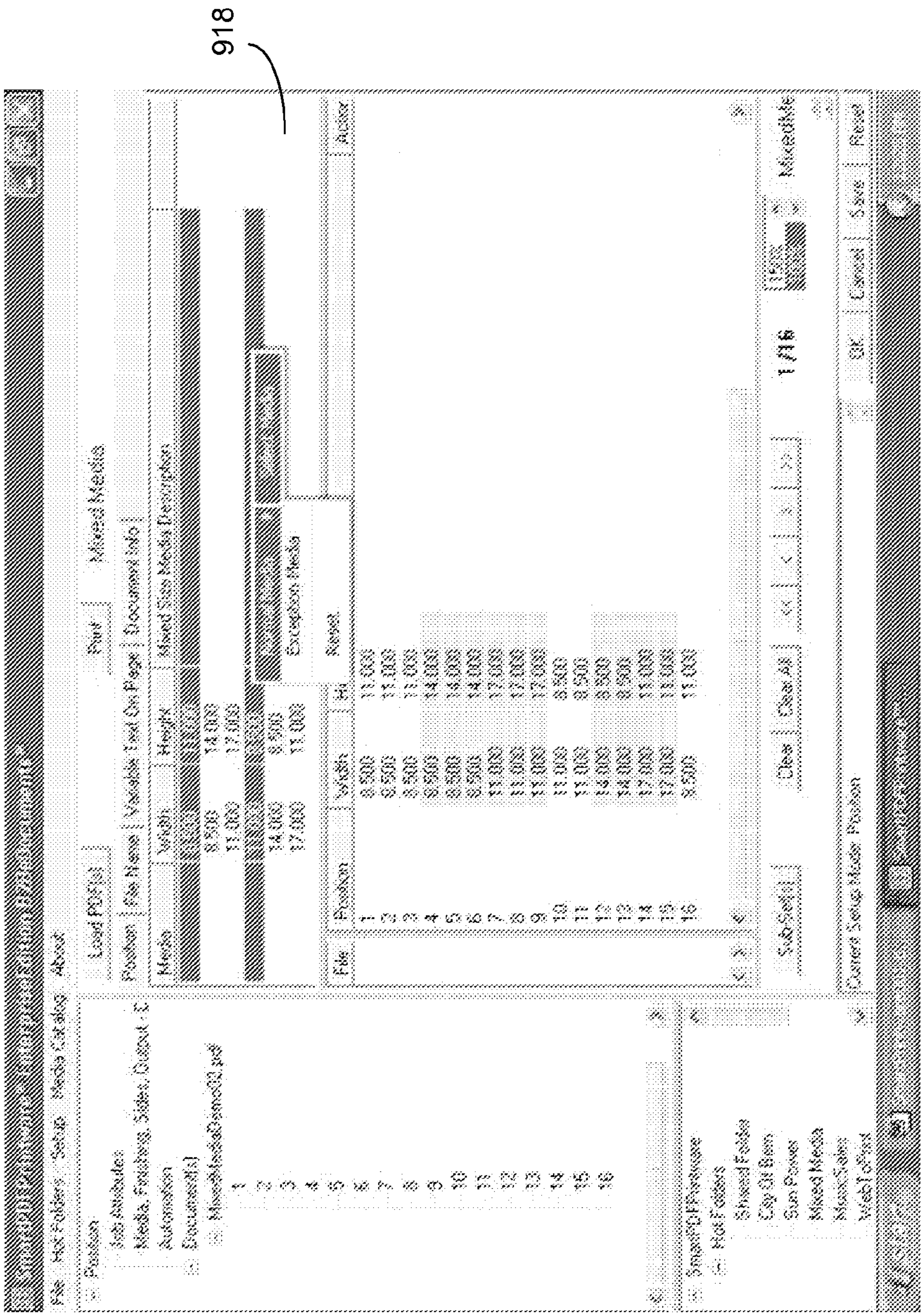
Figure 13C:
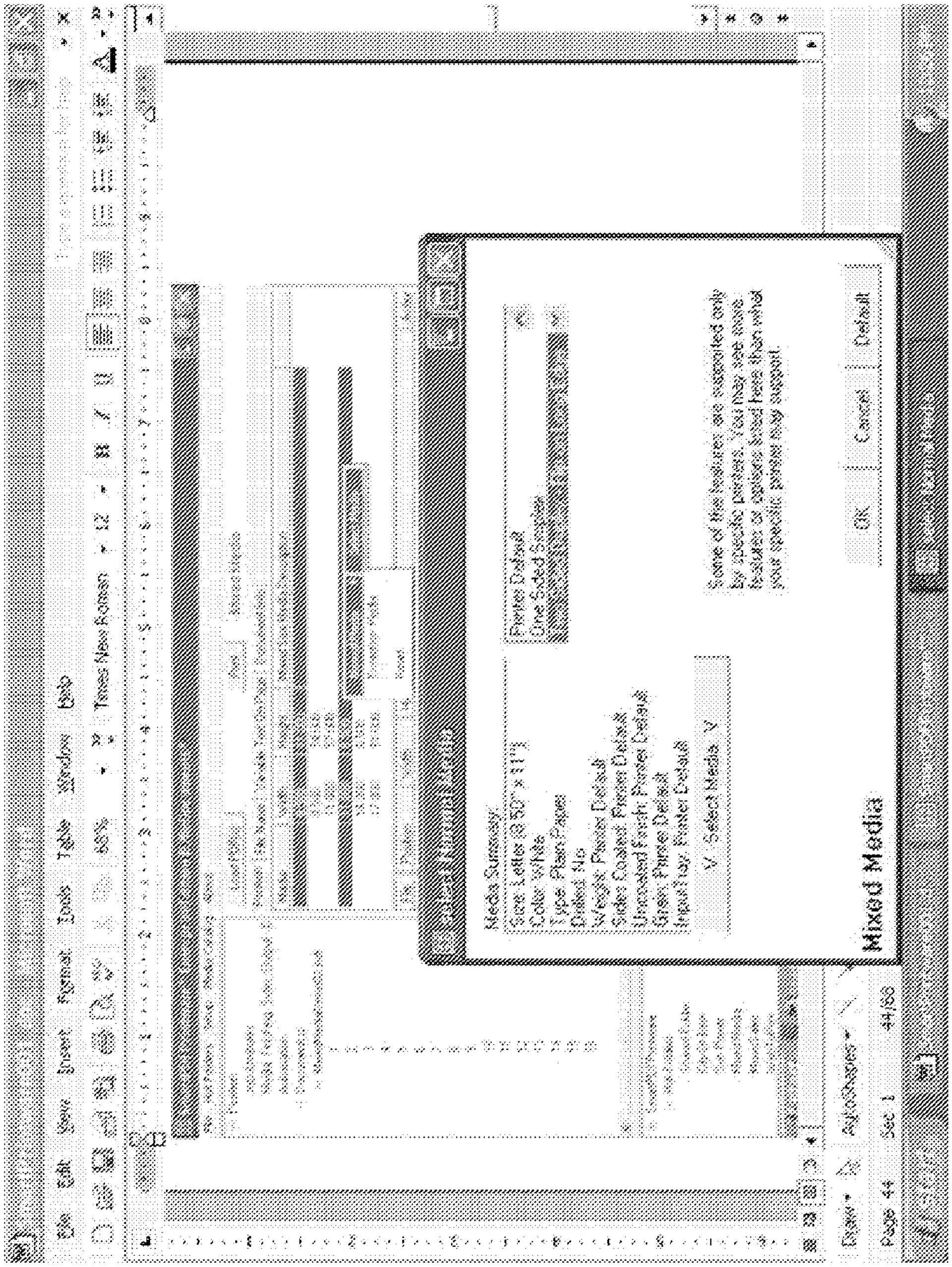
Figure 13D:
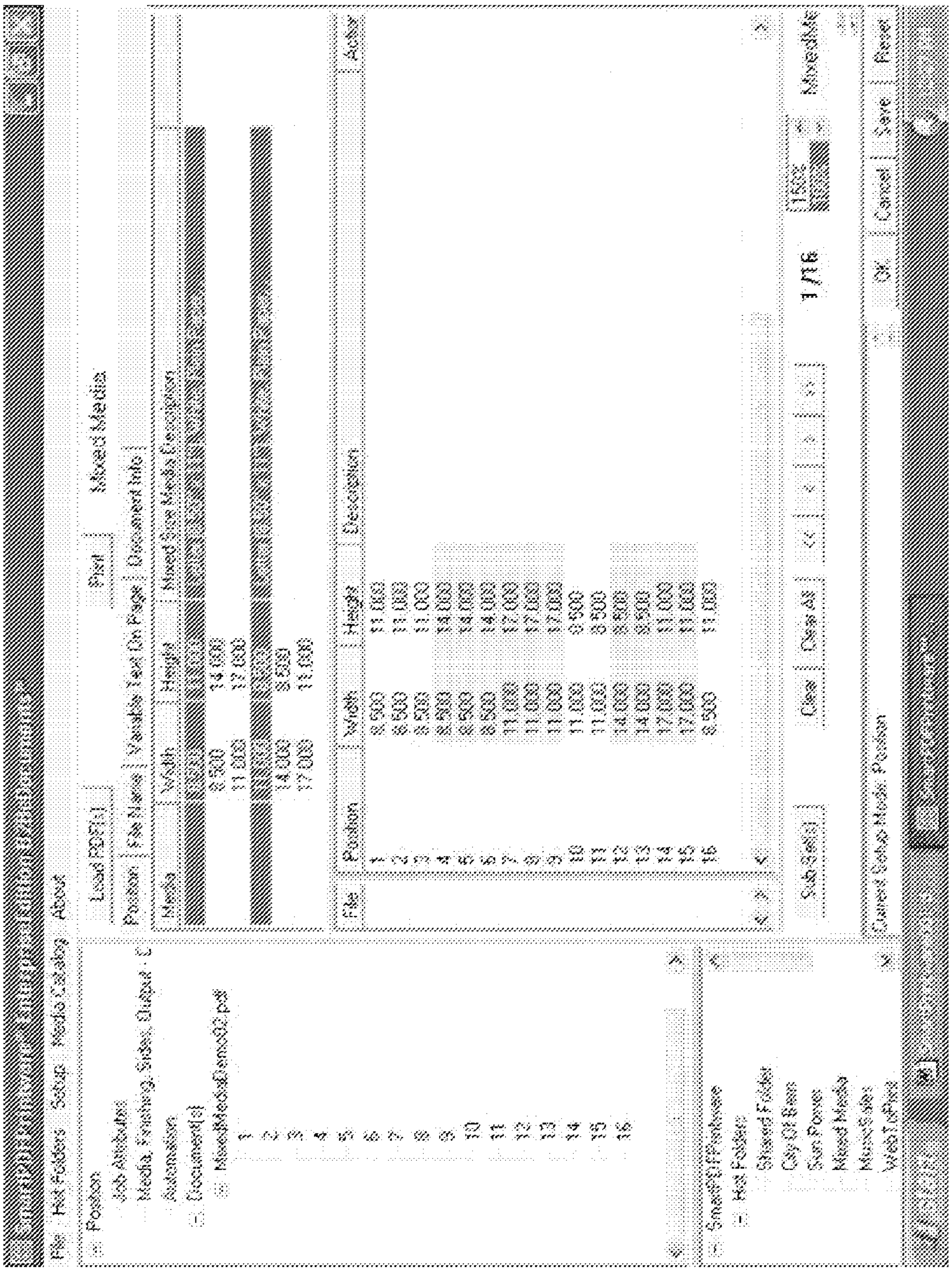

An illustrative user interface screen is depicted in FIG. 13A. As shown, the system lists the unique page sizes that were identified in the document. In particular the various page sizes for the document are listed in mixed media size panel 918. As shown in FIG. 13B, the system is adapted to allow for a user to select a particular page size in panel 918 and generate a pop-up window in which the user may select a media type to associate with the particular page size. In the exemplary screen, the user has selected the page size 8.5 by 11 inches and indicated in the menu that he/she wishes to identify the selected page size as being associated with a particular media, and in particular the "normal" or default media for the document. In response, the system presents the user with a user interface screen such as that depicted in FIG. 13C upon which the user may identify the characteristics of the media to be associated with the page size. After receiving the user's inputs specifying the particular media, the system updates the original user interface to reflect the user's inputs as reflected in illustrative user interface of FIG. 13D.

Figure 13E:
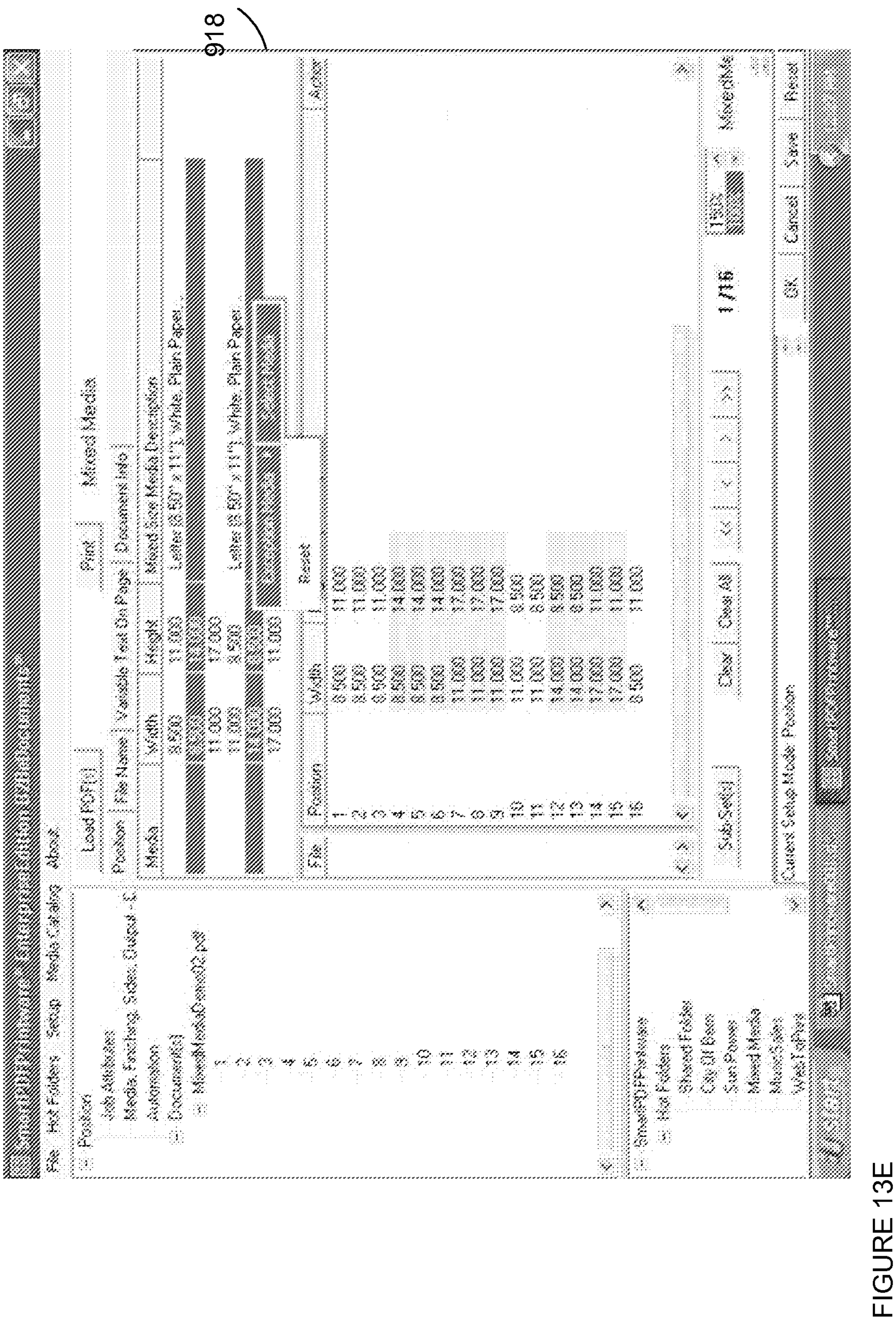
Figure 13F:
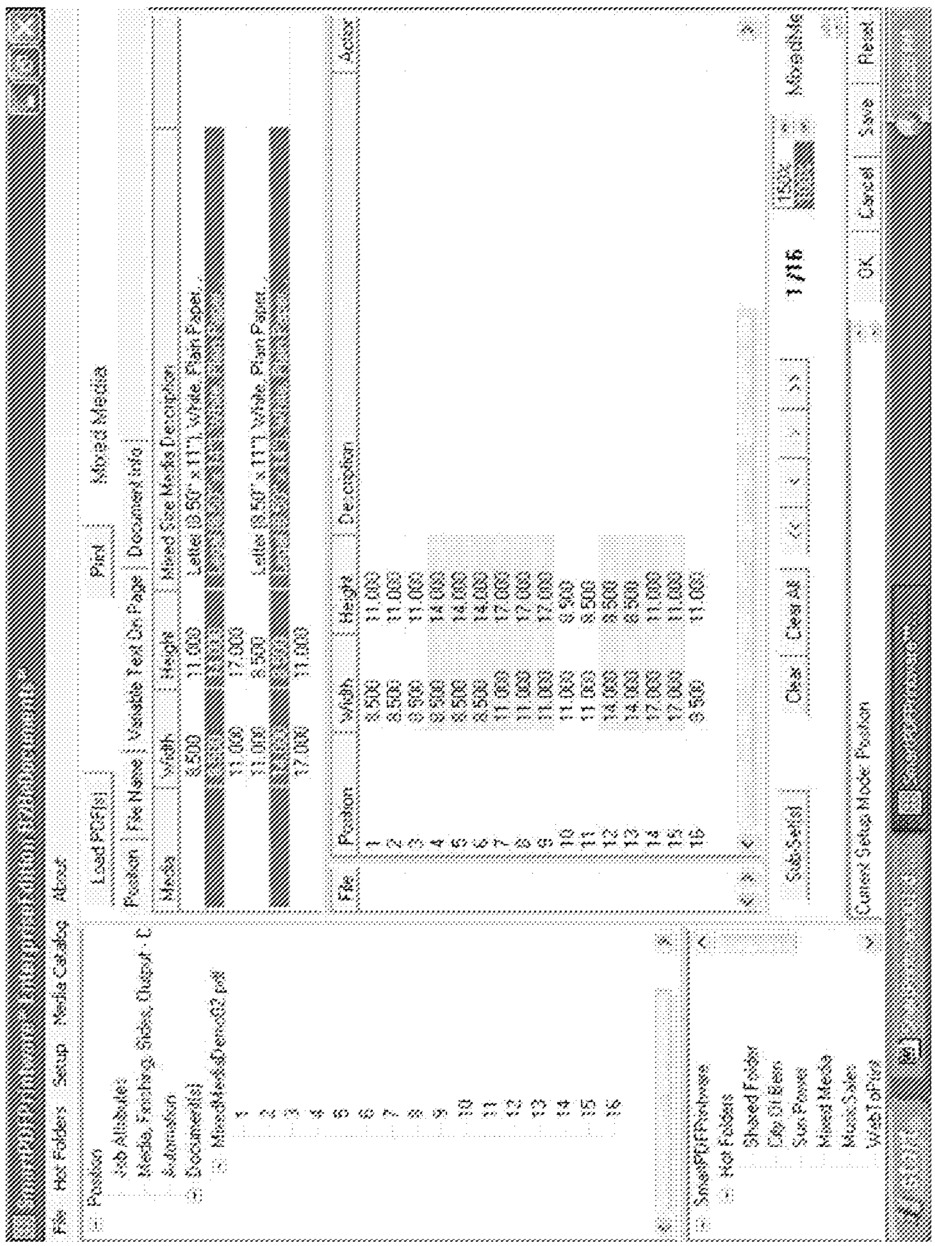

The system provides for the user to associate media types with others of the page sizes that have been identified in the document as shown in FIG. 13E. The selections of a media type other than the "normal" media type may be referred to as "exception" media types. FIG. 13F illustrates that after receiving the user's inputs specifying the particular media, the system updates the original user interface to reflect the user's inputs.

Figure 13G:
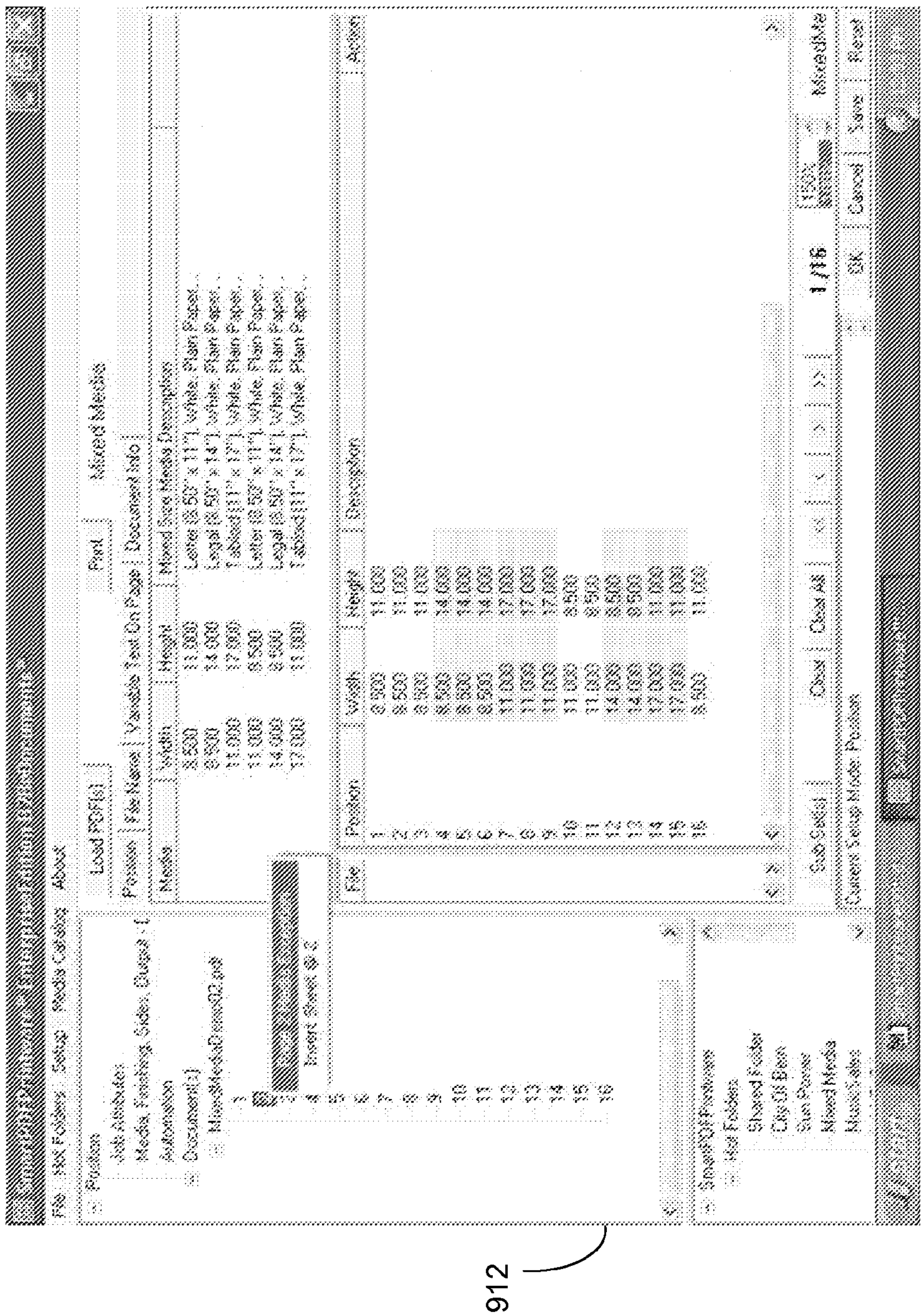
Figure 13H:
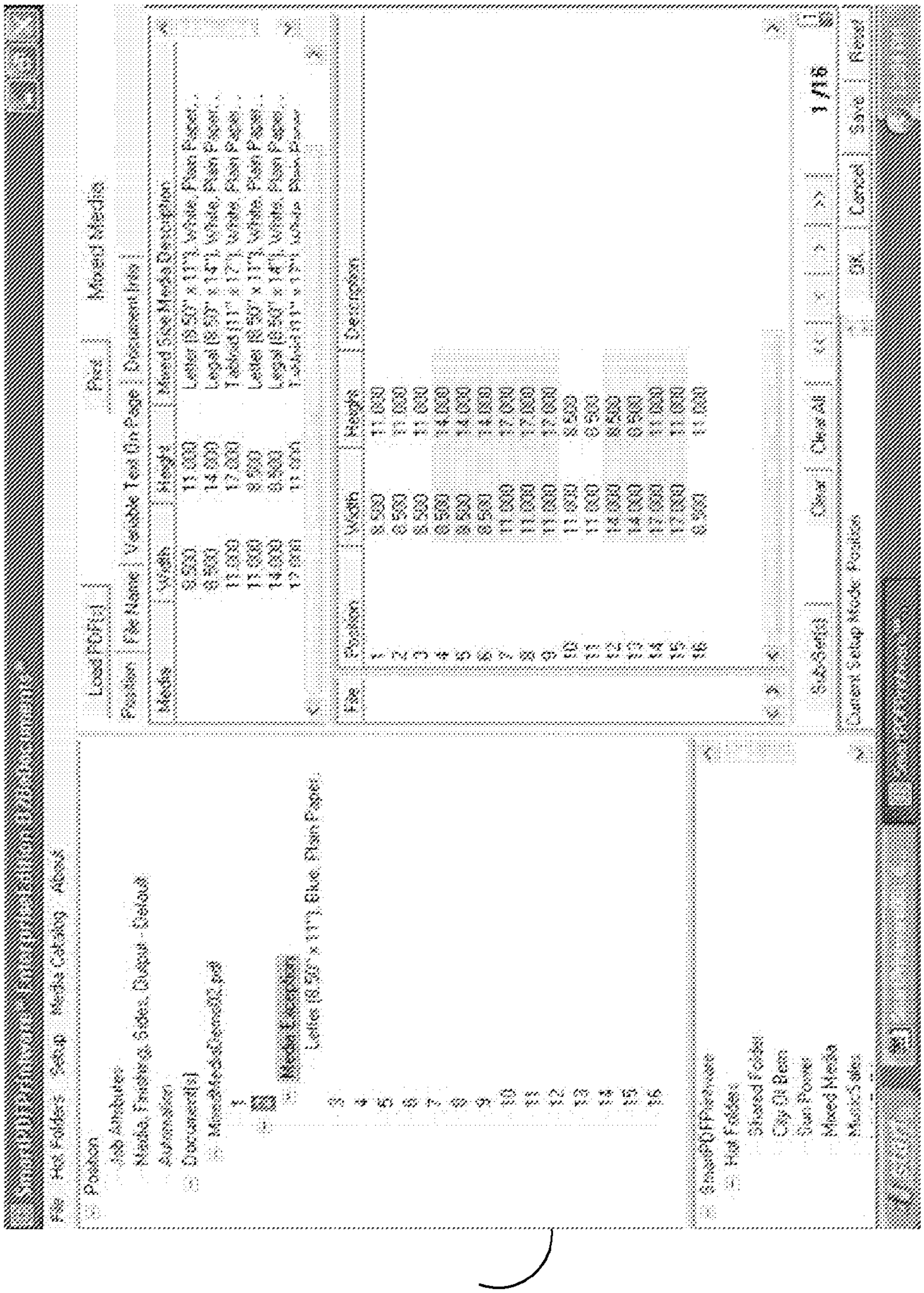

According to another feature of the illustrative systems and methods, the user may specify printing and finishing parameters for individual pages in the document. As depicted in FIG. 13G, the system allows a user to select a particular page in the print job attribute panel 912 and via a pop-up window select to either specify a media type to associate with the page or to insert a slip sheet. A user that selects to associate a particular media type can do so via a pop-up window similar to those discussed above. Selections by the user to associate specific printing parameters with particular documents are reflected in the print job attribute panel 912 as illustrated in FIG. 13H. As shown in the illustrative example, a hierarchical entry below page 2 indicates a user has specified a particular media type to be associated with page 2.

Thus, an illustrative system provides a user interface that allows the user to define printing and finishing rules for a print job. The system allows users to define printing and finishing options for a print job including whether and how to: group and concatenate documents; split documents into subsets; control the sequence of printing of documents/pages in a print job; select and identify a normal media; select and identify an exception media; identify page level override of the normal media; identify finishing parameters including document level, subset level, and group level finishing; select simplex or duplex printing at the document, subset, and/or group levels; insert tabs between pages and documents; print on tabs; insert sheets between pages and documents; insert covers at desired locations in a print job.

Figure 14:
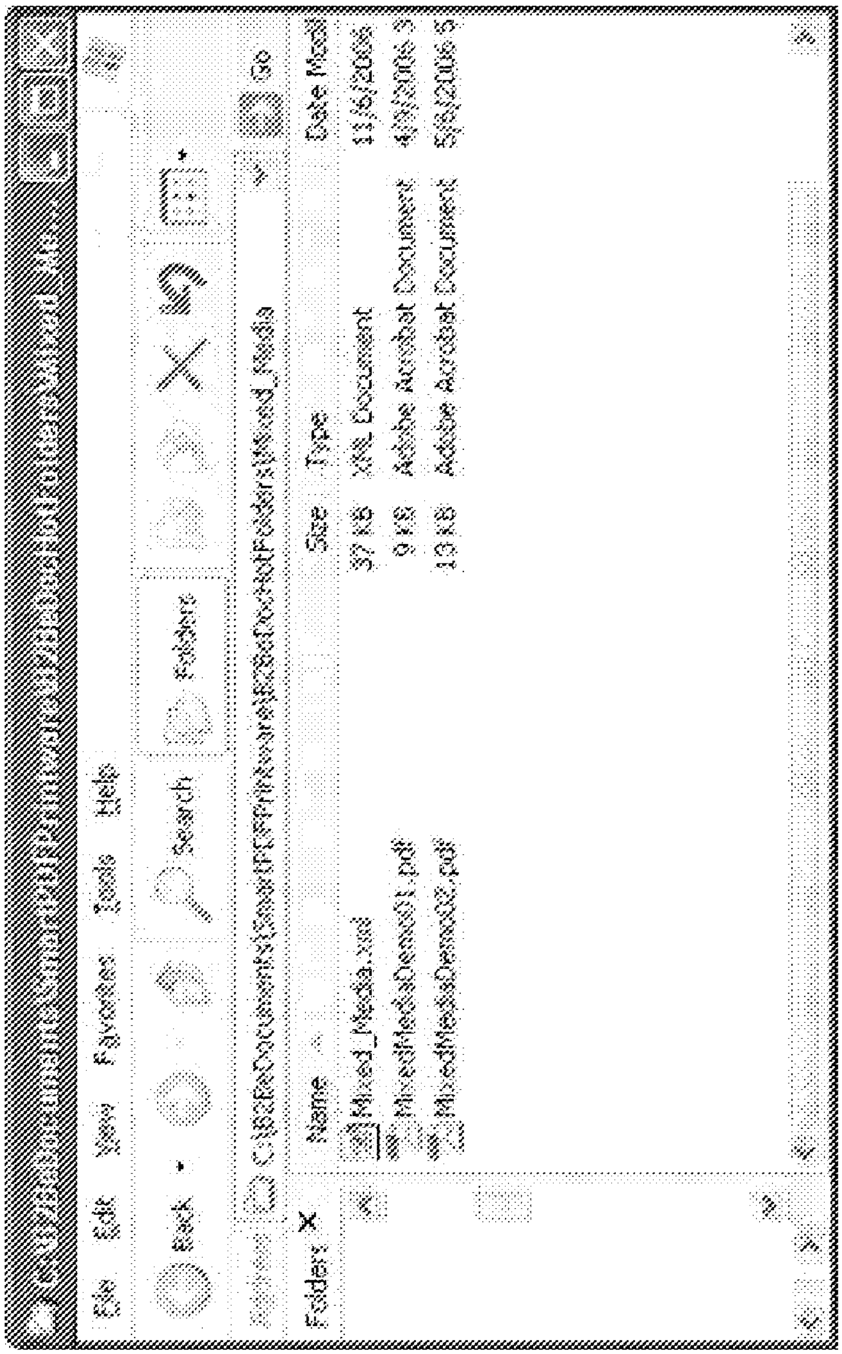
FIG. 14 depicts an illustrative data screen that may be used in an exemplary system to display the contents of a print job folder.

All printing and finishing attributes that are defined by the user are stored for later retrieval. Thus, associations between page sizes and media types are stored for later retrieval. Likewise, associations between particular pages and media types or insertions sheets are stored for later retrieval. In an illustrative embodiment, any such associations may be stored in an XML file as discussed above with other of the user identified printing and finishing parameters. In an illustrative embodiment, the XML file may be referred to as the print job rules file. FIG. 14 illustrates a browser screen illustrating that an XML file with user-defined printing parameters may be stored in a print job folder with the relevant files.

Figure 15A:
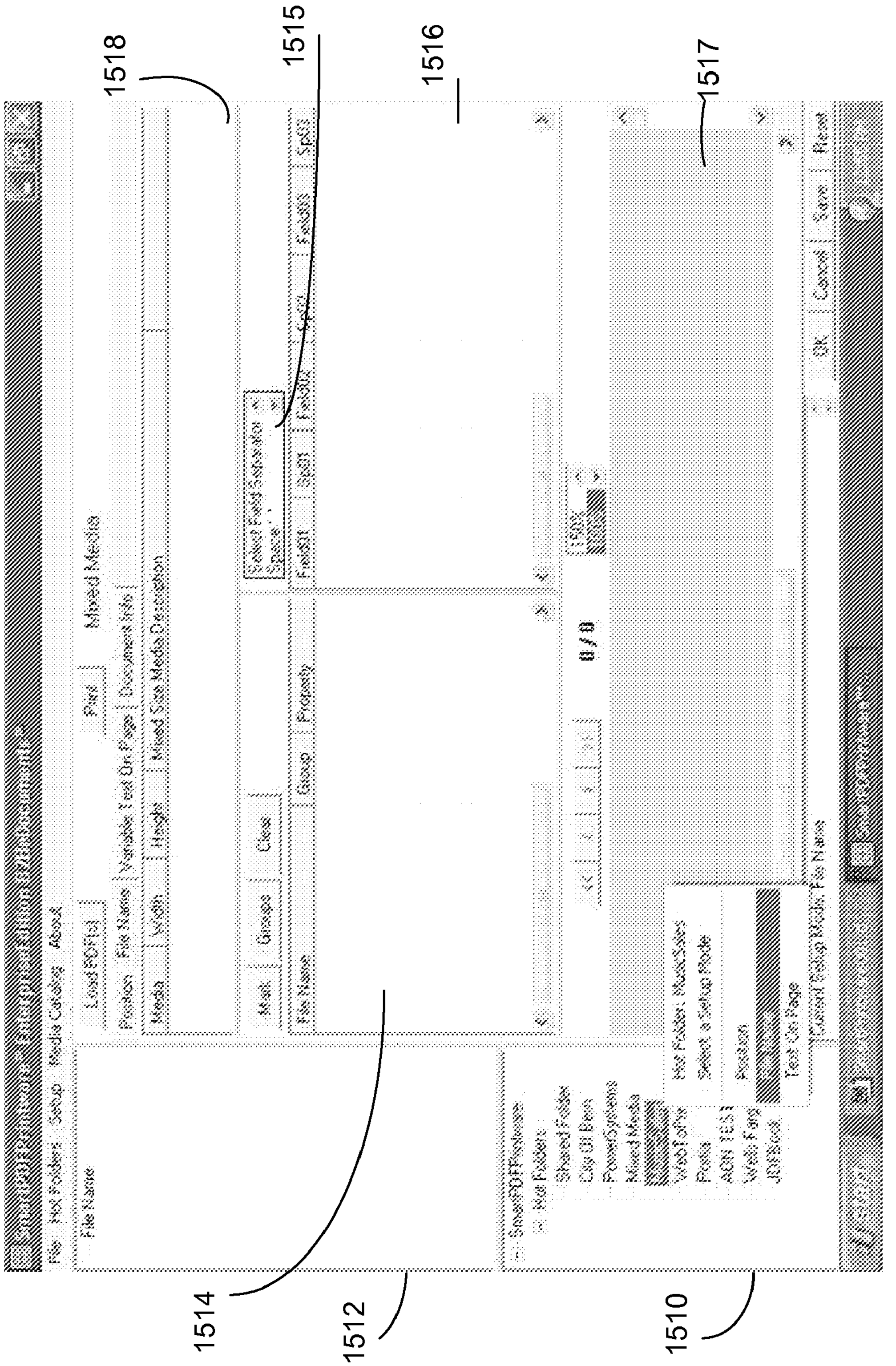
FIGS. 15A through 15I depict illustrative data screens that may be used in an exemplary system to define print rules for a print job using the values of fields in file names.

FIG. 15A provides an illustrative user interface screen that may be used to define print and finishing rules for a print job using the names of the files in the print job. A basic premise of the operation of the illustrative system is that the alpha-numeric values of fields in the name of a file may be used to dictate printing and finishing parameters. A user is able to specify print and finishing attributes by the value of fields in the file names. The values of any one particular field may be defined to dictate a particular printing and finishing parameter. Each field in the file name is comprised of at least one, and typically a plurality of, alpha-numeric characters.

As shown in FIG. 15A, the illustrative screen comprises a folder panel 1510 in which the folders used to hold print jobs are displayed. The folders may correspond to print jobs that have previously been defined as well as new folders that still require user input to specify printing rules. A user may select a particular folder in panel 1510 with a pointing device and thereafter specify using a pull-down menu whether it is desired to identify the print parameters for the print job by position, file name, or text-on-page. In the particular example depicted in FIG. 15A, the user has selected the folder titled "MusicSales" and has selected via the pull down menu to define the print parameters for the print job via the file name.

Figure 15B:
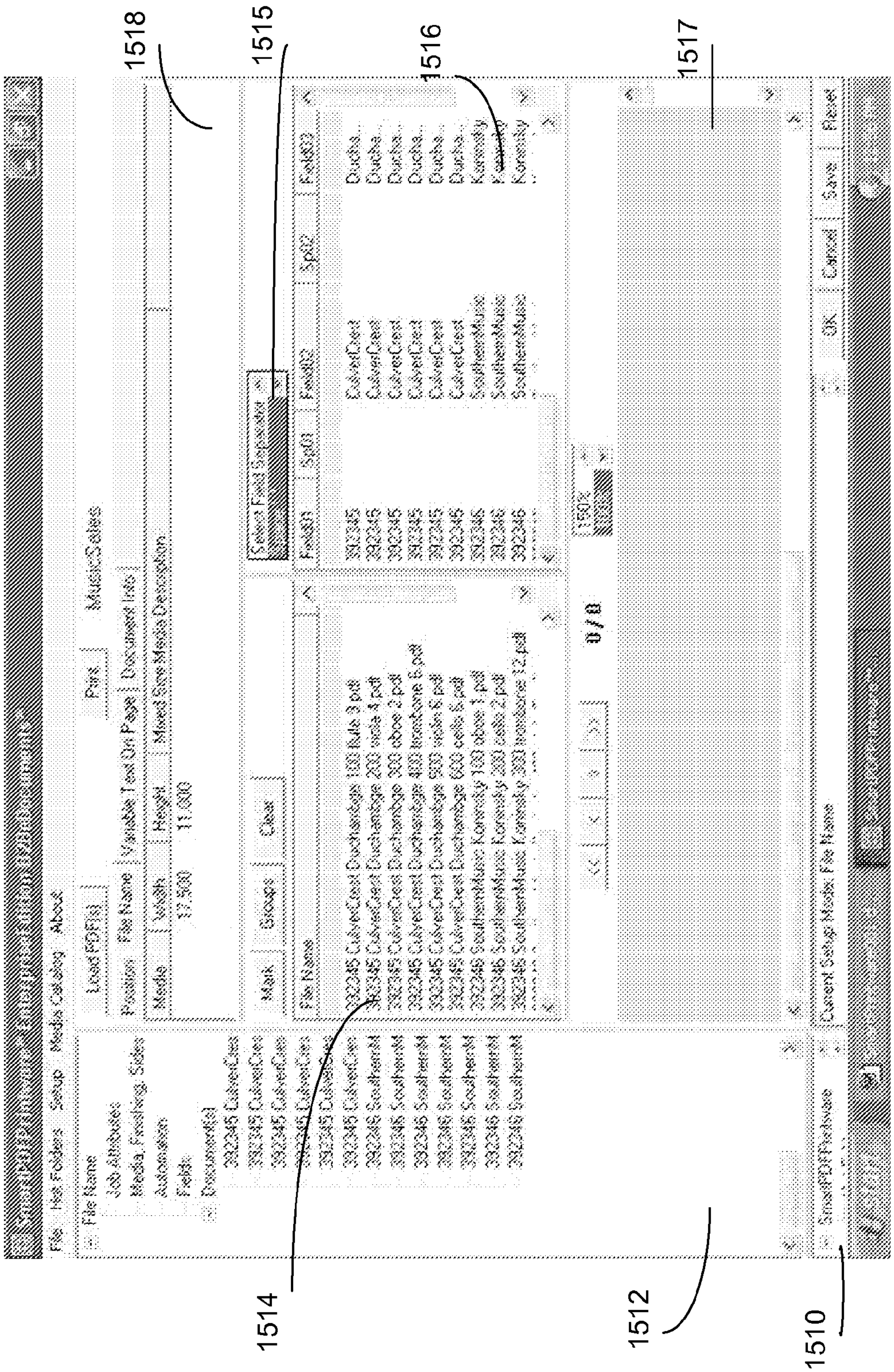

FIG. 15B provides an illustrative user interface screen with which the user may define printing and finishing rules for the print job based on the names of files contained in the print job. As shown, print job attribute panel 1512 provides a hierarchical display of the attributes that have been assigned to the print job. For the selected print job folder of "Music Store," in panel 1512 a hierarchical display of the file names is shown. Any print parameters relating to the Attributes, Automation, and Media, Finishing, Sides, and Output are also shown.

Also depicted in FIG. 15B is a file listing panel 1514 which lists each file in the print job that is identified in print job attribute panel 1512. In the illustrative example, the files displayed are those corresponding to "MusicCity" print job folder identified in panel 1510.

An illustrative system allows the user to identify what character has been used in the file names to delineate between fields. In the illustrative screen of FIG. 15B, the user may select the field separation character from list 1515. Typical field separation characters or delimiters include, for example, a space, comma, colon, semicolon, dash, period, underscore, etc. Upon receiving the user's selection of a field delimiter from list 1515, the illustrative system processes each file name in panel 1514 to identify the alpha-numeric characters in each field. The illustrative system displays the fields identified for each file name in field definition panel 1516. The fields are separated into columns with spacing columns interspersed between fields.

Image panel 1517 displays an image of the document in panel 1514 that is selected.

Mixed media size panel 1518 displays all of the different media sizes that are contained in the document. When a print job is selected to define printing parameters, print rule application 310 scans the documents in the print job folder to identify all of the different media sizes contained in the print job. Each unique media size is displayed in the mixed media size panel 1518. The various sized media may be identified as the "normal" size or "exception" sizes.

Figure 15C:
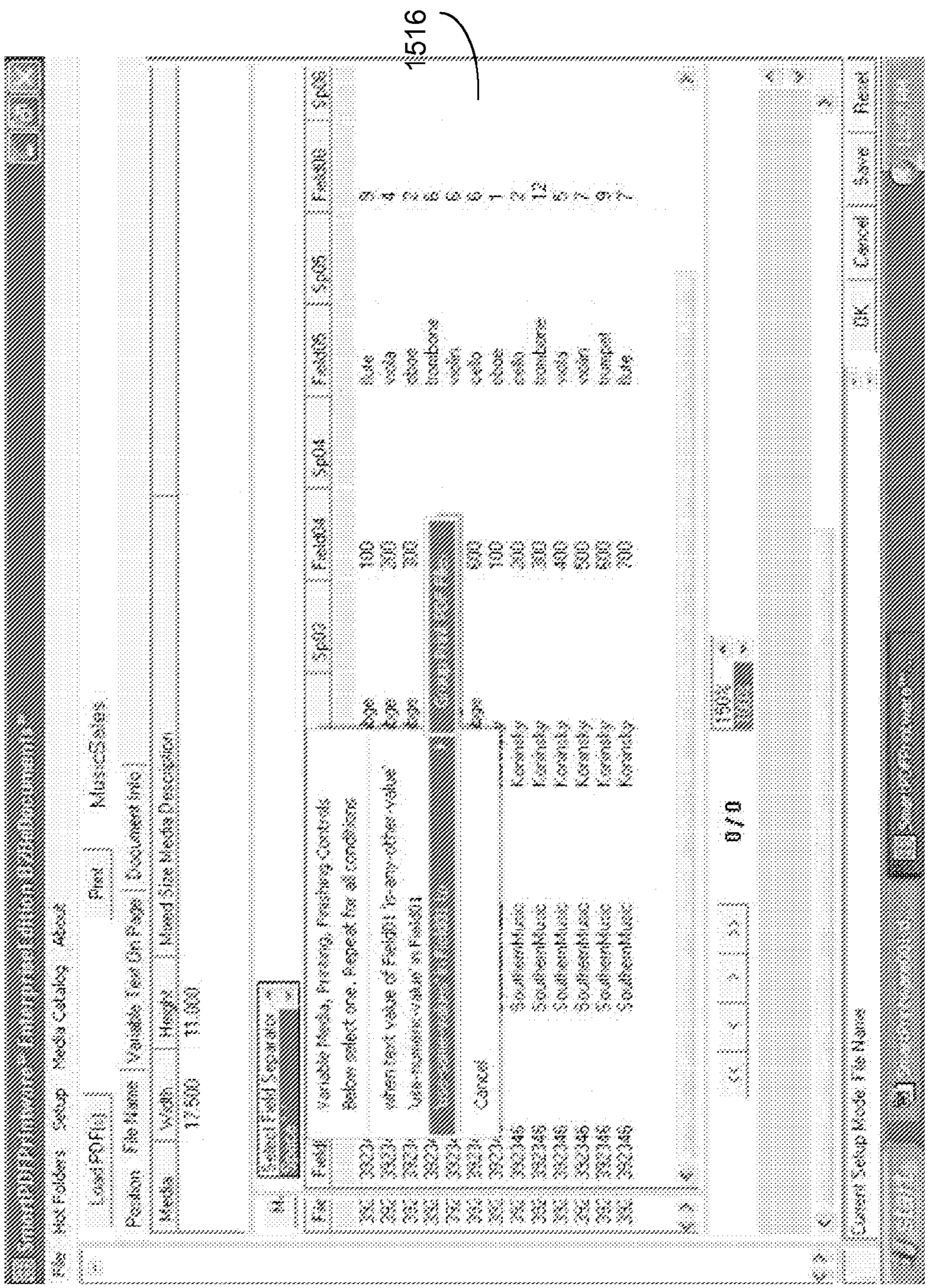

In an illustrative system, once the fields in the file names have been identified, a user may specify printing and finishing parameters to be associated with and defined by the values of the fields in each file of a print job. As shown in FIG. 15C, the system allows the user to select a field column header and to identify how the values in the field column should be used in connection with printing and finishing the document. In the example illustrated in FIG. 15C, a pop-up menu has allowed the user to select to use the values in the Field 1 to group files for printing. It should be noted that the print job rules application 310 provides a pop-up menu that allows for conditional assignment of printing and finishing parameters. Thus, how a print job is printed or finished may be conditioned on the values in Fields of the file names. In the particular example shown in FIG. 15C, the pop-up menu provides for the following three conditional assignments: "when text value of Field 1 is 'any other value'"; "'use numeric value' in Field 1"; "'use same values' in Field 1 to." In an illustrative embodiment, print job rules application 310 is programmed to allow users to employ the following conditional rules in the assignment of printing and finishing parameters: if the field is equal to a particular value then assign a particular print or finish parameter; if the field is any other value then assign a particular print or finish parameter; use the numeric value in the field to determine a particular parameter; use the text value in the field to determine a particular parameter; use the same value in the field to determine a particular parameter; parse the value to determine a particular parameter; upon receiving the static text take a particular action; upon receiving the variable text take a particular action. Any conditional relationships that may be established by the user are preserved in the print job rules file. In the exemplary screen of FIG. 15C, it is shown that the user has selected to use the conditional "use same values in Field 1 to" group the files for purposes of printing and finishing. Thus, in this particular example, files with the same value in Field 1 will be grouped together.

Figure 15D:
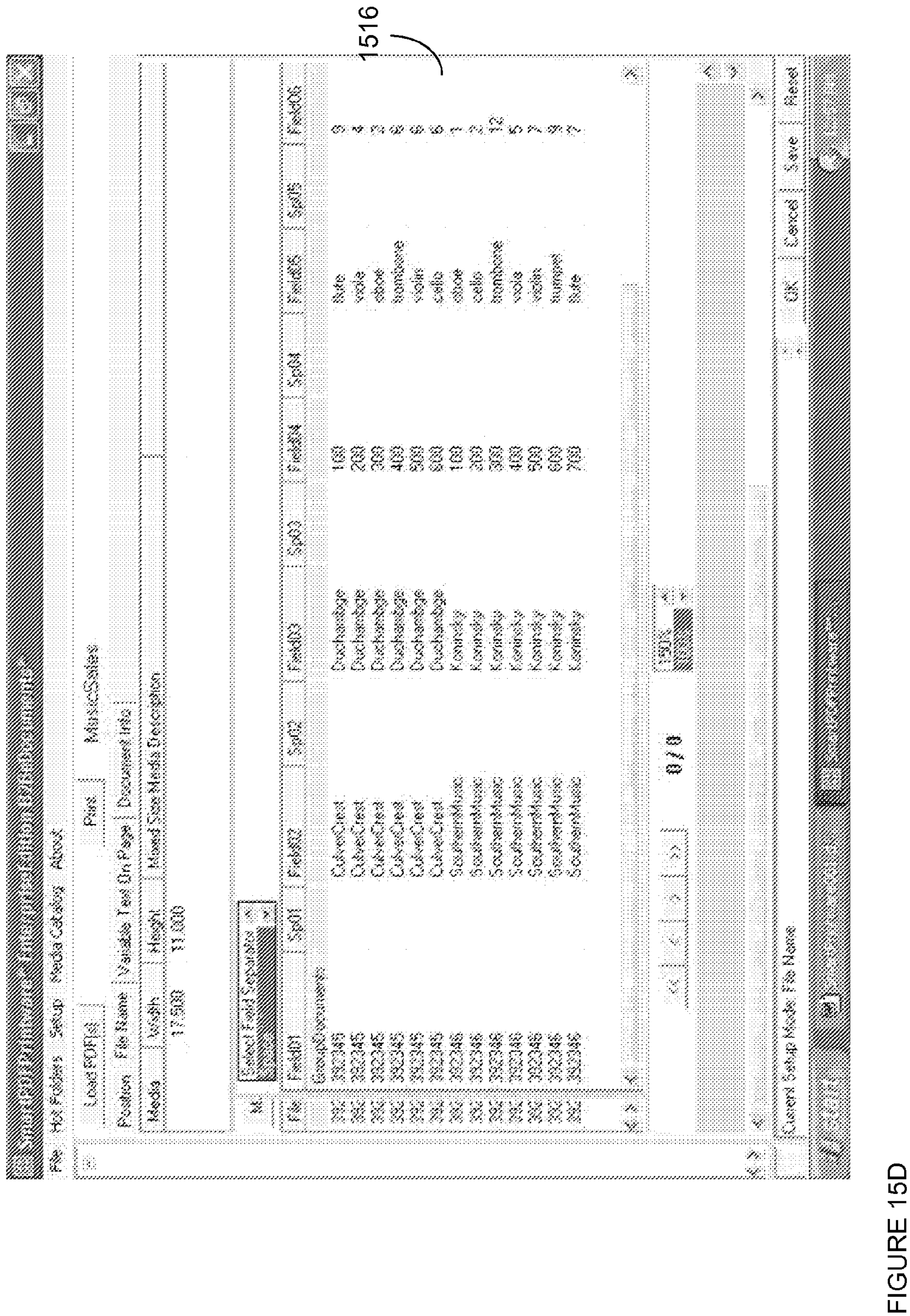

As shown in FIG. 15D, the field for which the user has identified a printing parameter contains a header identifying the printing parameter associated with the particular column In the example of FIG. 15D, the header associated with the particular Field 1 indicates the field is to be used to group files for printing.

Figure 15E:
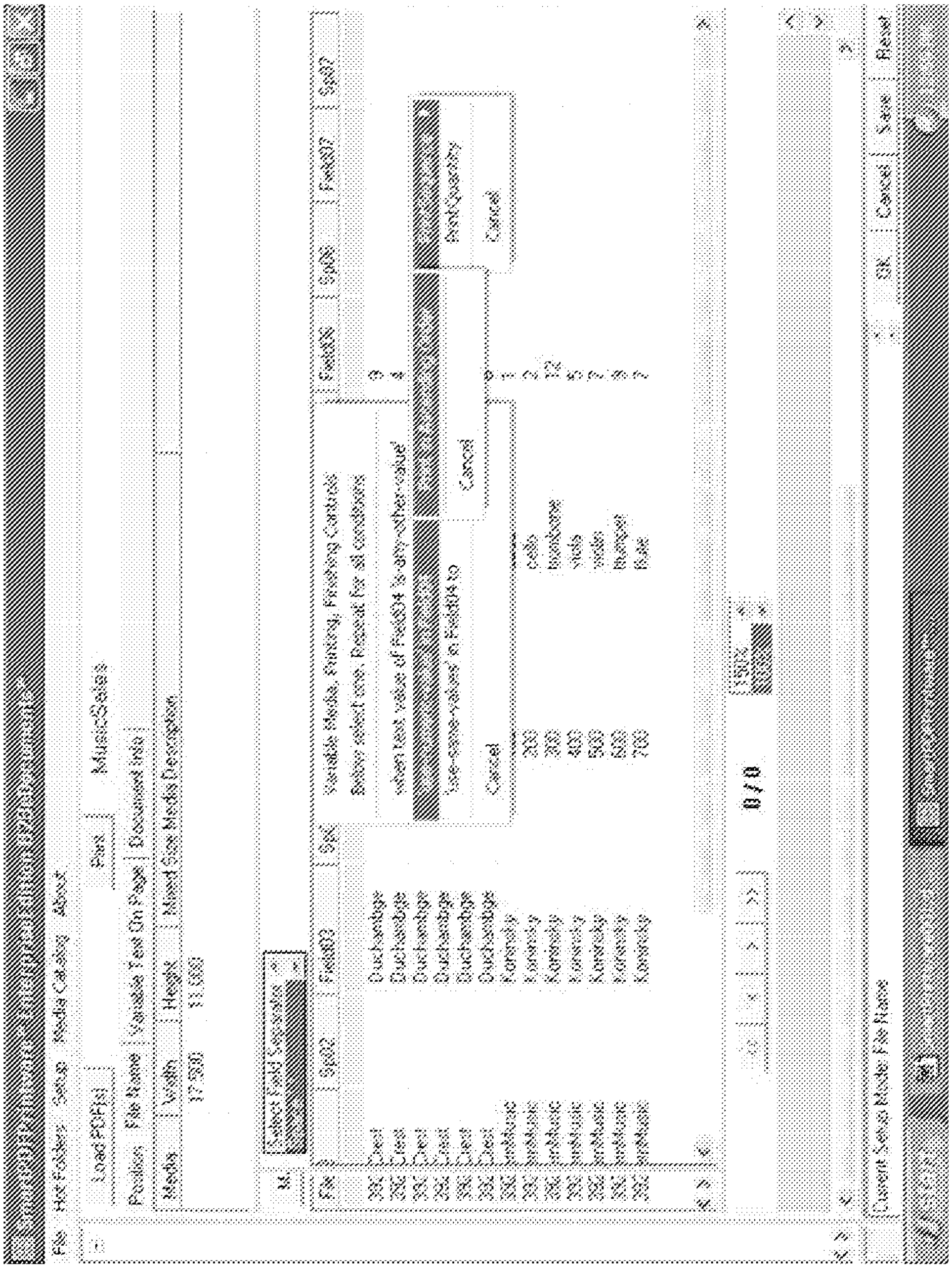
Figure 15F:
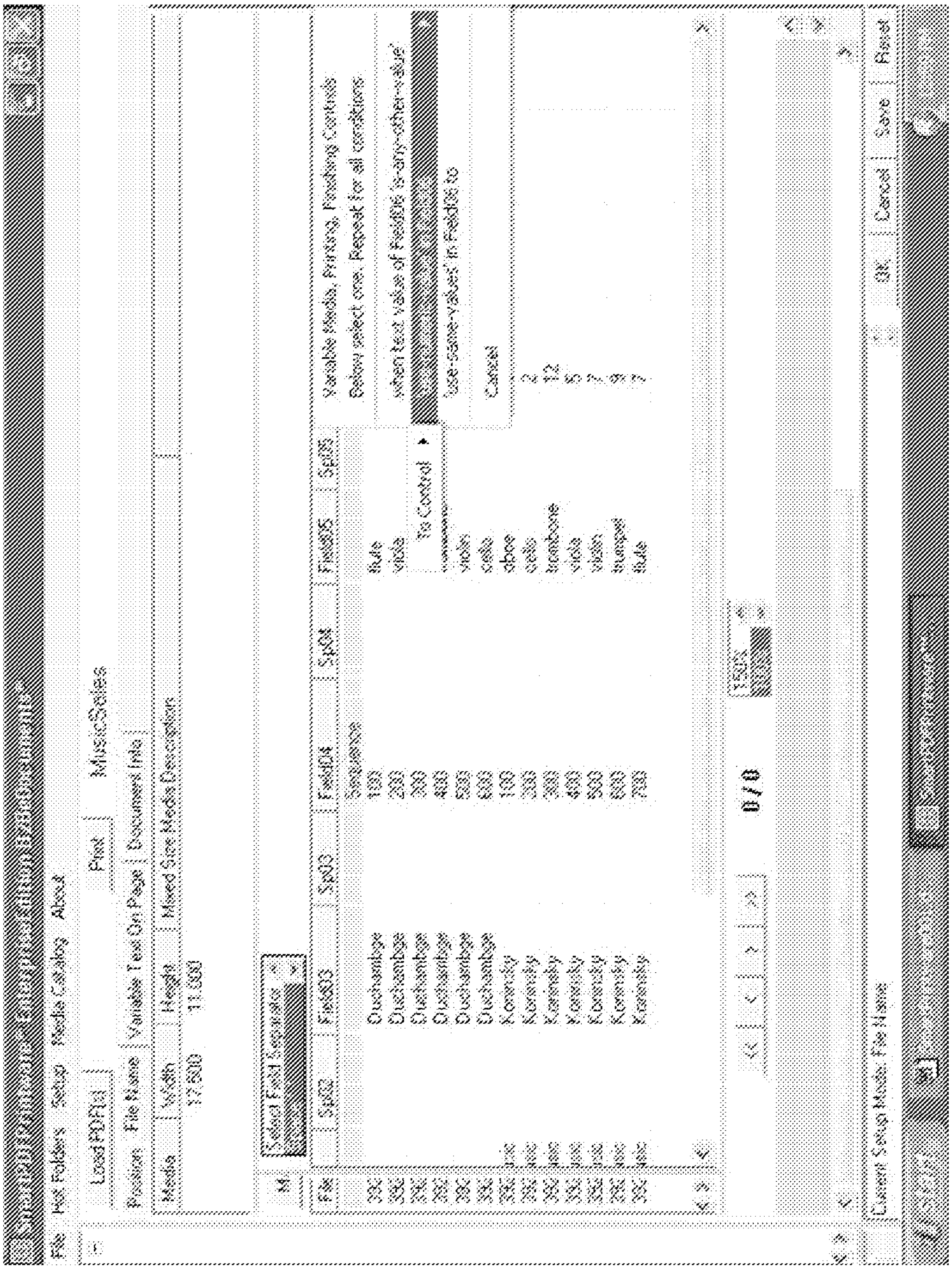

As depicted in the user interface screen of FIG. 15E, an illustrative system allows for the user to specify that the values in a field, in this example—Field 4, may be used to control the order in which files are printed. For example, the numeric value in a field may be employed to print in ascending or descending order according to the values of the fields in column 4. As shown in FIG. 15F, a title to Field 4 and a change in the background color of that field indicate that the contents of Field 4 have been identified as dictating the sequence of printing. The system will thereafter prevent the user from attempting to have the values in the same field be used to determine another print or finishing parameter. The association between a field and a printing parameter may be changed or deleted, but a field typically is not used to define more than one printing and finishing parameter.

Figure 15G:
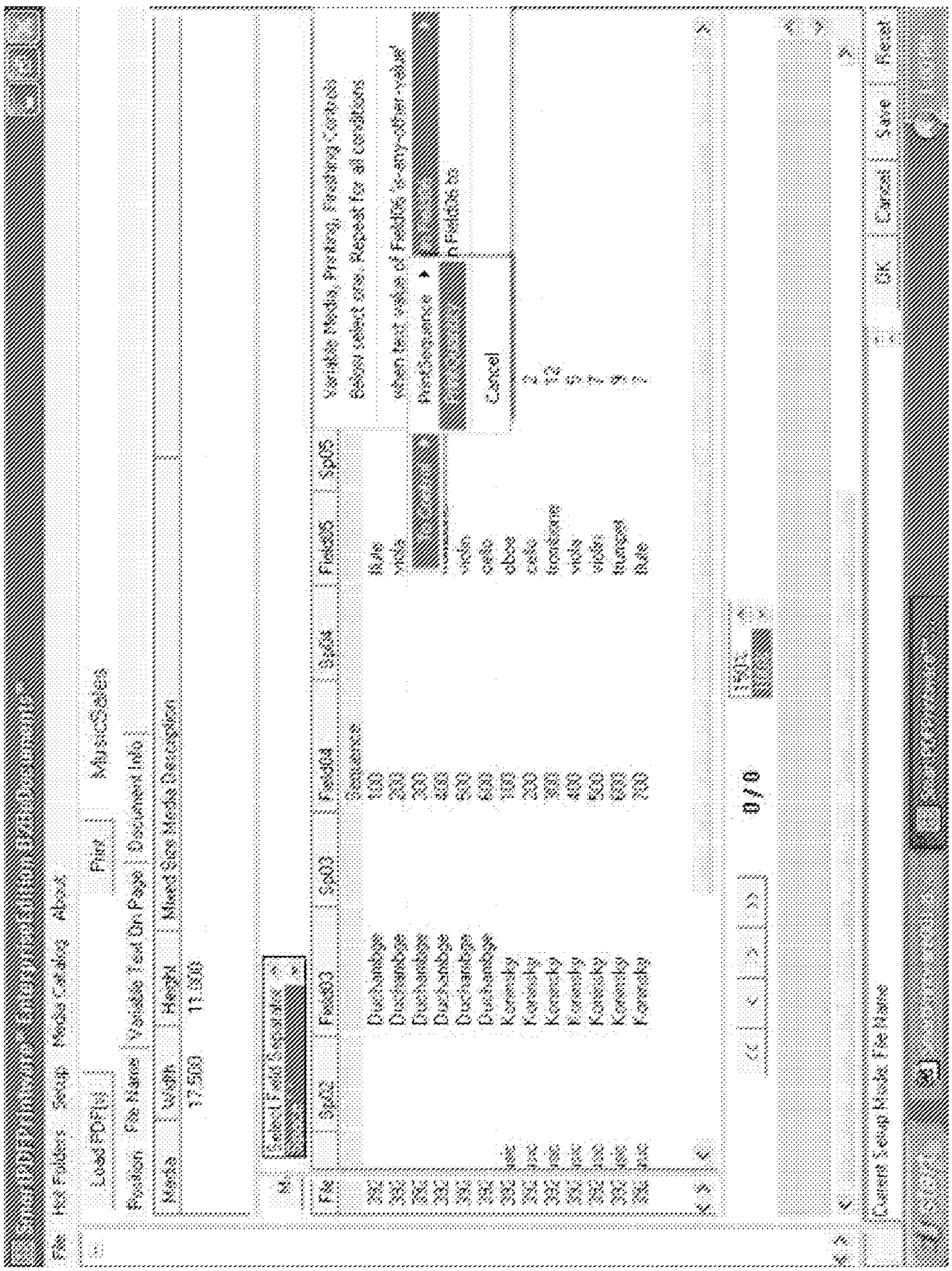
Figure 15H:
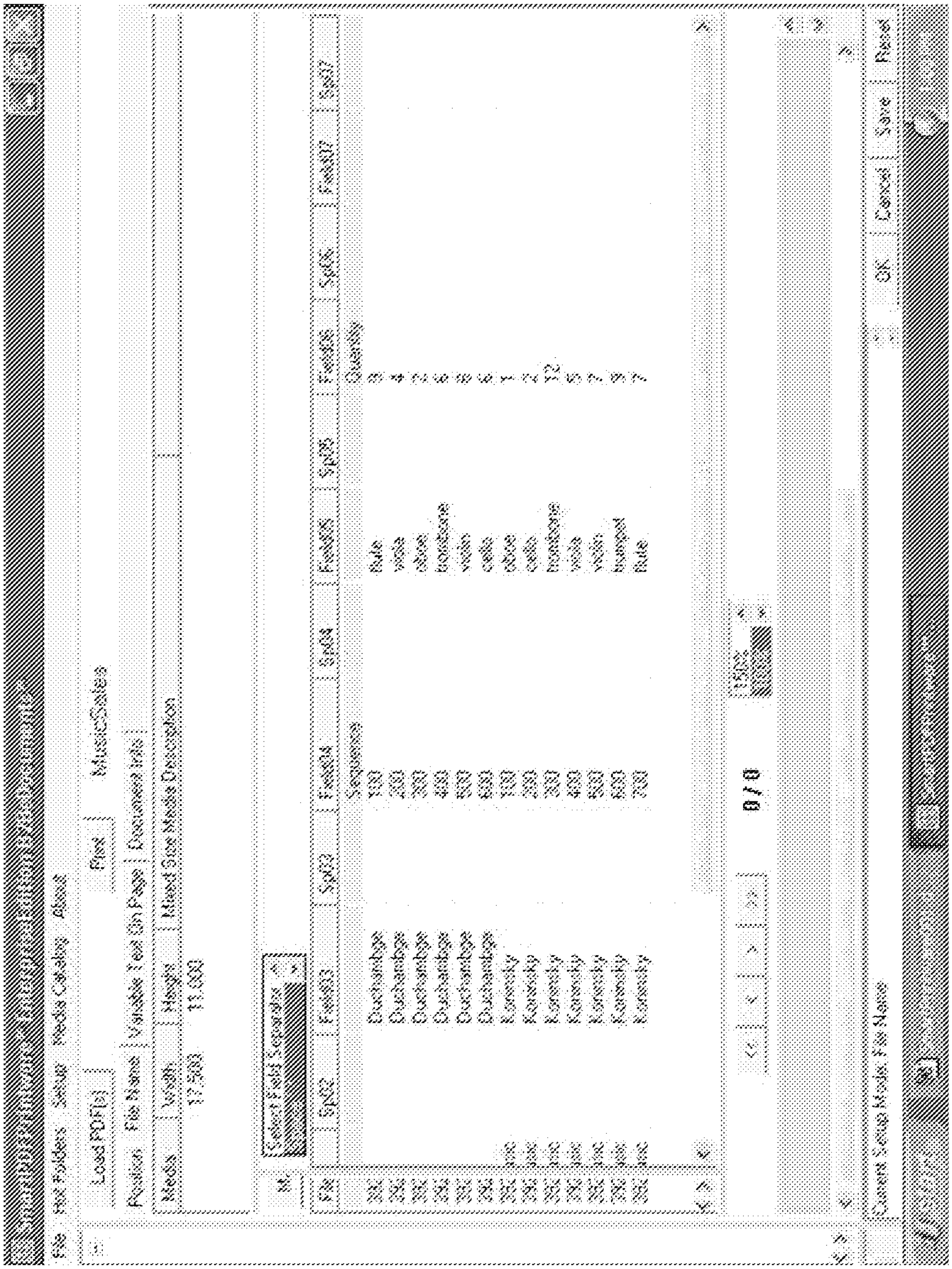
Figure 15I:
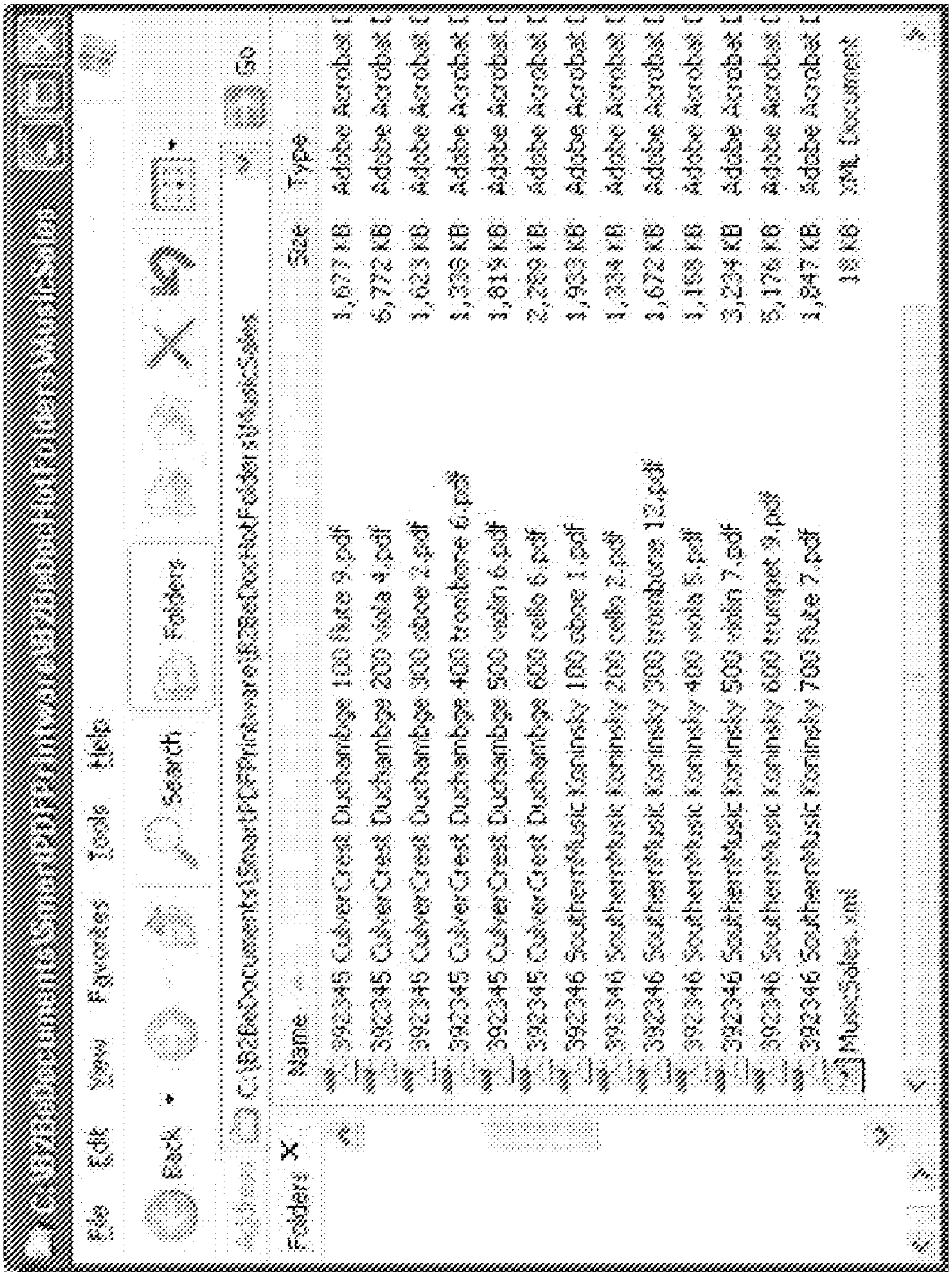

As depicted in the user interface screen of FIG. 15G, an illustrative system allows the user to specify that the values in a particular field, in this example—Field 6, may be used to control the quantity of copies to be made of a particular file in a print job. In FIG. 15H, the header of Field 6 indicates that the field has been associated with defining the number of copies to be made of the corresponding file.

In the above-described illustrative example, Fields 1, 4, and 6 were associated with specific printing and finishing parameters such that for each file in the print job, the value of the particular field determines the particular printing and finishing parameter. Those skilled in the art will appreciate that there is no limit to which field can be used to control a particular printing or finishing parameter. Rather, any field in the file names could be identified by the designer of the print job to control any of the printing and finishing parameters.

Defining the printing and finishing rules for a print job using the file names in the print job can be useful in many circumstances. One in particular is wherein the files comprised in a print job are received from remote users that forward files for printing according to an established print job. This may happen, for example, wherein files that are to be printed are forwarded via the Web to a printing company.

Figure 16A:
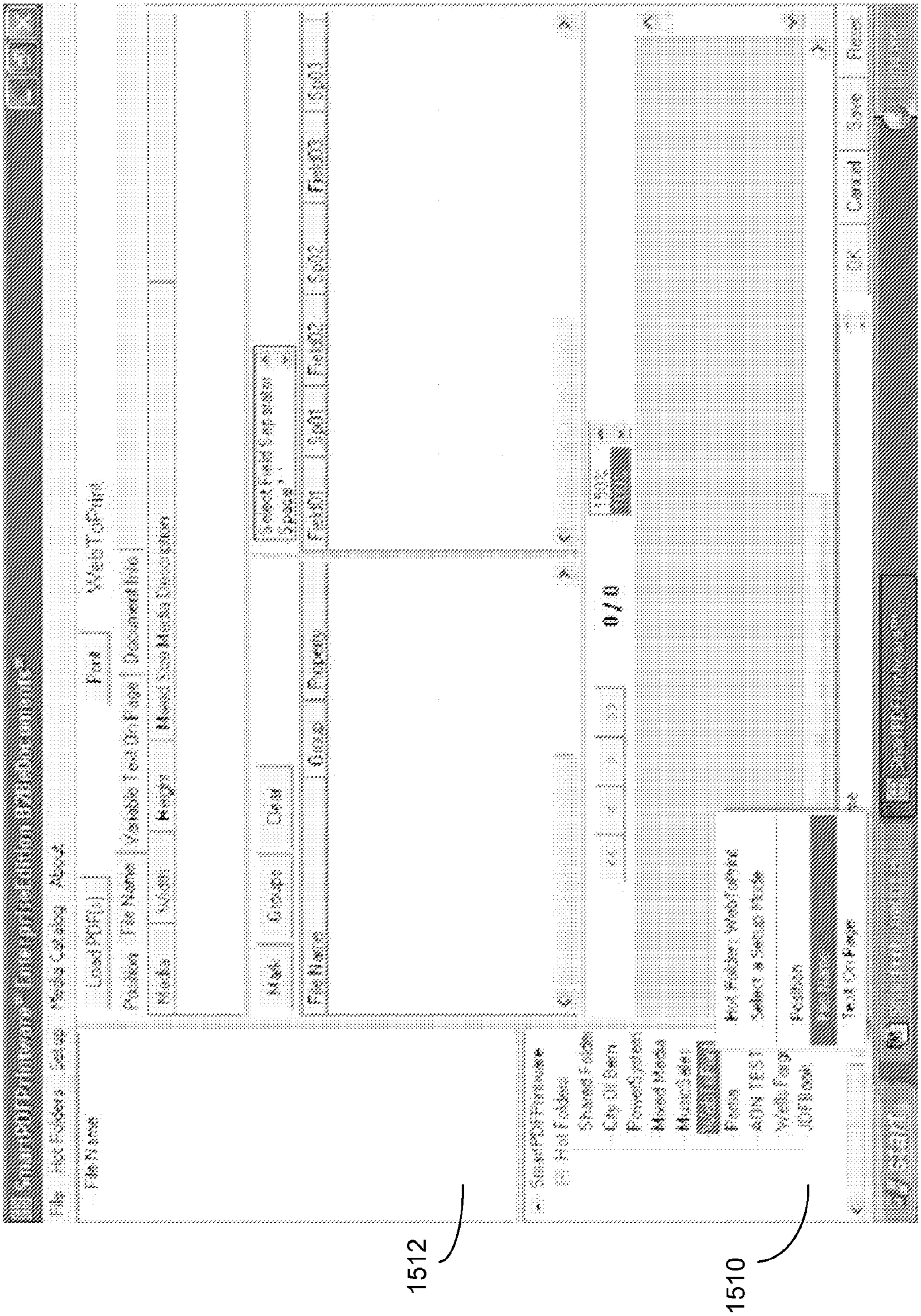
FIGS. 16A through 16X depict illustrative data screens that may be used in an exemplary system to define print rules for a print job using the values of fields in file names.
Figure 16B:
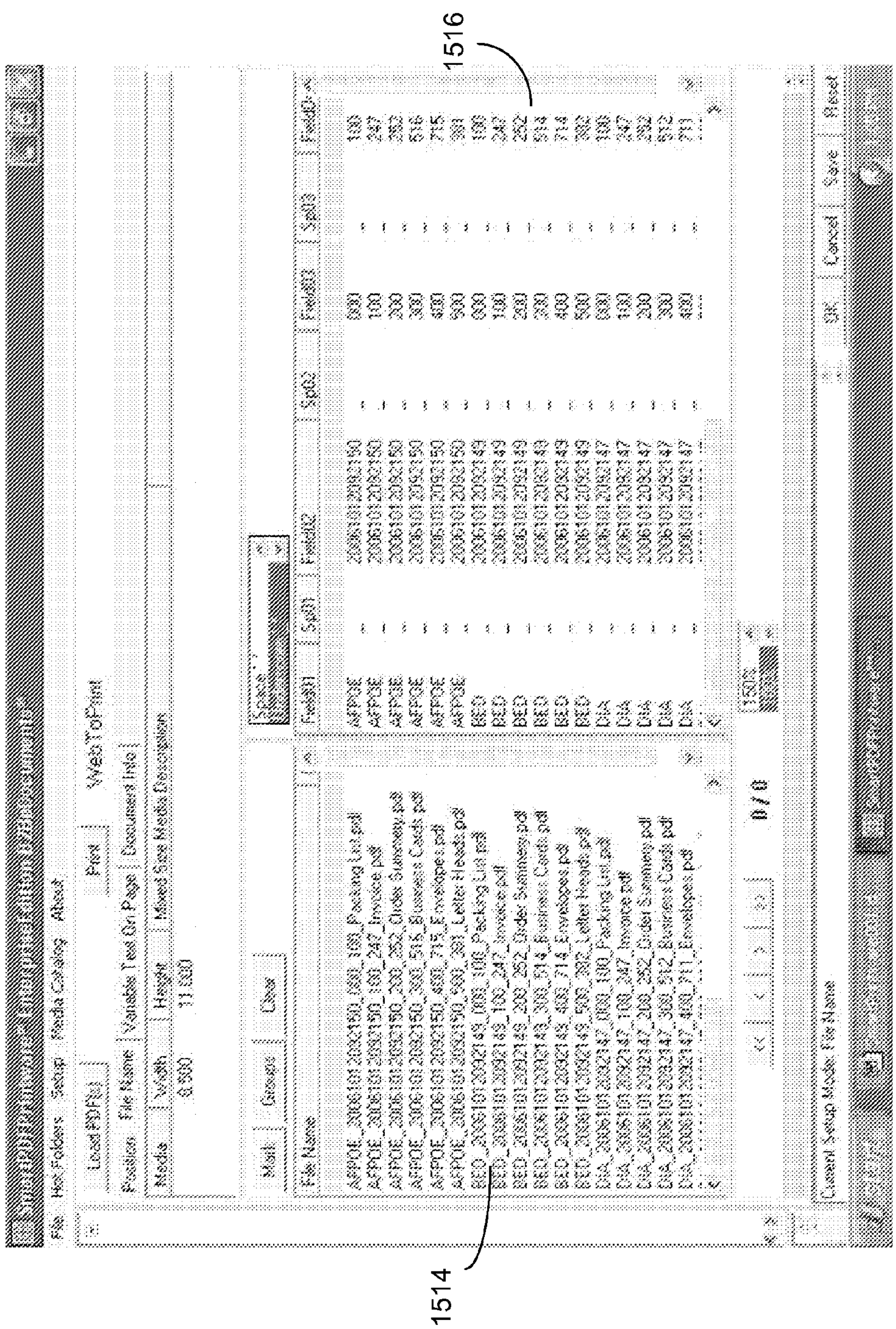
Figure 16C:
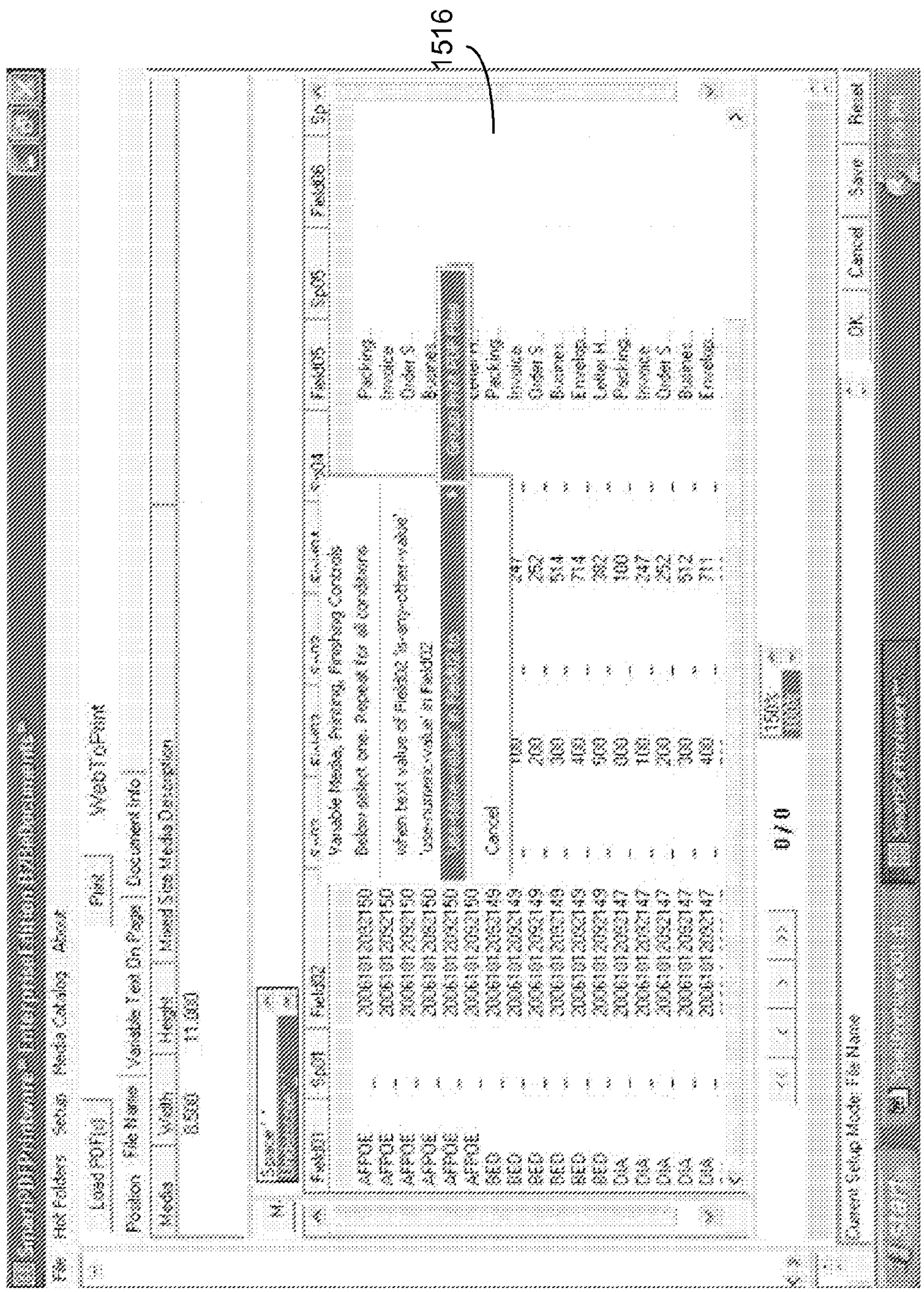
Figure 16D:
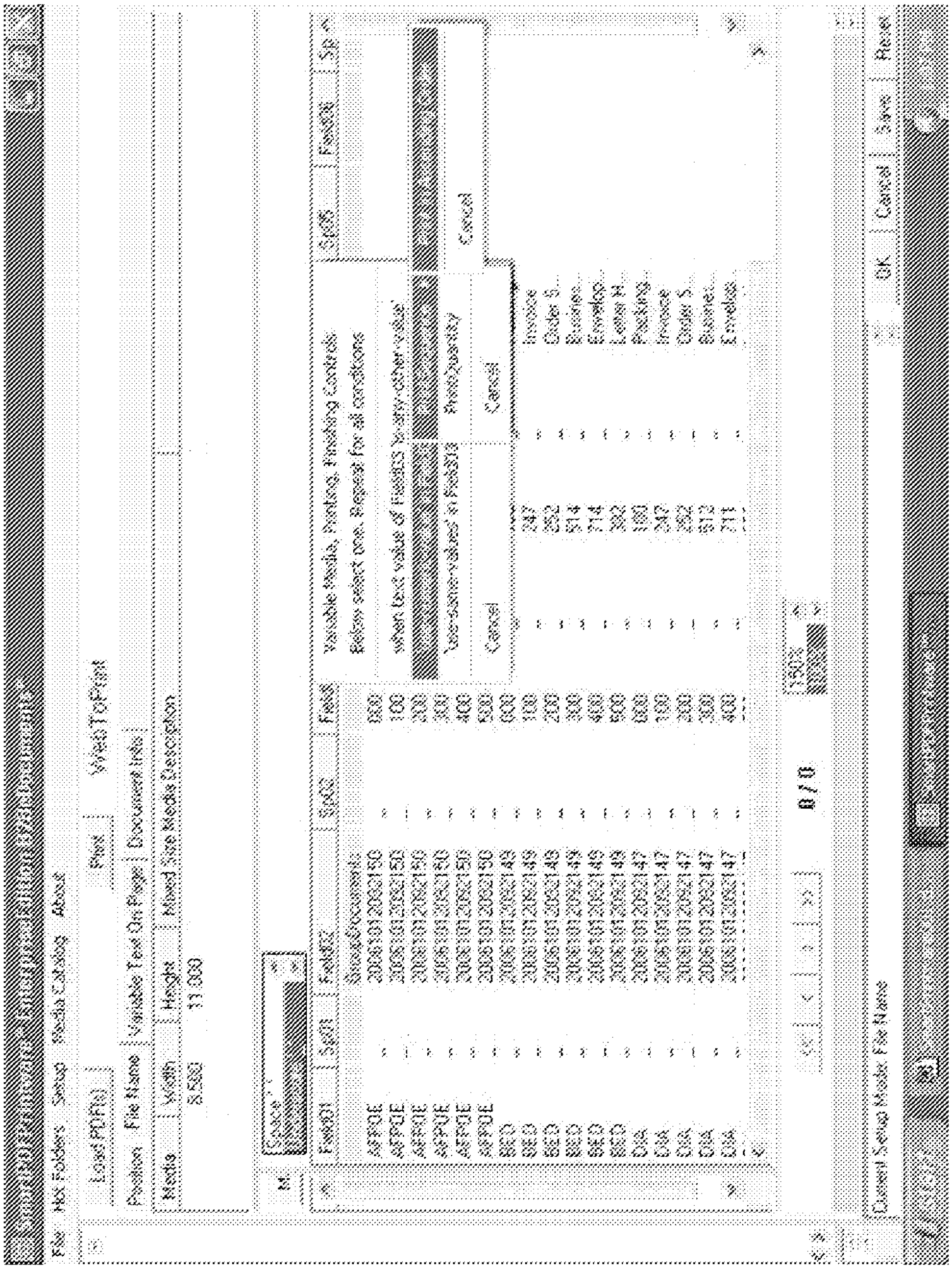
Figure 16E:
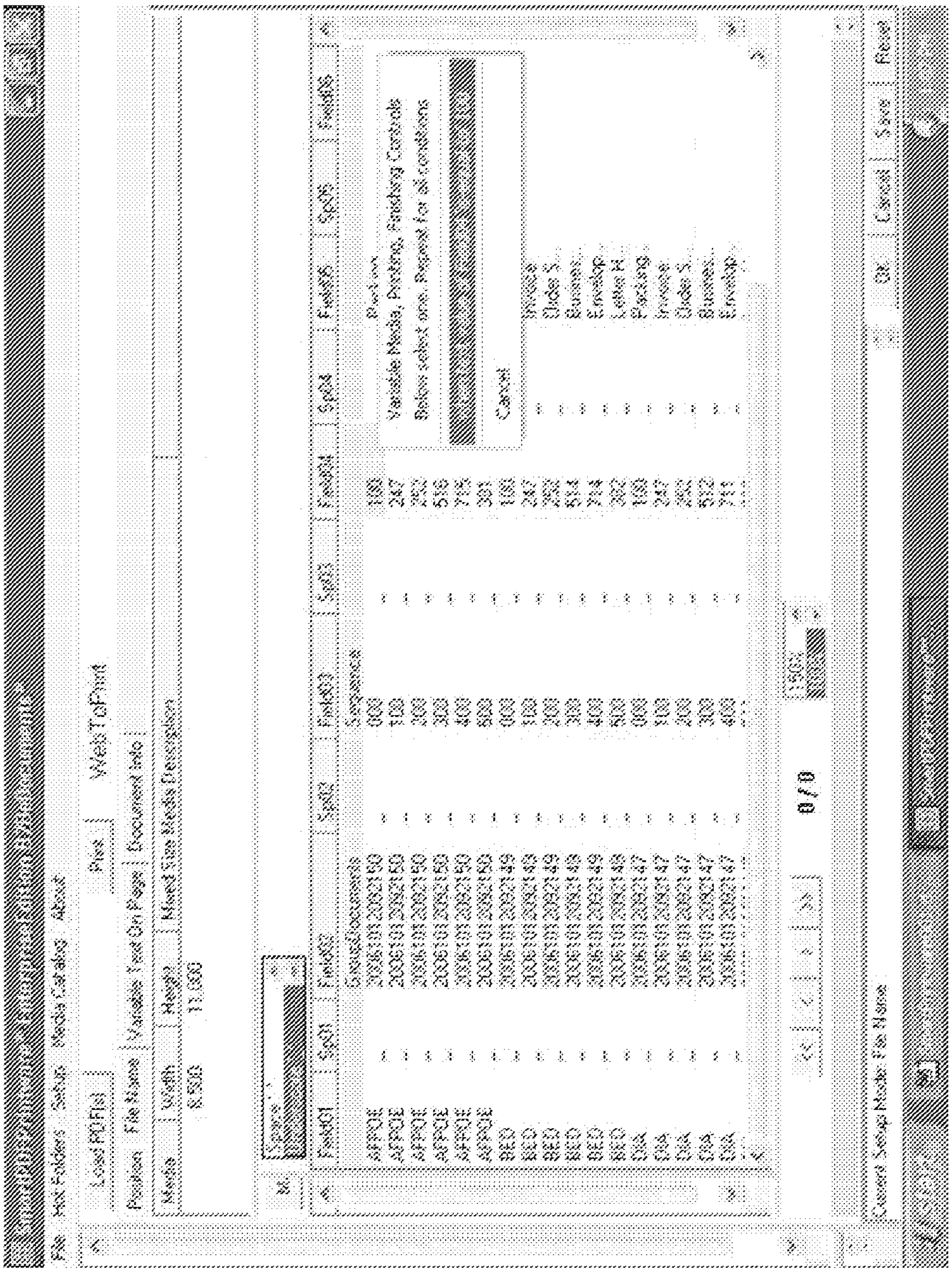
Figure 16F:
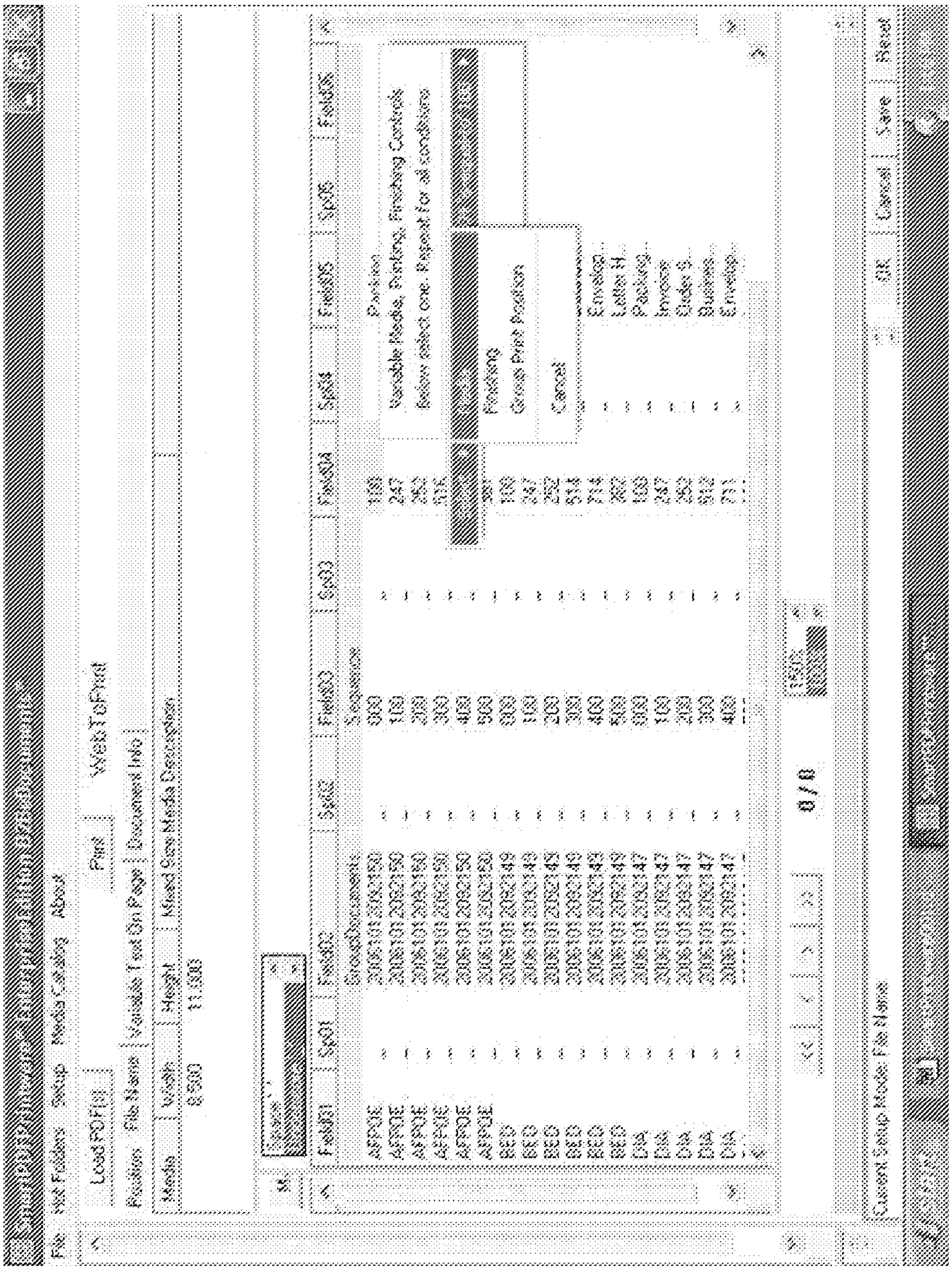
Figure 16G:
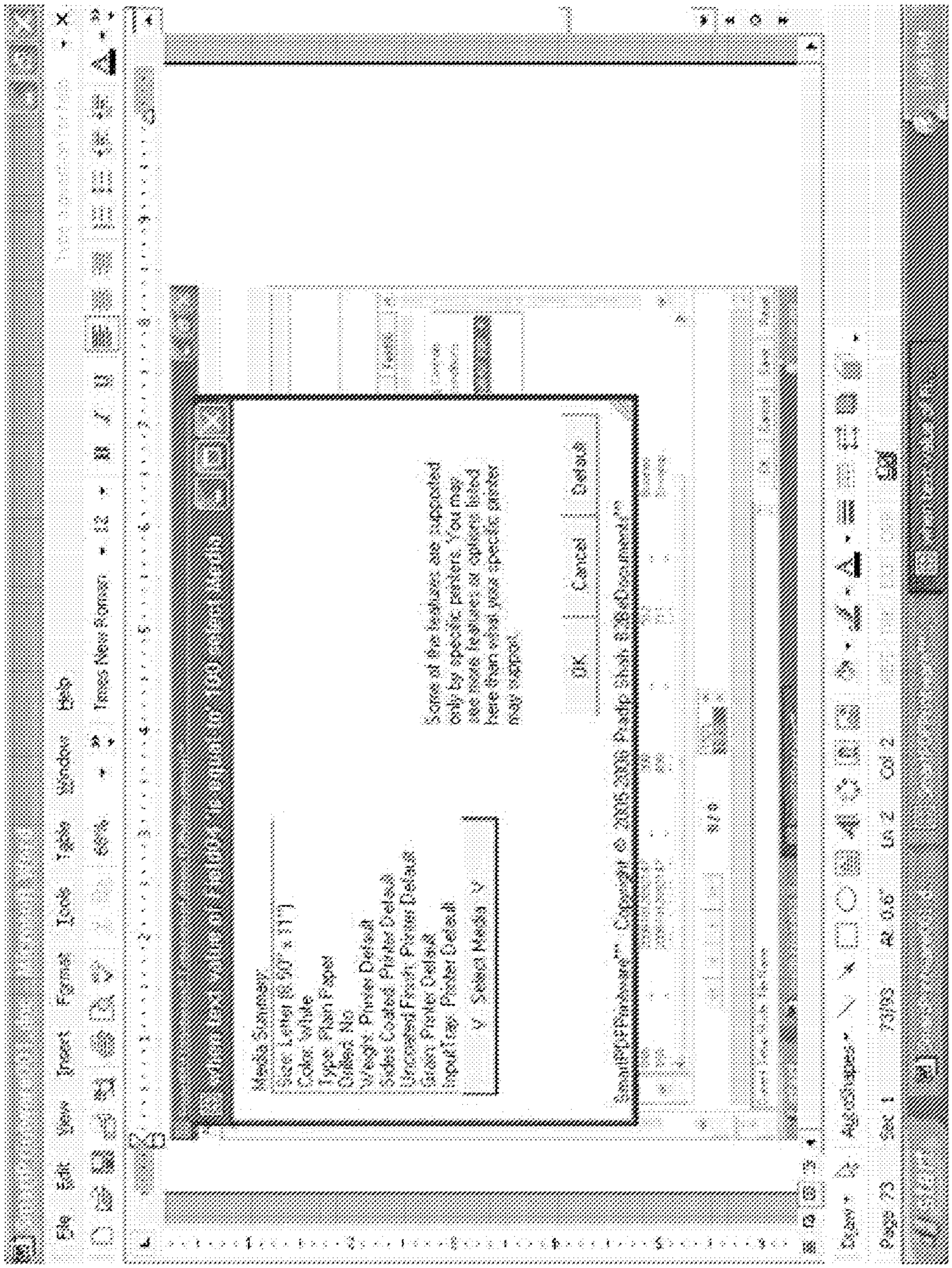
Figure 16H:
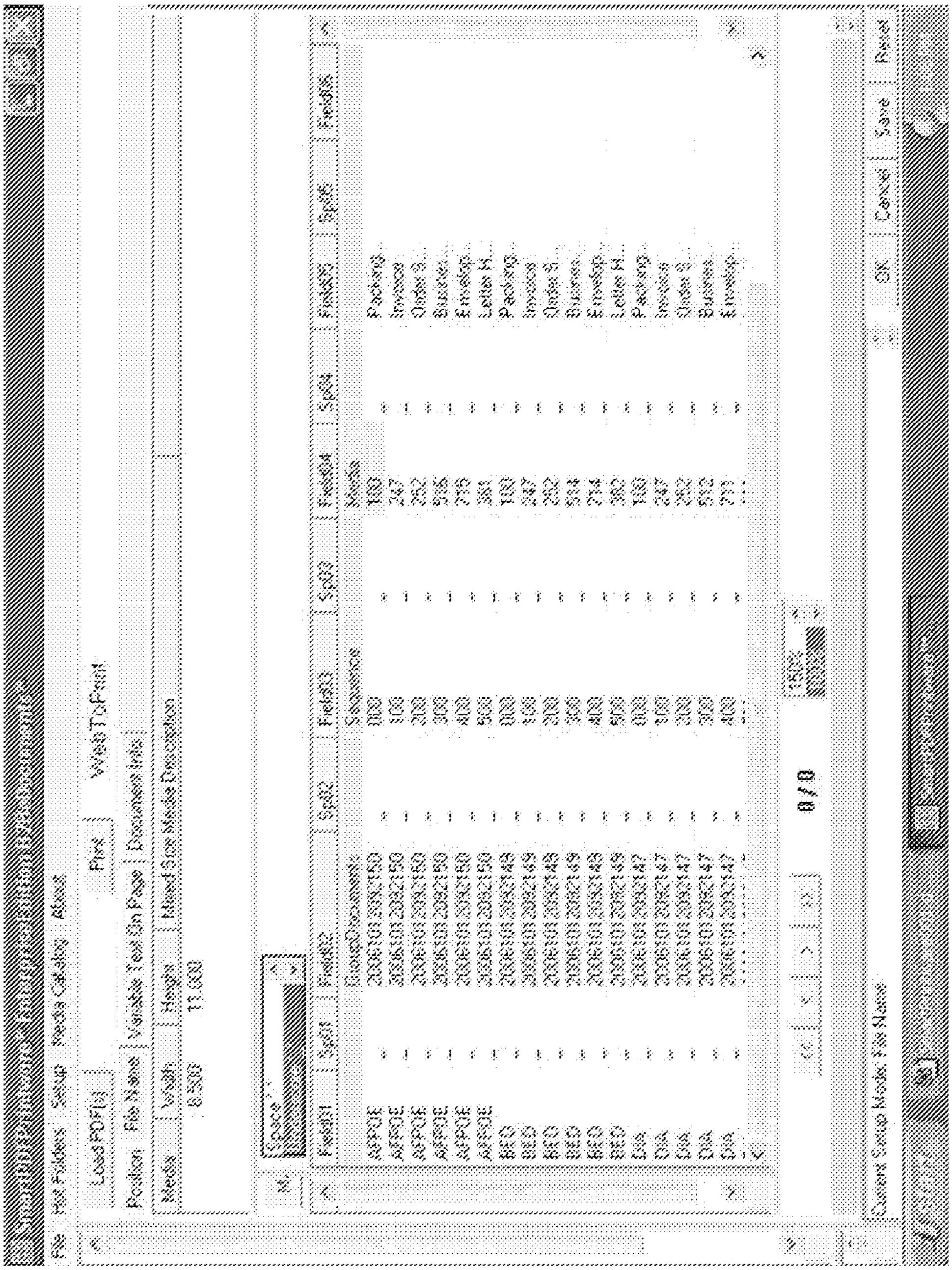
Figure 16I:
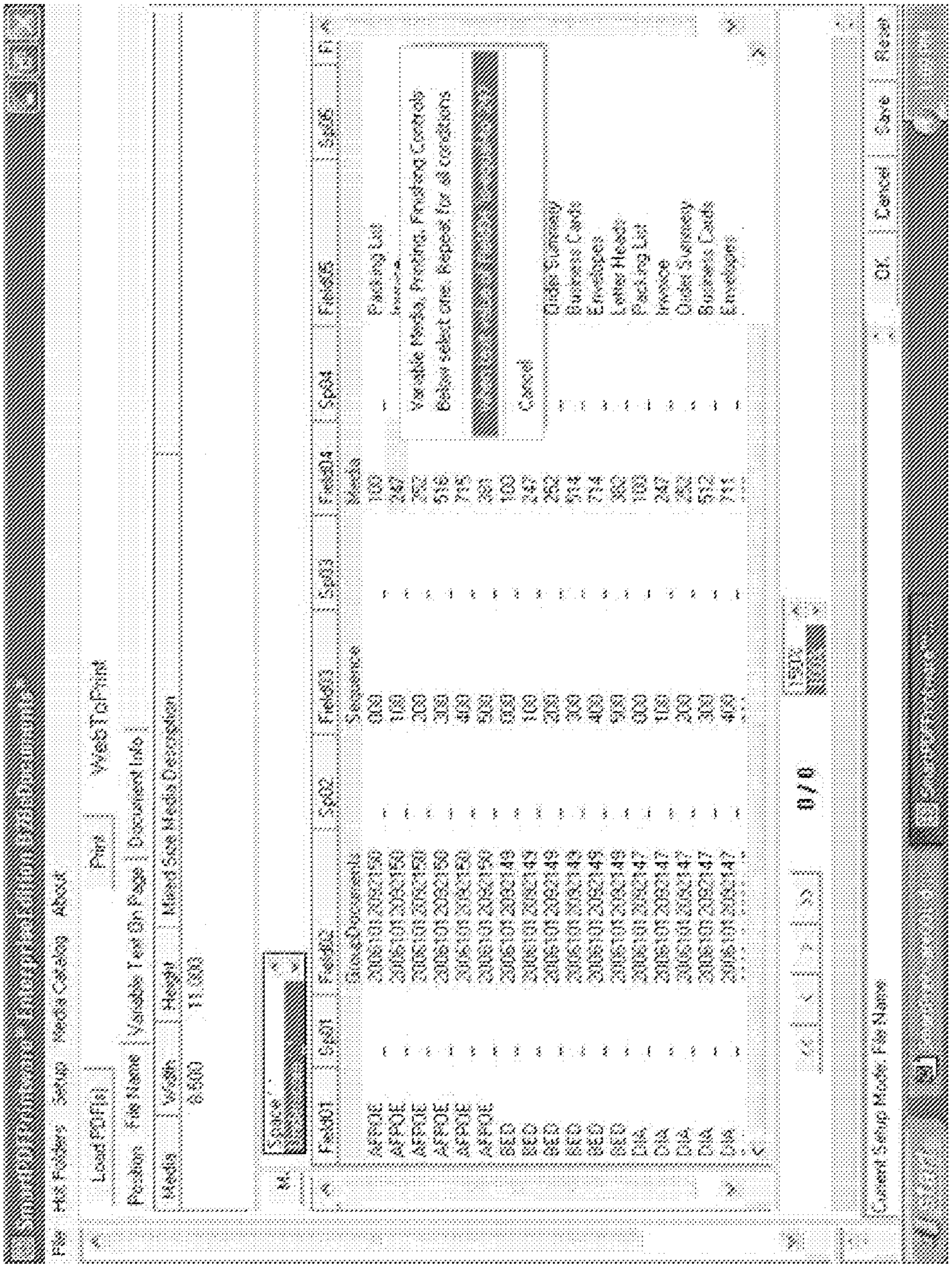
Figure 16J:
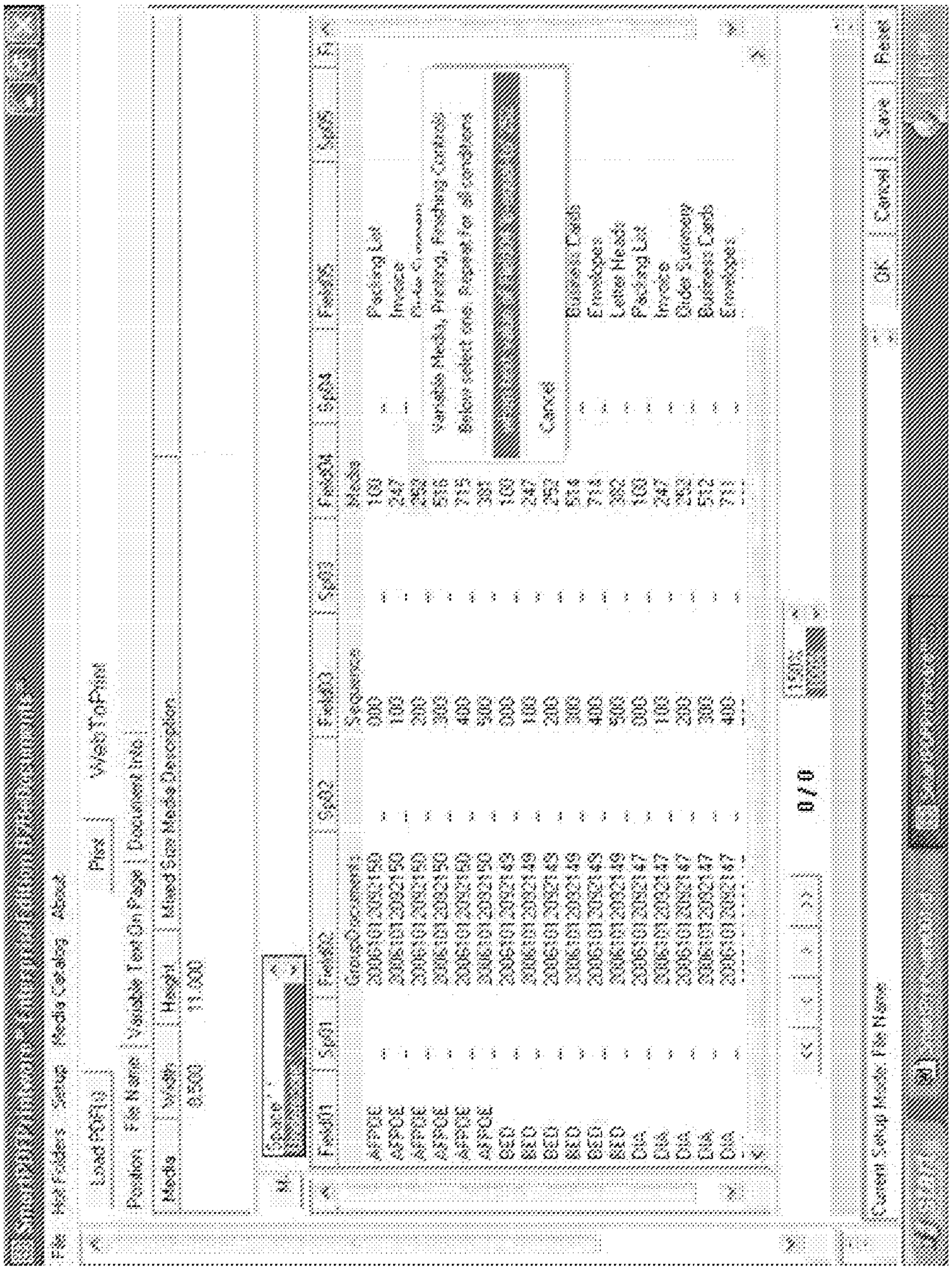
Figure 16K:
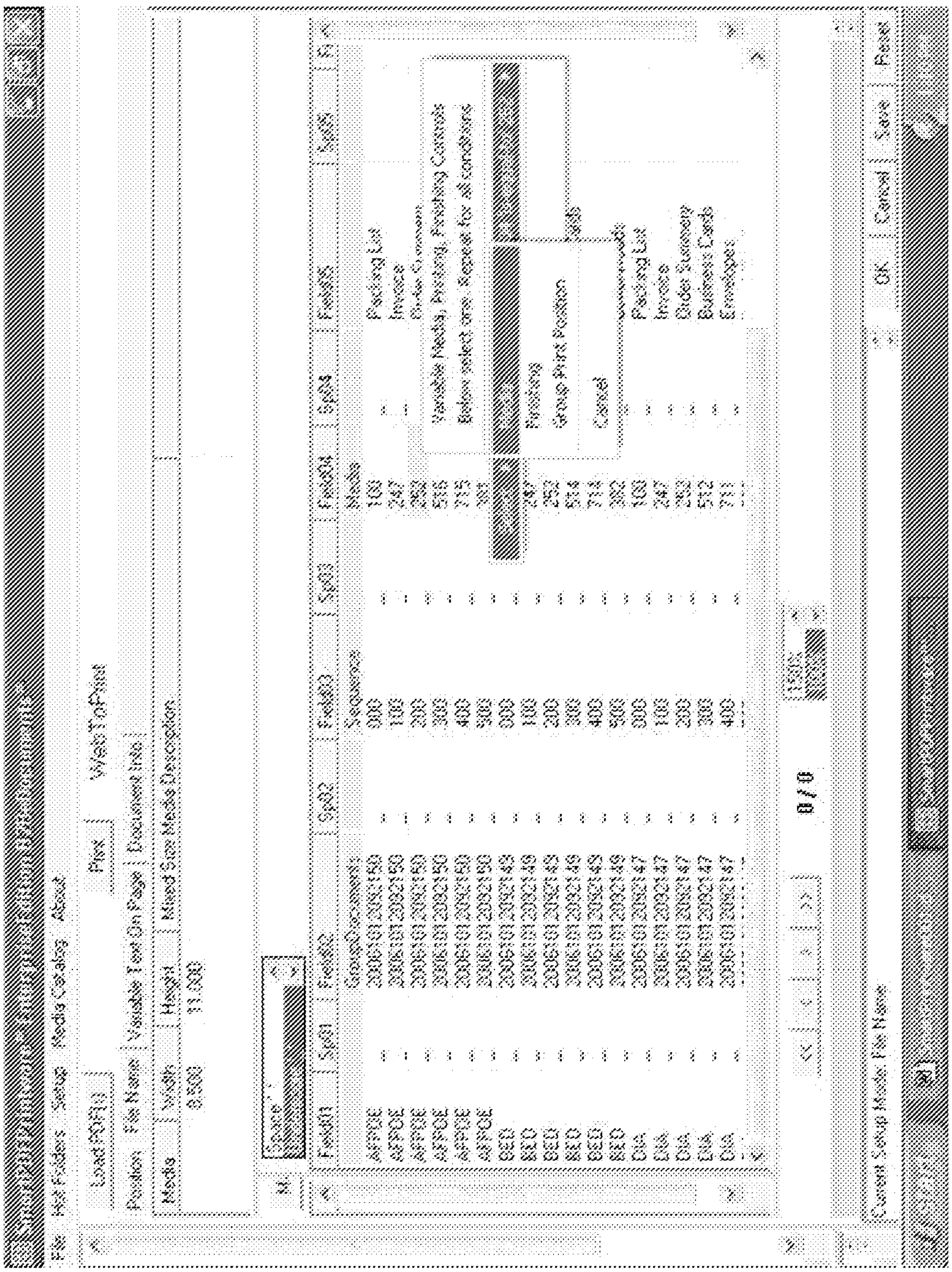
Figure 16L:
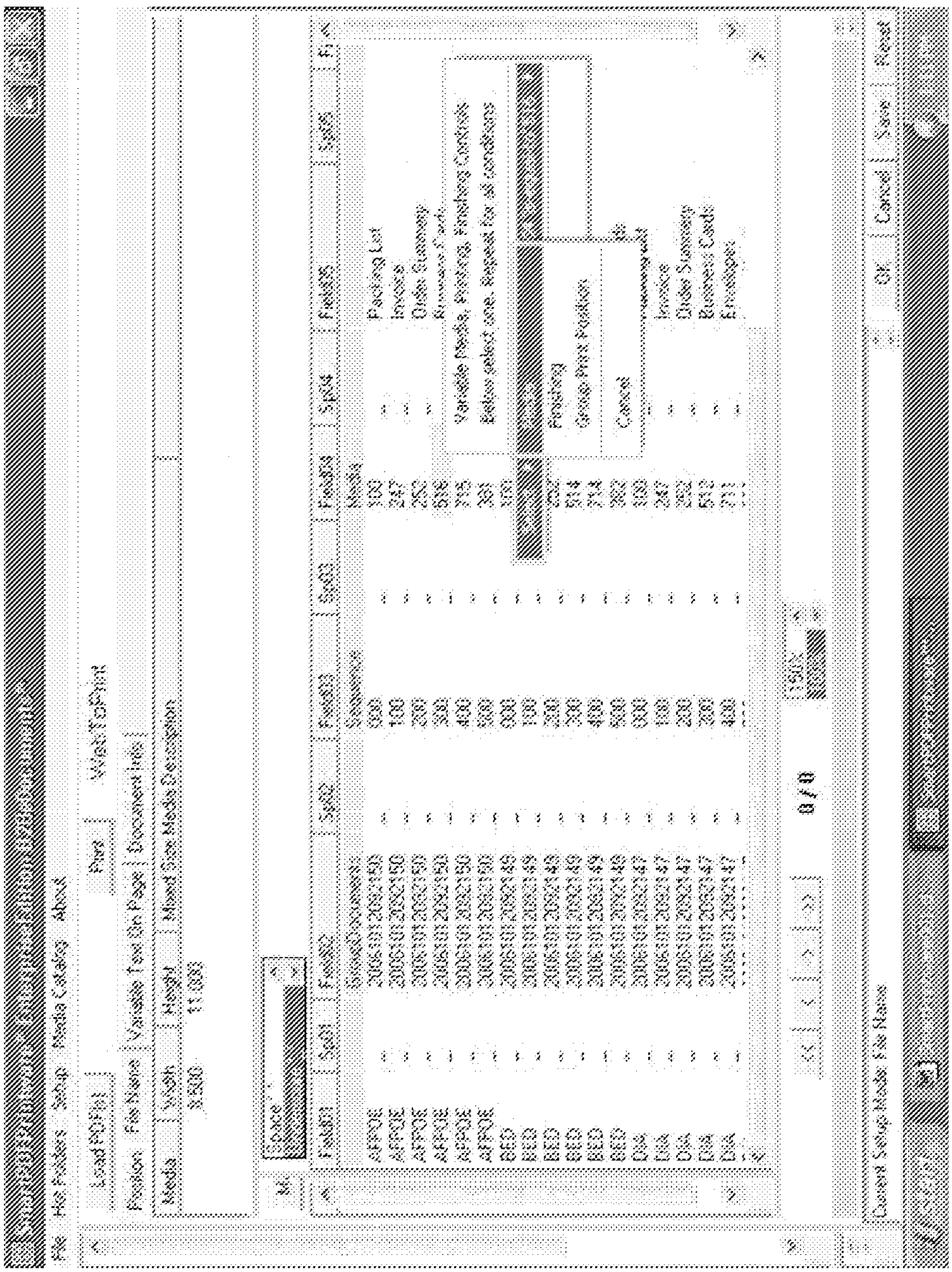
Figure 16M:
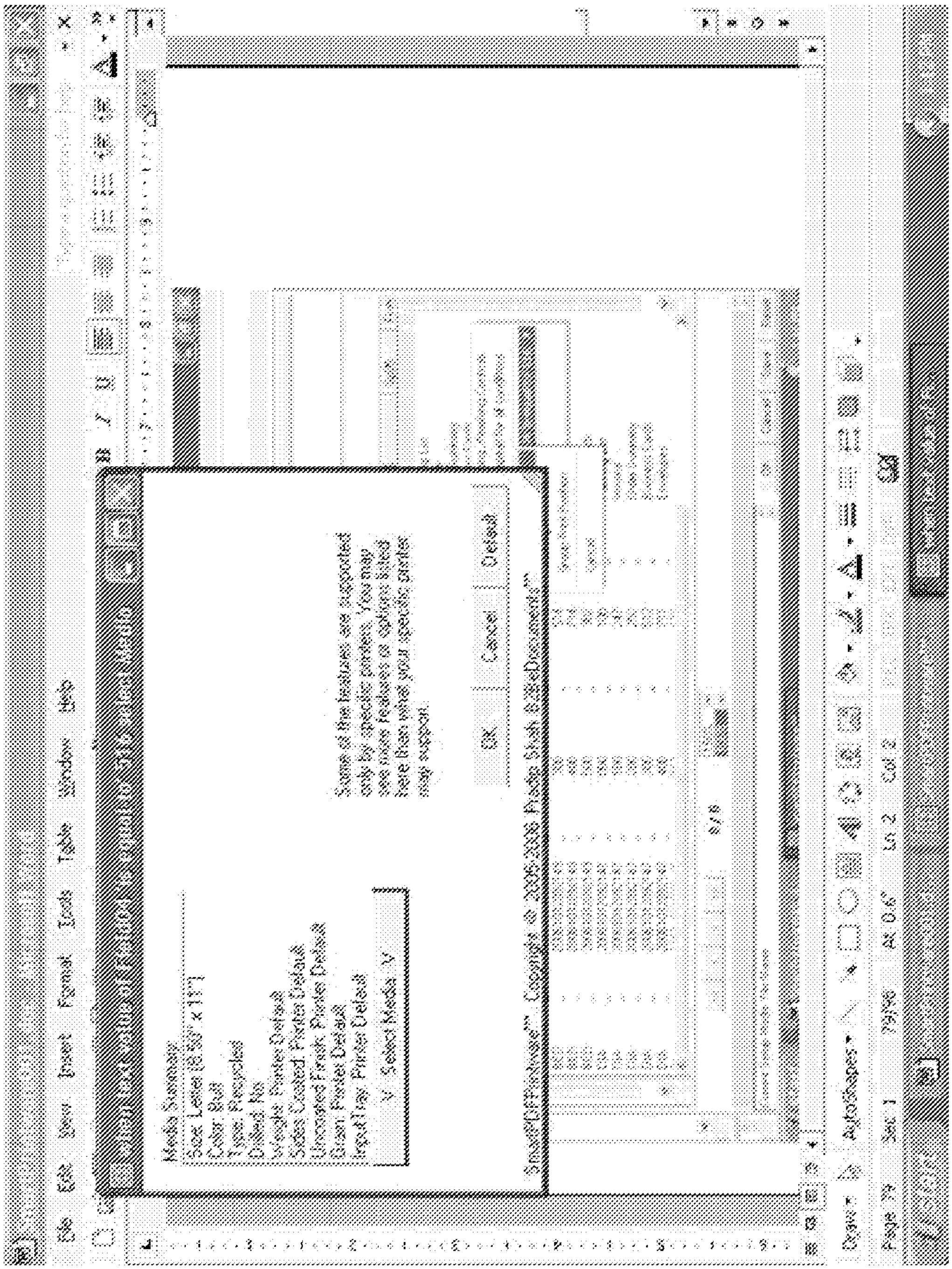
Figure 16N:
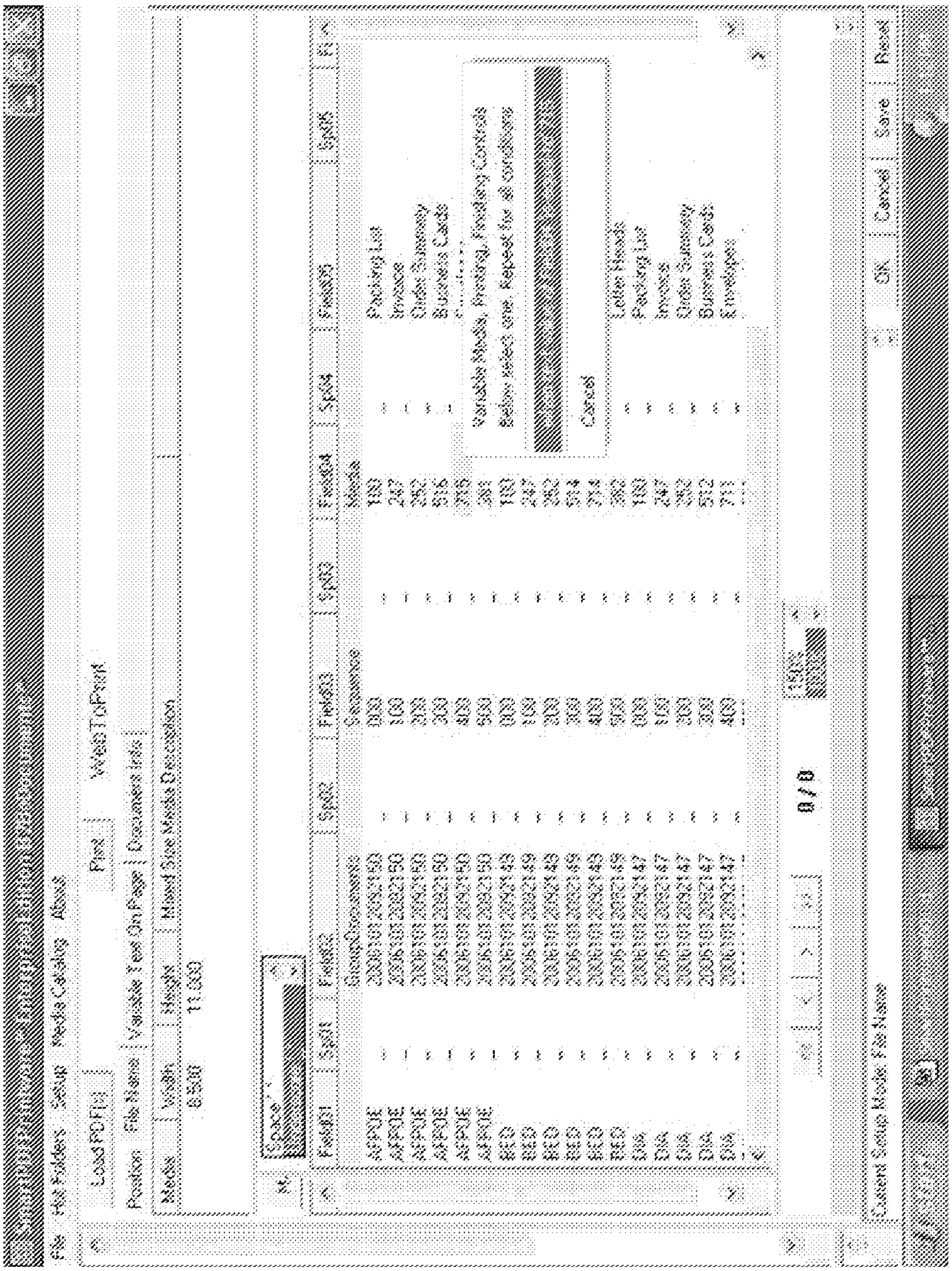
Figure 16O:
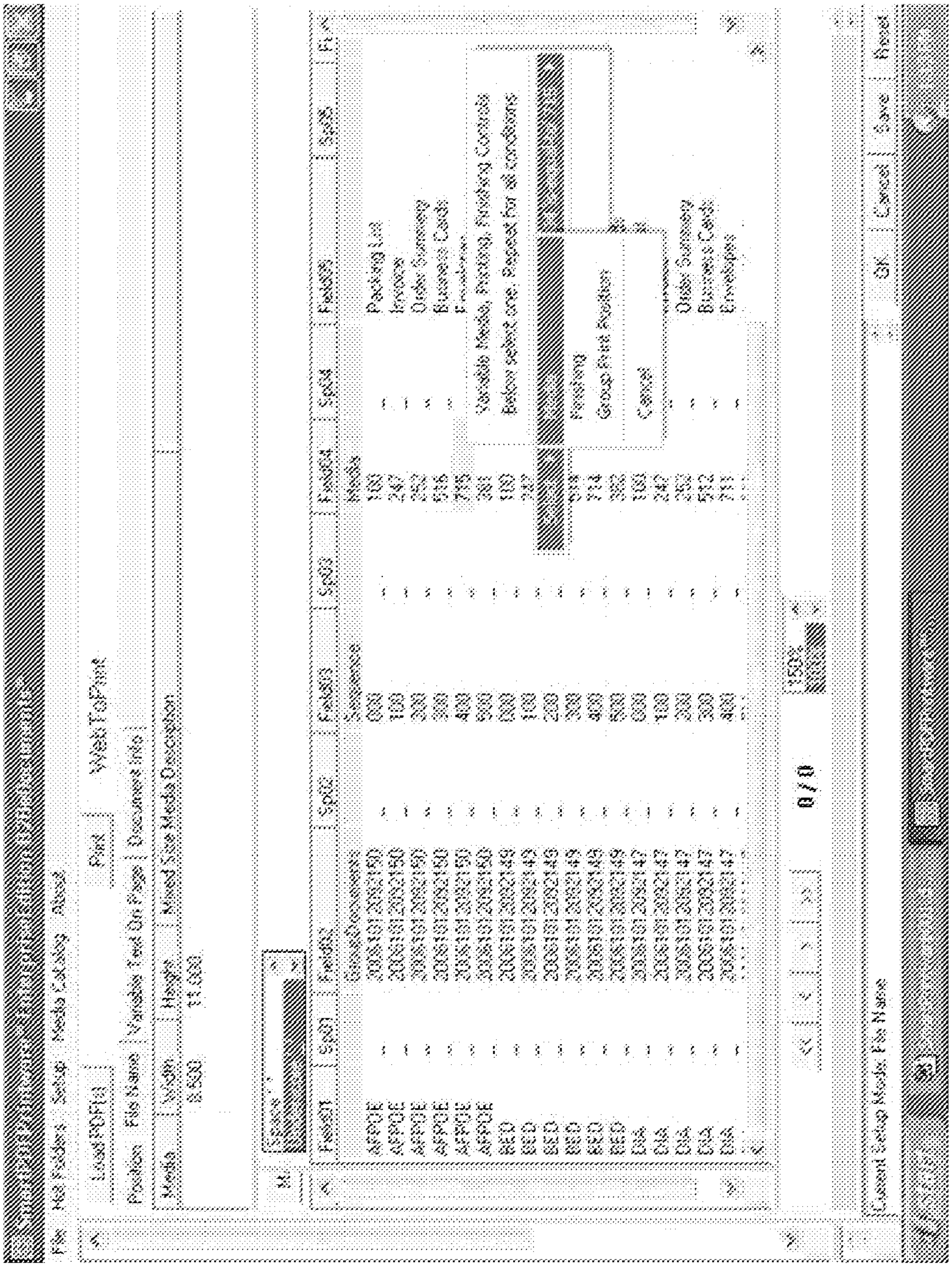
Figure 16P:
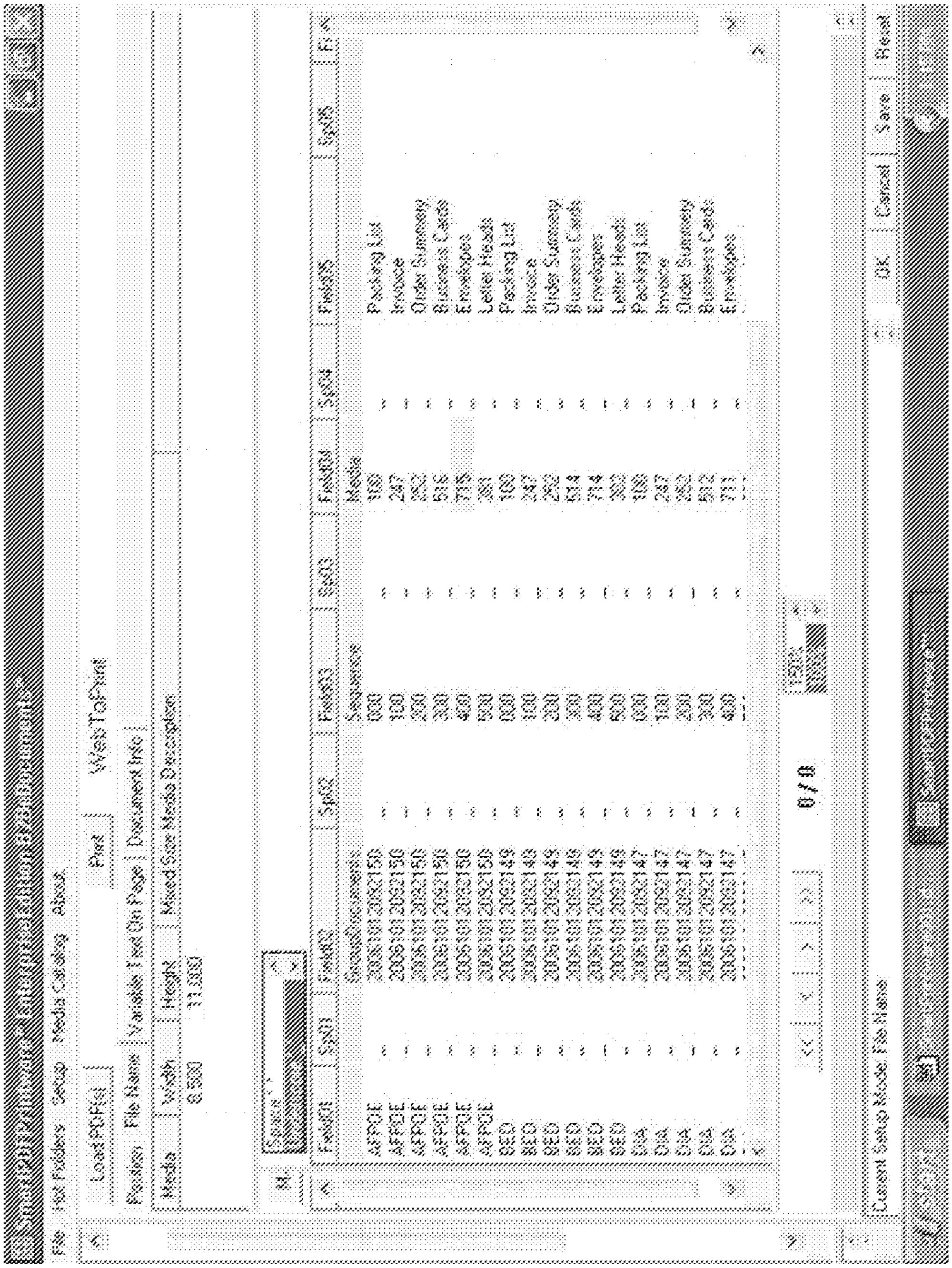
Figure 16Q:
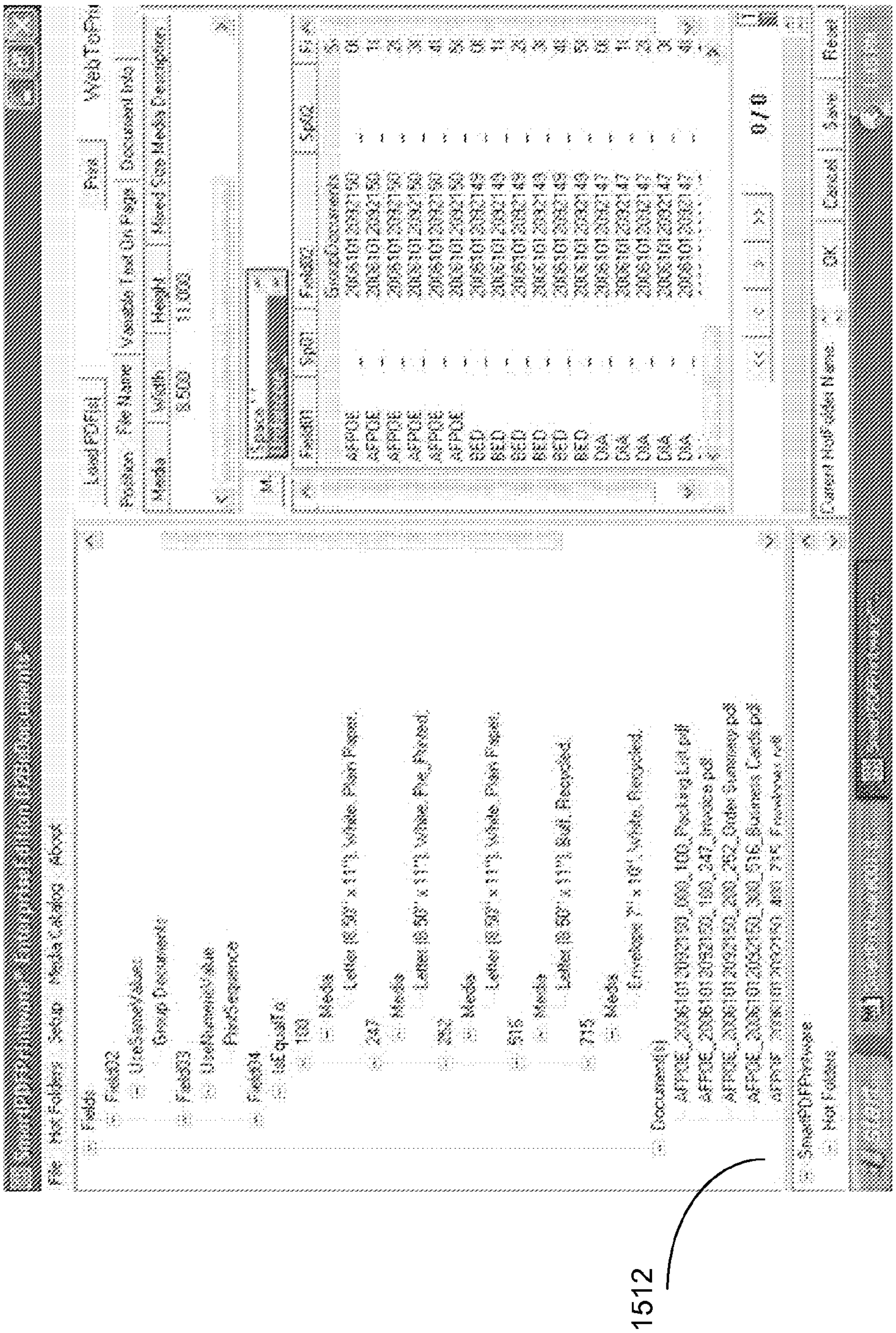
Figure 16R:
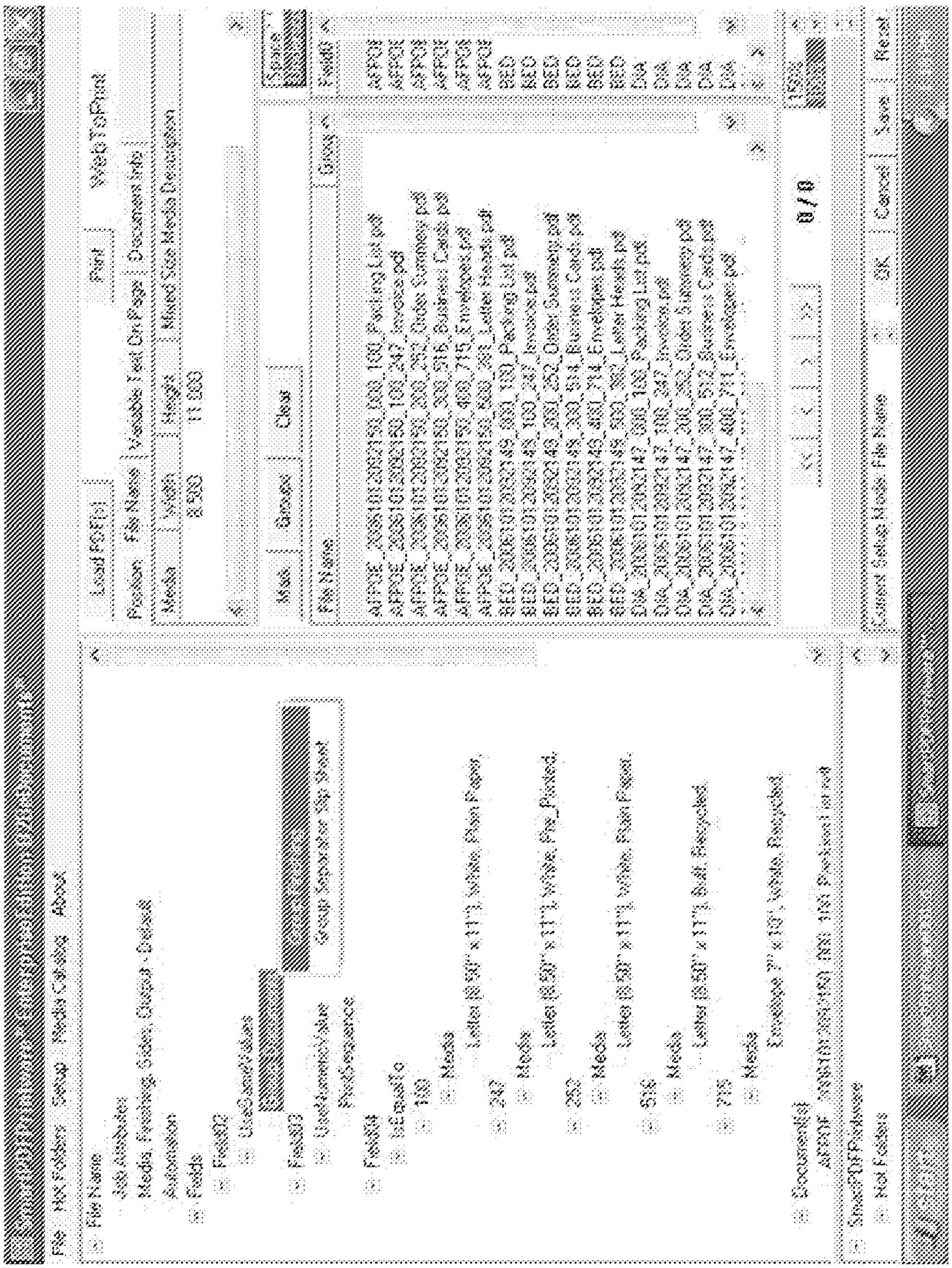
Figure 16S:
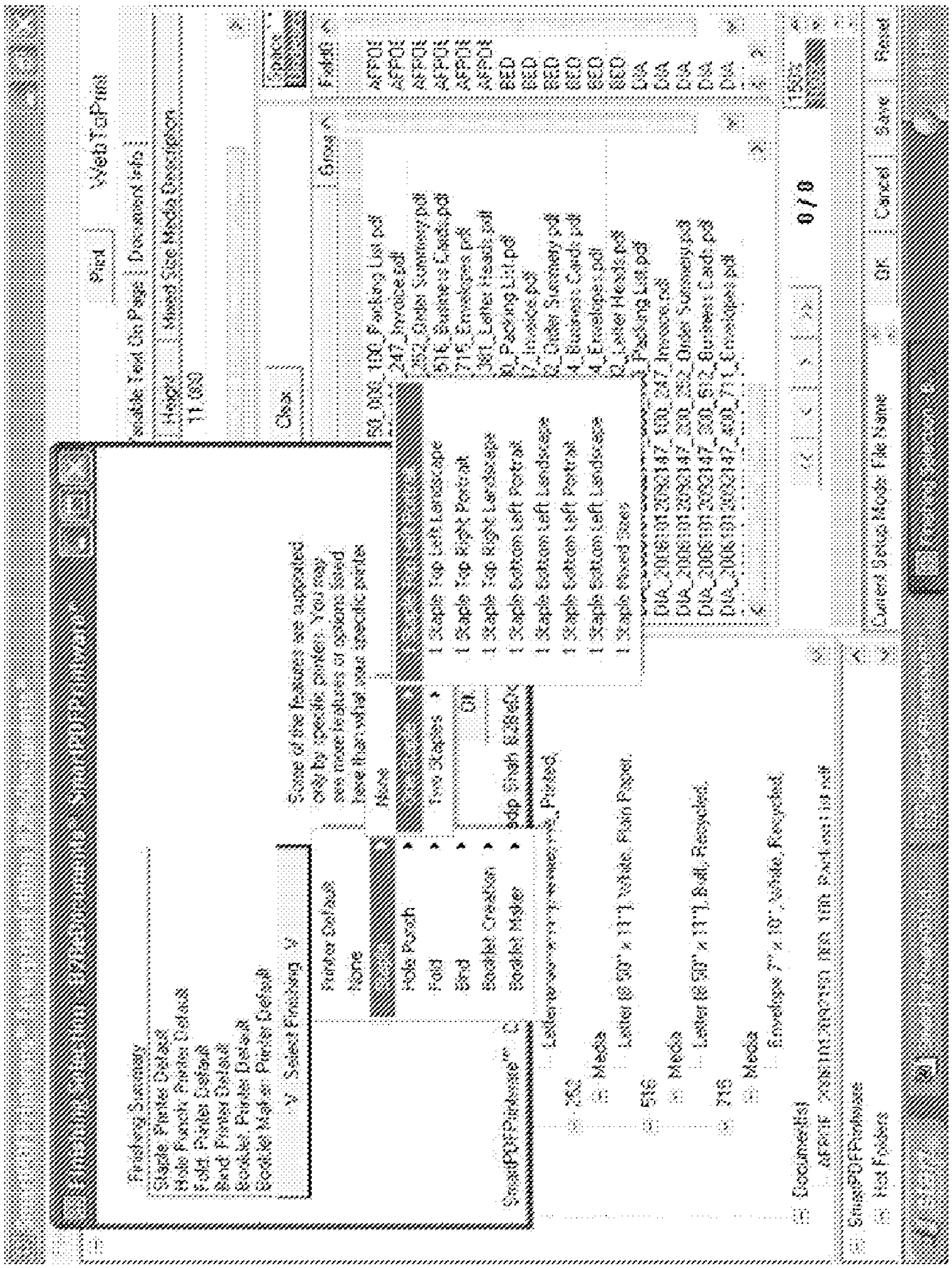
Figure 16T:
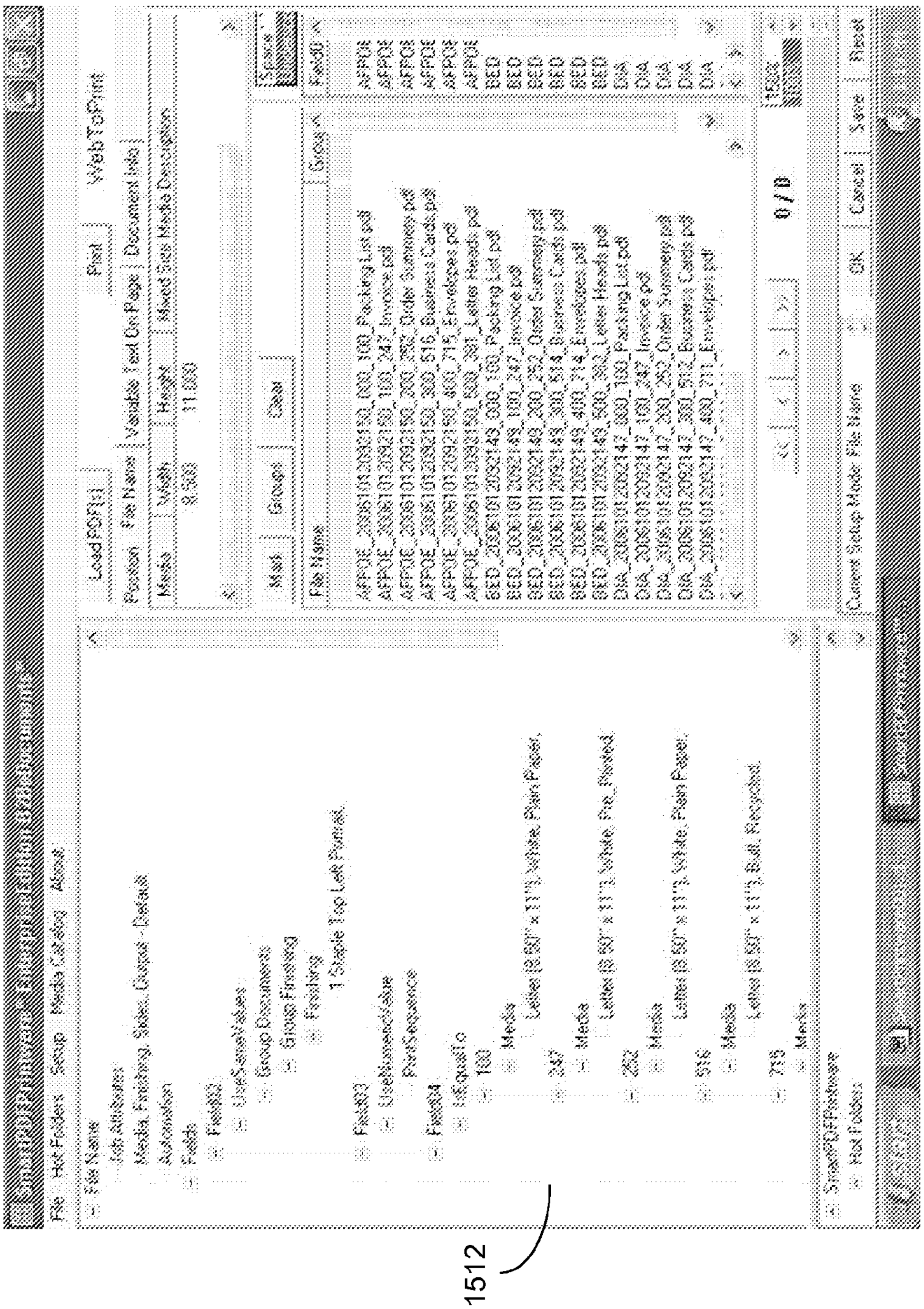
Figure 16U:
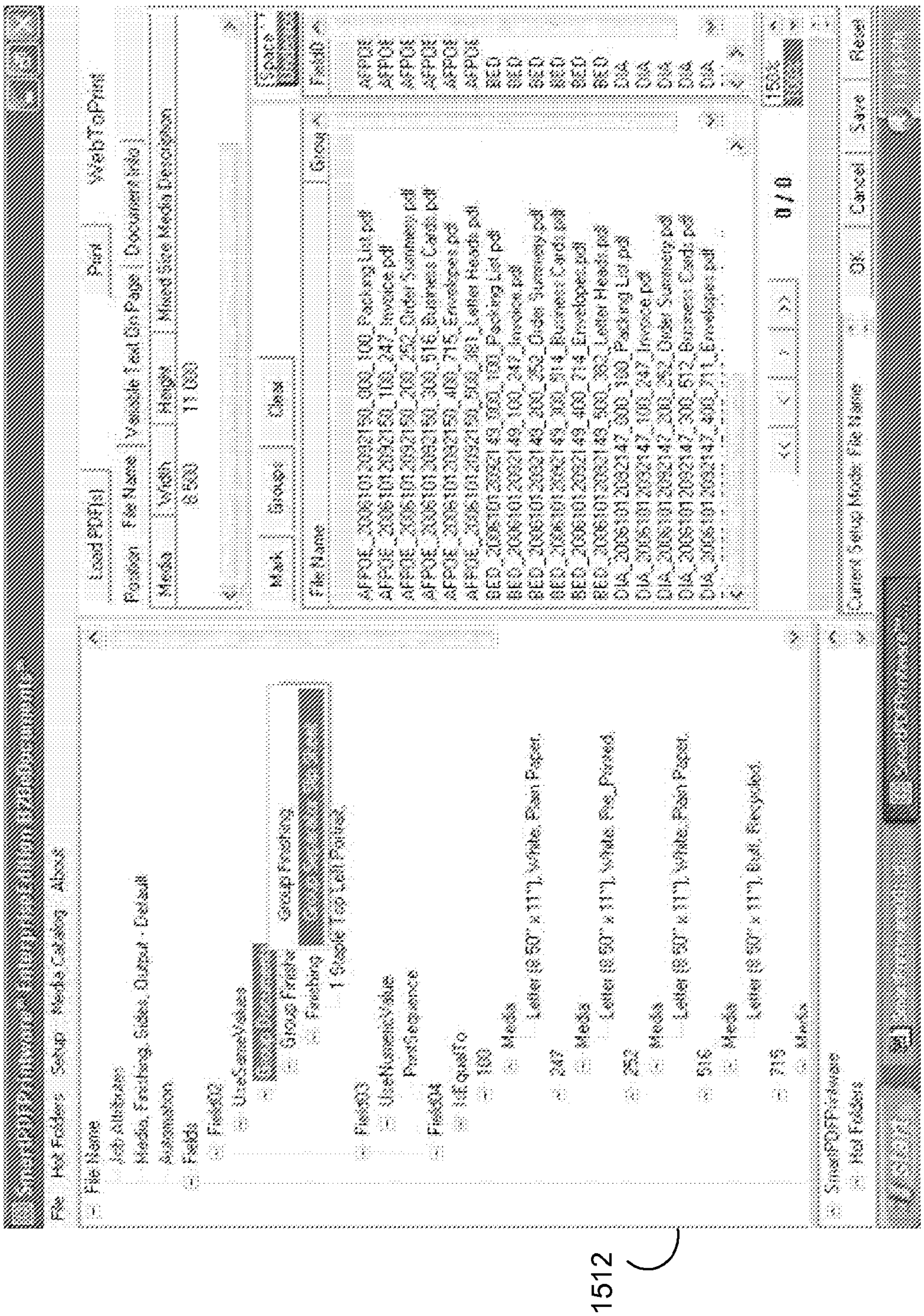
Figure 16V:
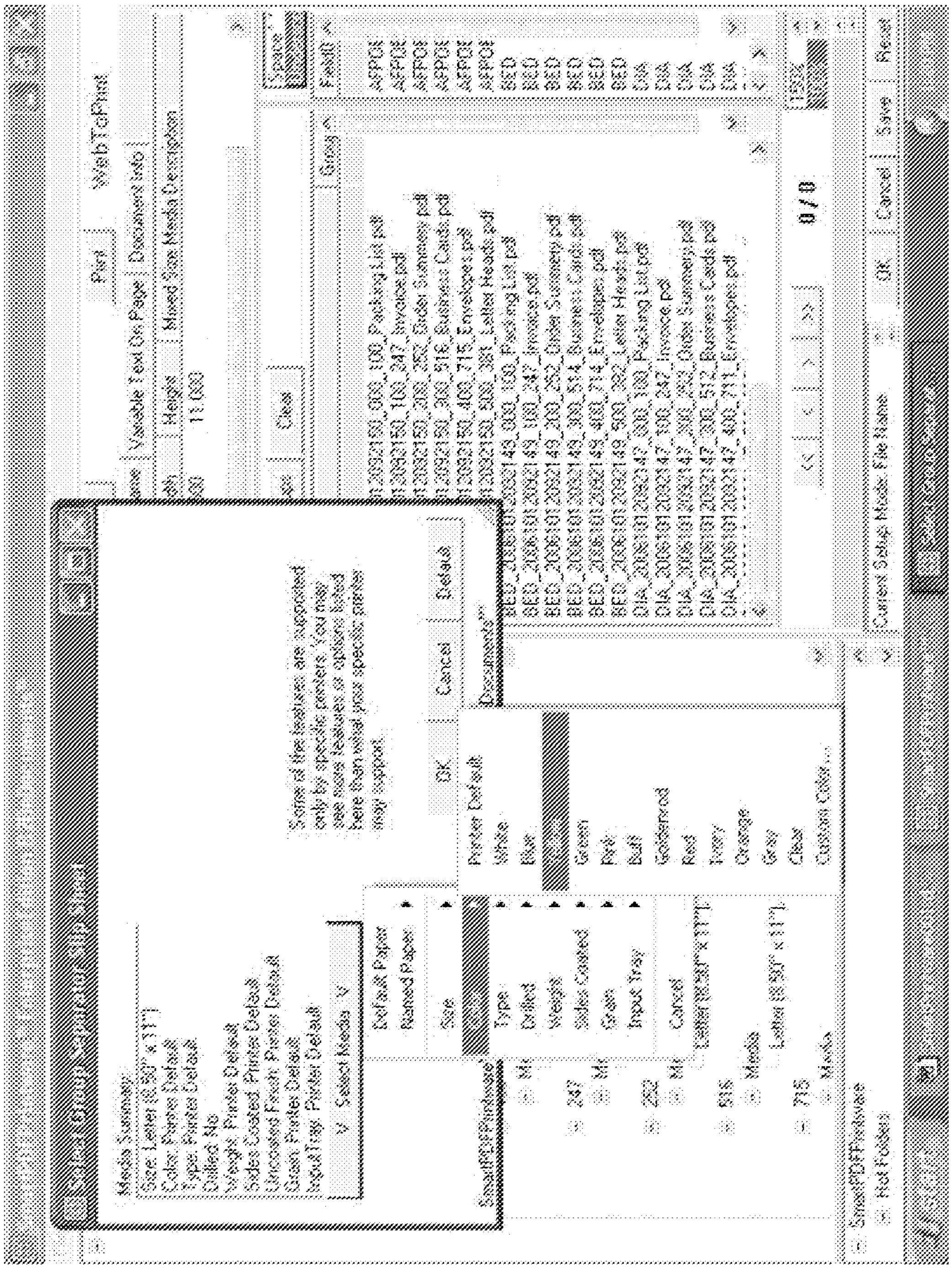
Figure 16W:
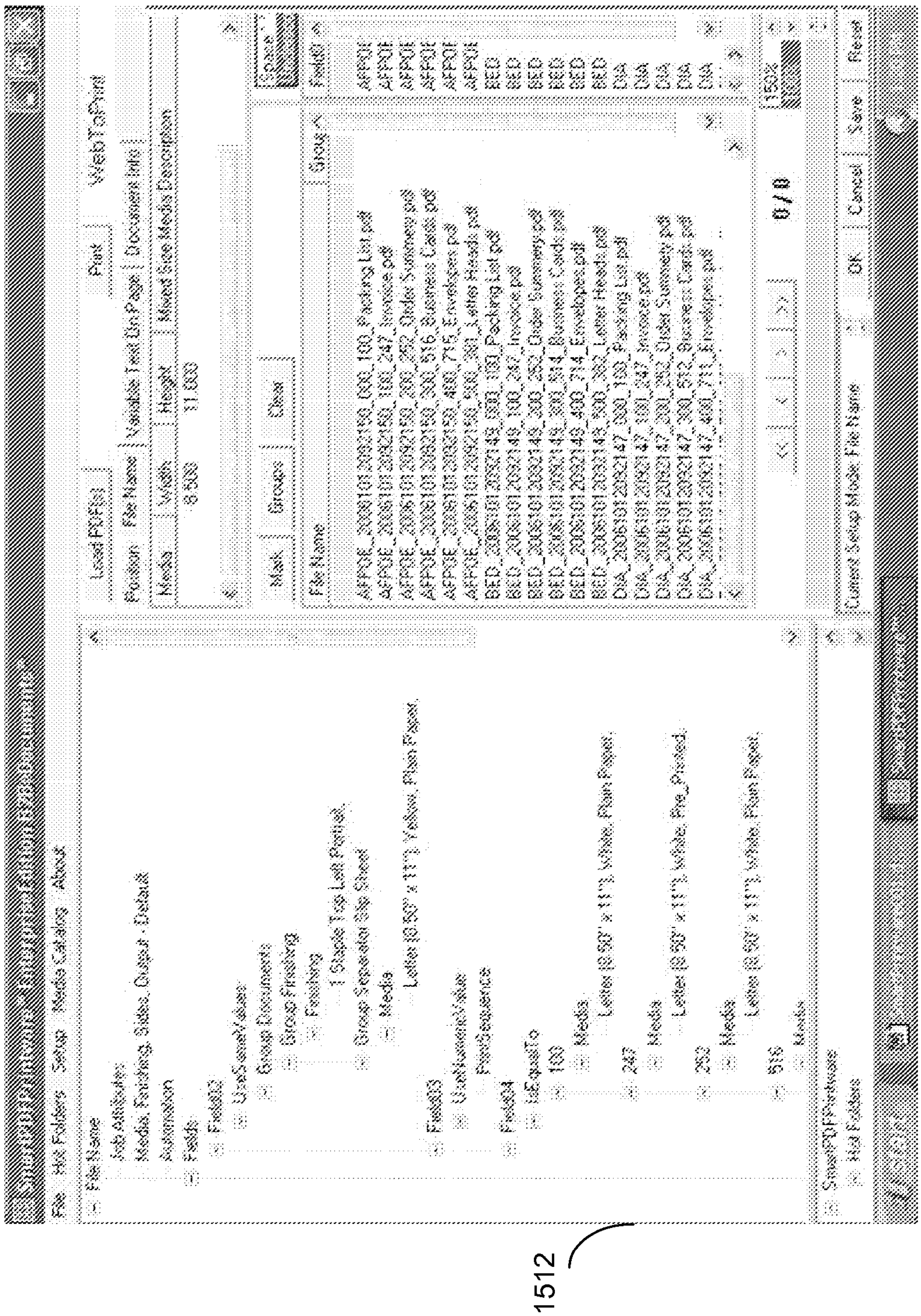

FIGS. 16A through 16W provide an illustrative example of files that may be received via the Web and the printing parameters which are defined based upon the file names. As shown in illustrative user interface screen 16A, in the file name mode, the user selects a folder entitled "WebToPrint" from panel 1510. FIG. 16B shows a listing of multiple files in the "WebToPrint" folder.

FIGS. 16C and 16D illustrate that the system, similar to that describes above, allows for a user to specify grouping files for printing and the ordering of files in a group using the values of fields. These assignments may be conditional as described above in connection with FIG. 15C. FIGS. 16E through 16P illustrate that a user may specify that the values in a particular field—in this case Field 4, may be used to define the media on which the pages in a particular file may be printed. Thus, the assignments of a media for a particular file is conditioned on the value of Field 4.

A hierarchical depiction of the print job is illustrated in panel 1512 of FIG. 16Q. As shown, the print and finishing parameters that have been defined by the user are represented in the hierarchical representation. Thus, under the hierarchical representation of Field 4 is a representation of the conditional relationship with the four identified values with associated media types. The media type associated with values of 100, 351, 402, and 293 are shown in the hierarchical layout.

As illustrated in FIGS. 16R through 16W, the user may employ the hierarchical representation of panel 1512 to define the printing and finishing parameters for groups of documents. As shown in FIG. 16R through 16W, a user may select items in the hierarchical representation and associate a print or finishing attribute using pop-up windows. In the particular example illustrated in the figures, the hierarchical representation of panel 1512 receives inputs from the user to identify that a particular field—field 2—is used to dictate the grouping and finishing of documents. The inputs made via the hierarchical representations are reflected in the hierarchical representation of panel 1512.

Figure 16X:
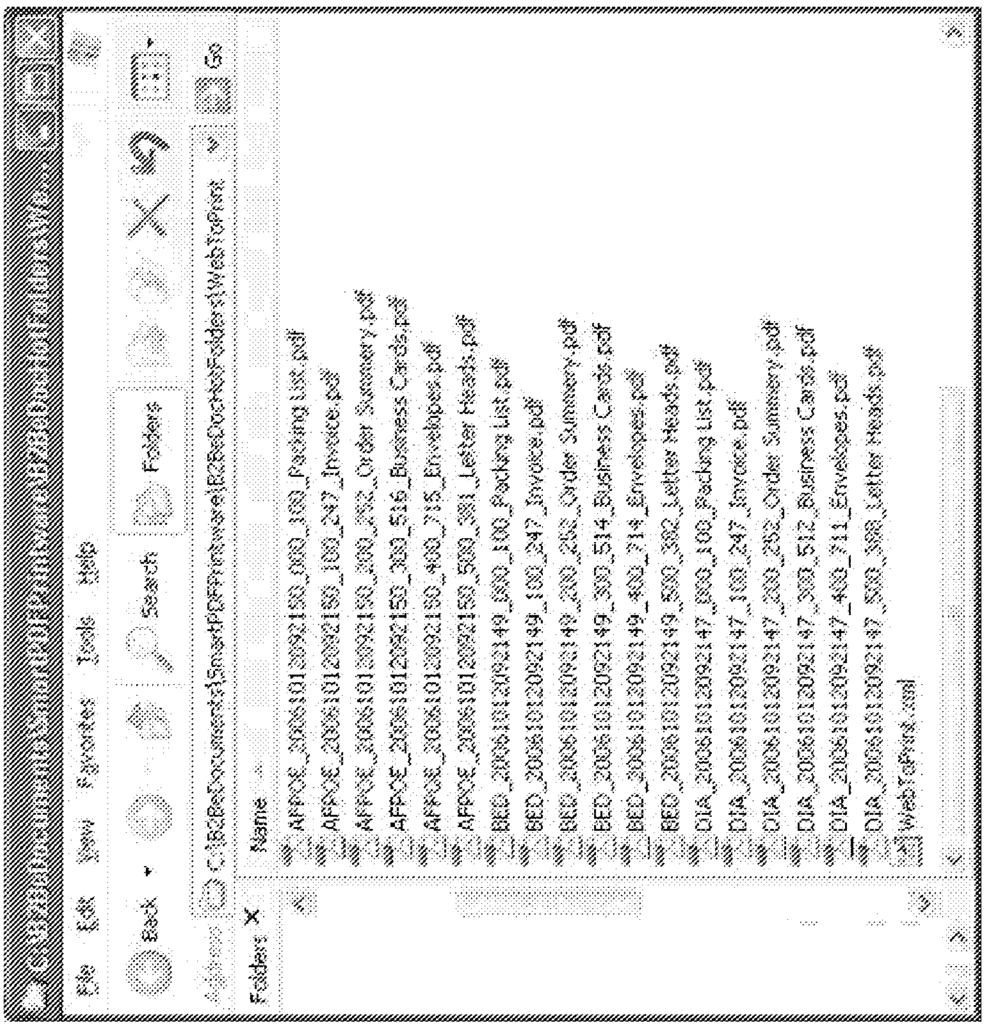

The printing and finishing parameters that have been specified to be derived from the file names in a print job are stored for later retrieval and use in formatting a feed for printing. In an illustrative embodiment, the rules are stored in a XML file which may be stored in a print job folder with the files that are to be printed and finished as part of the print job. The file where the user-defined parameters are stored may be referred to as the print job rules file. FIG. 16X is a user interface screen illustrating such an XML file stored with the related files in a print job folder.

In connection with establishing printing and finishing parameters using the position of files as described above in connection with FIG. 13, it was explained that page sizes may be associated with a particular media. Similarly in connection with establishing printing and finishing parameters using file names, page sizes found in a print job may be associated with a particular media. Thus, when a user selects to define print parameters using file names, the illustrative system scans the documents in a print job folder for all unique page sizes in the documents. The unique page sizes that are identified are listed the mixed media size panel 1518. Thereafter, a user may form associations between each page size and a particular media.

Figure 17A:
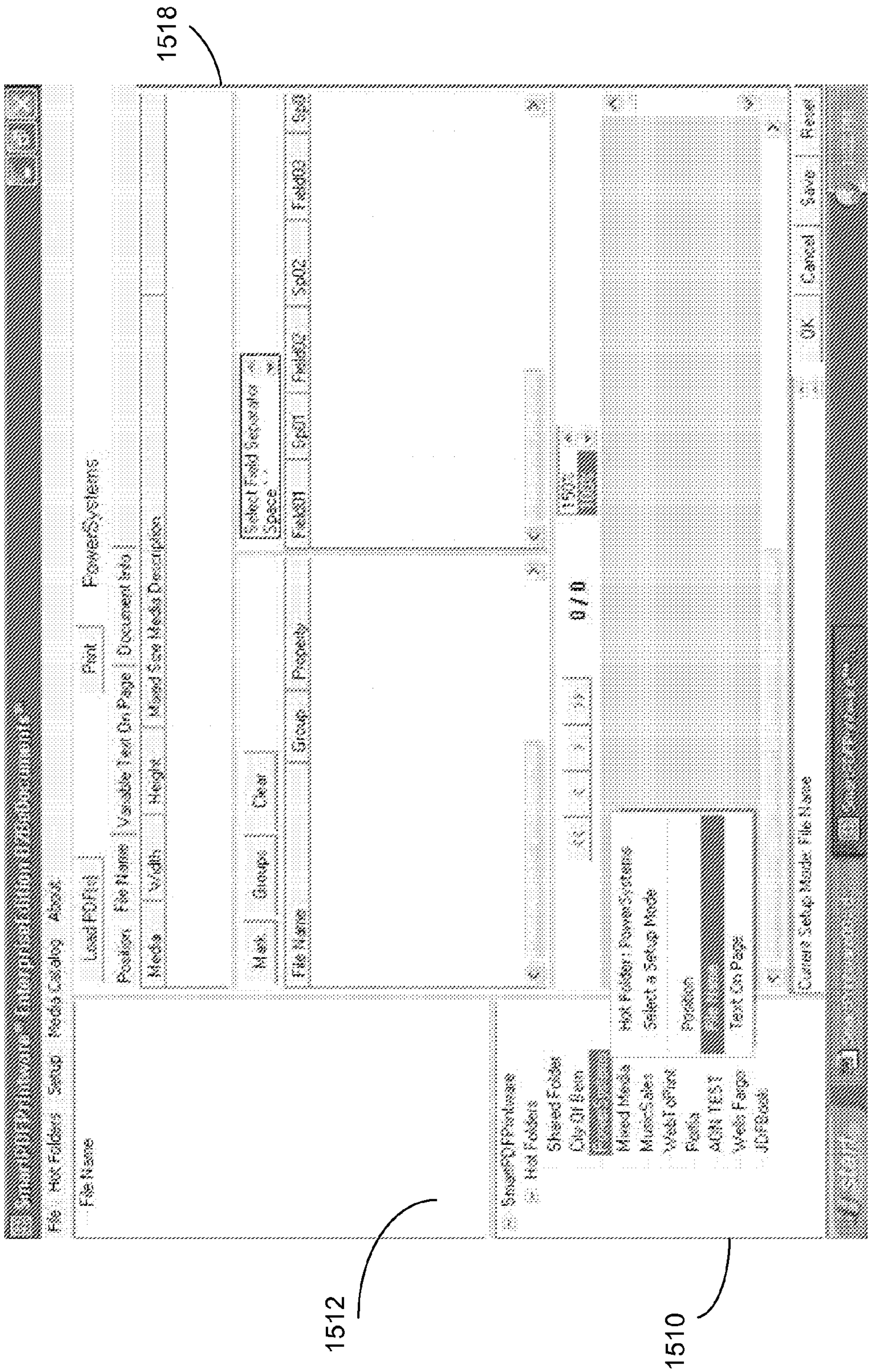
FIGS. 17A through 17K depict illustrative data screens that may be used in an exemplary system to define print rules for a print job using the values of fields in file names.
Figure 17B:
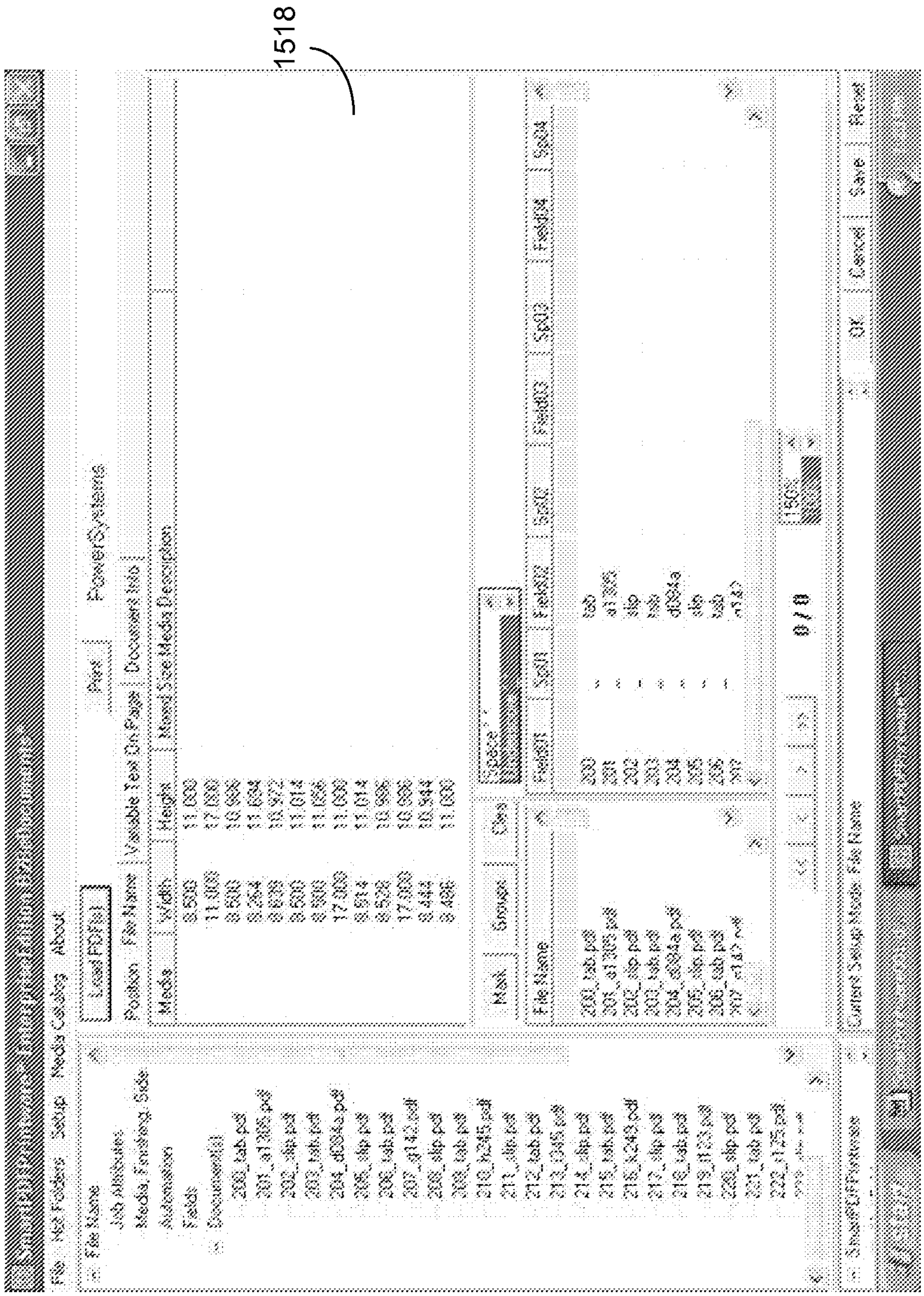
Figure 17C:
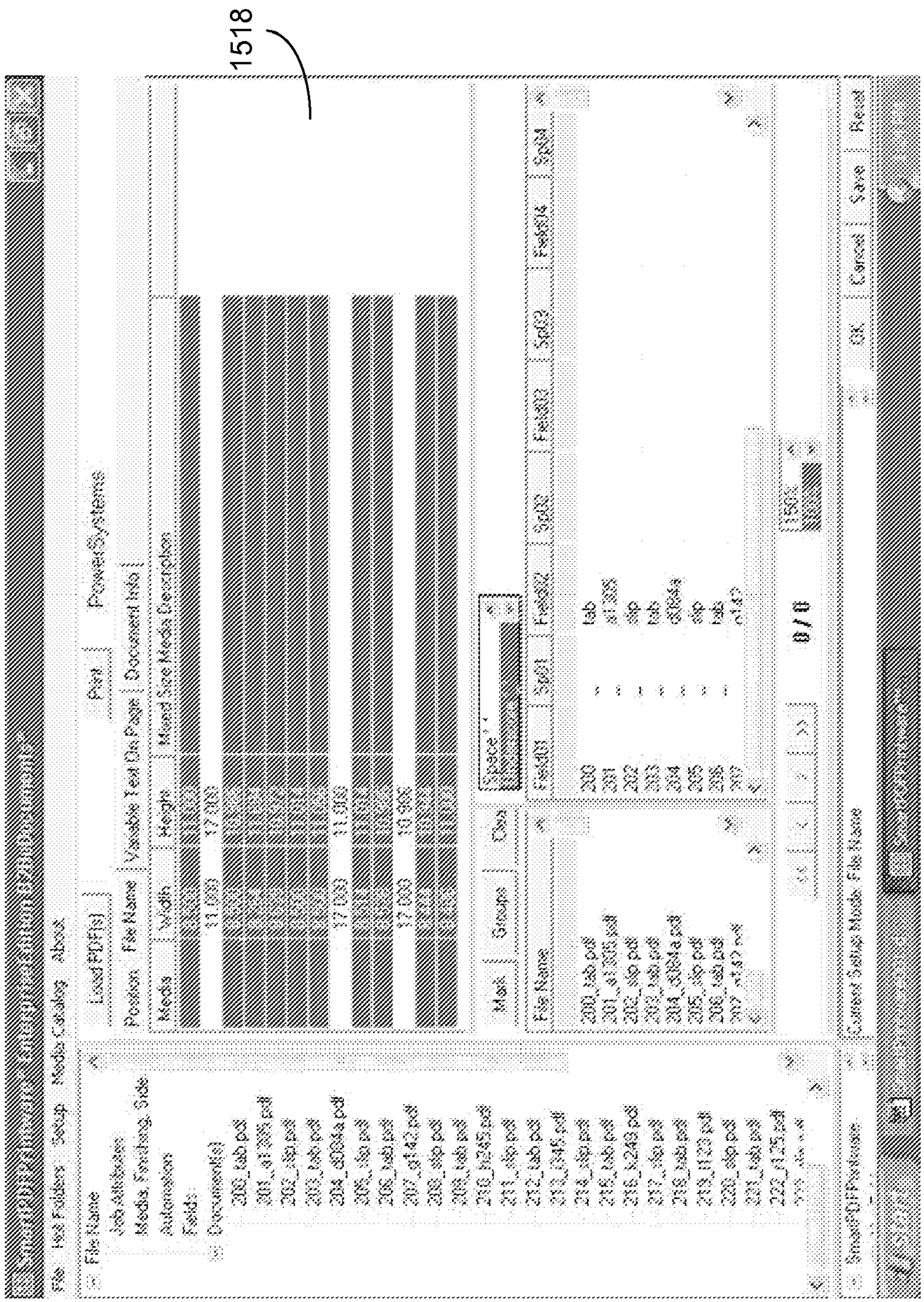
Figure 17D:
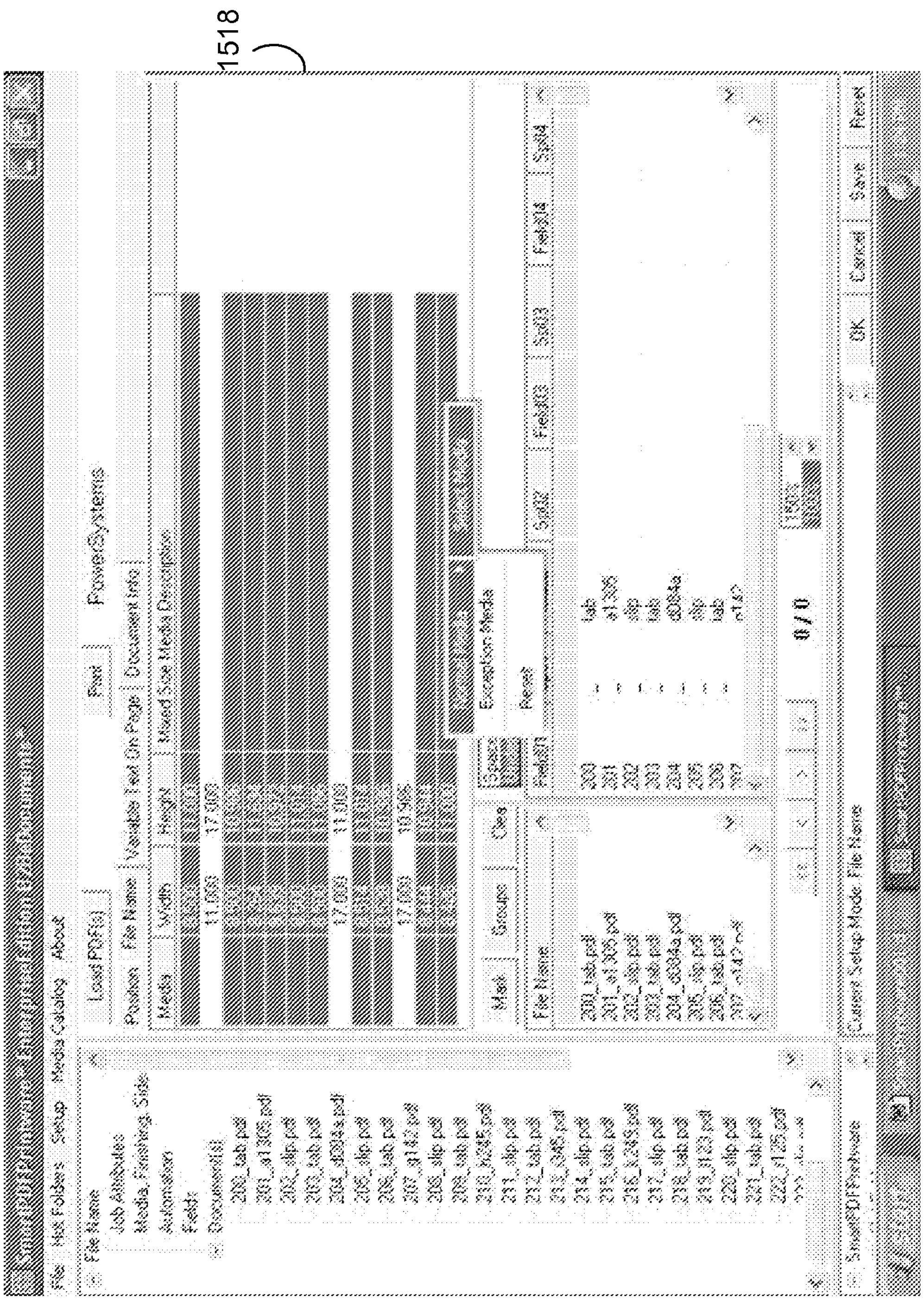
Figure 17E:
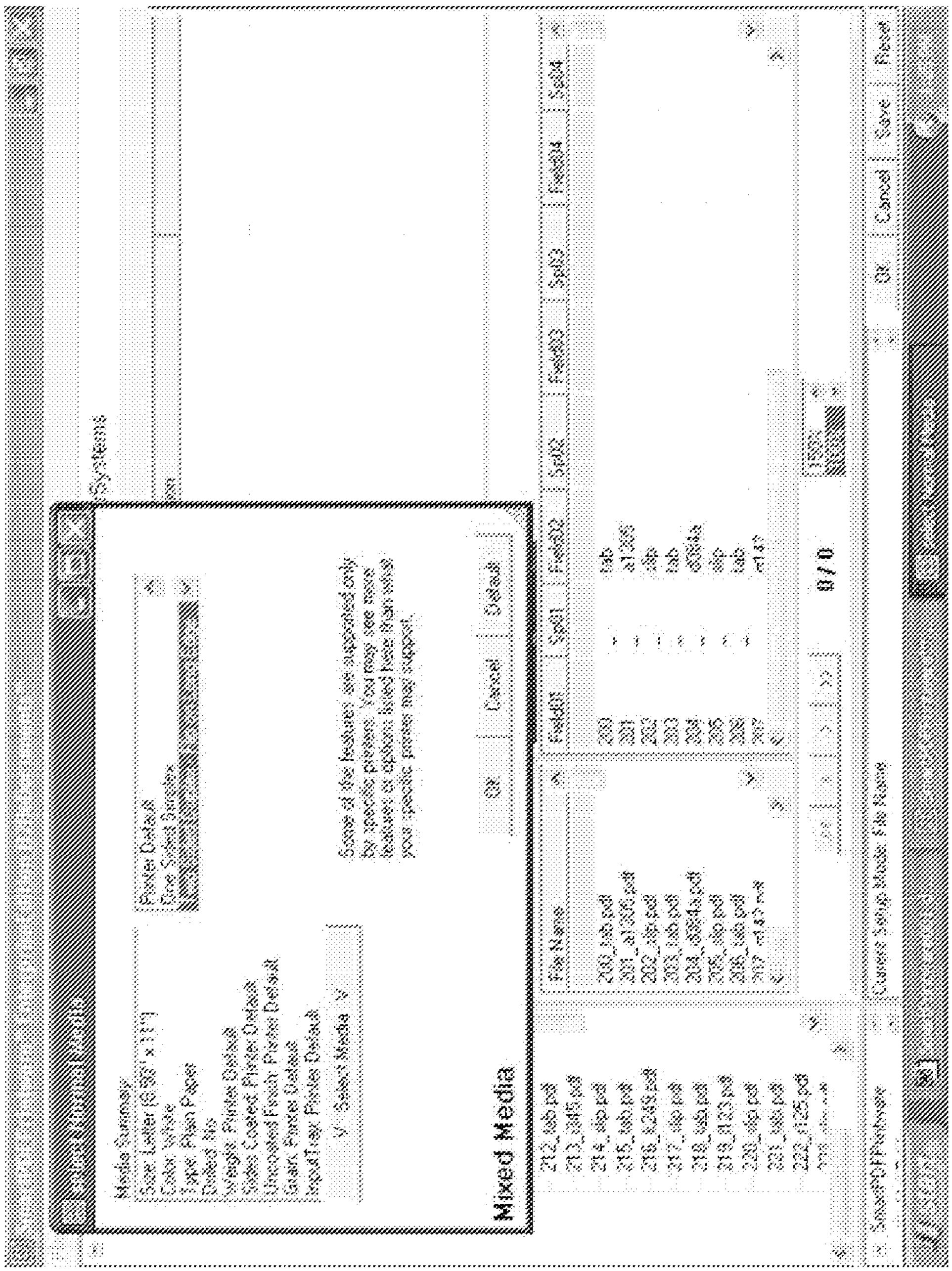
Figure 17F:
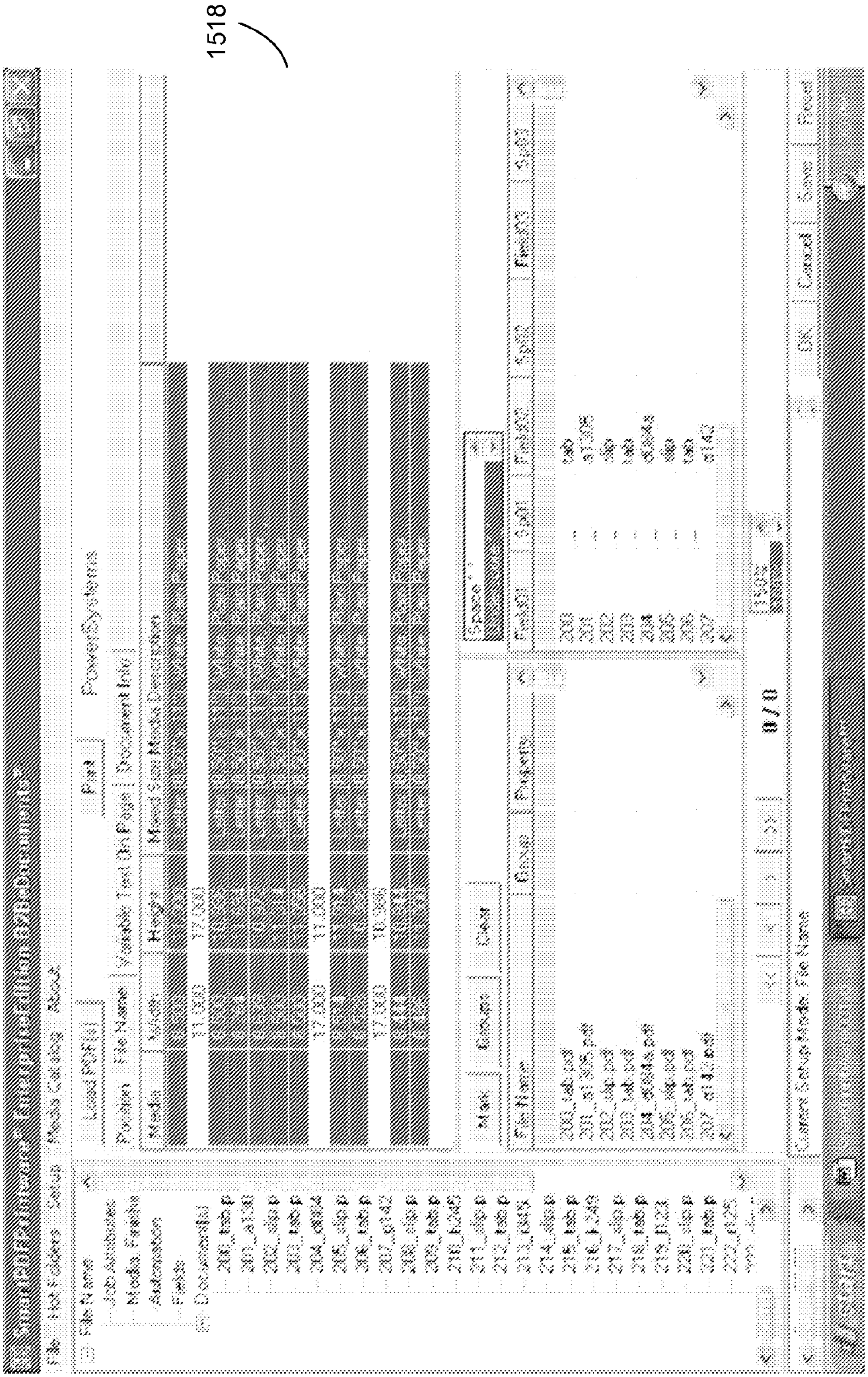
Figure 17G:
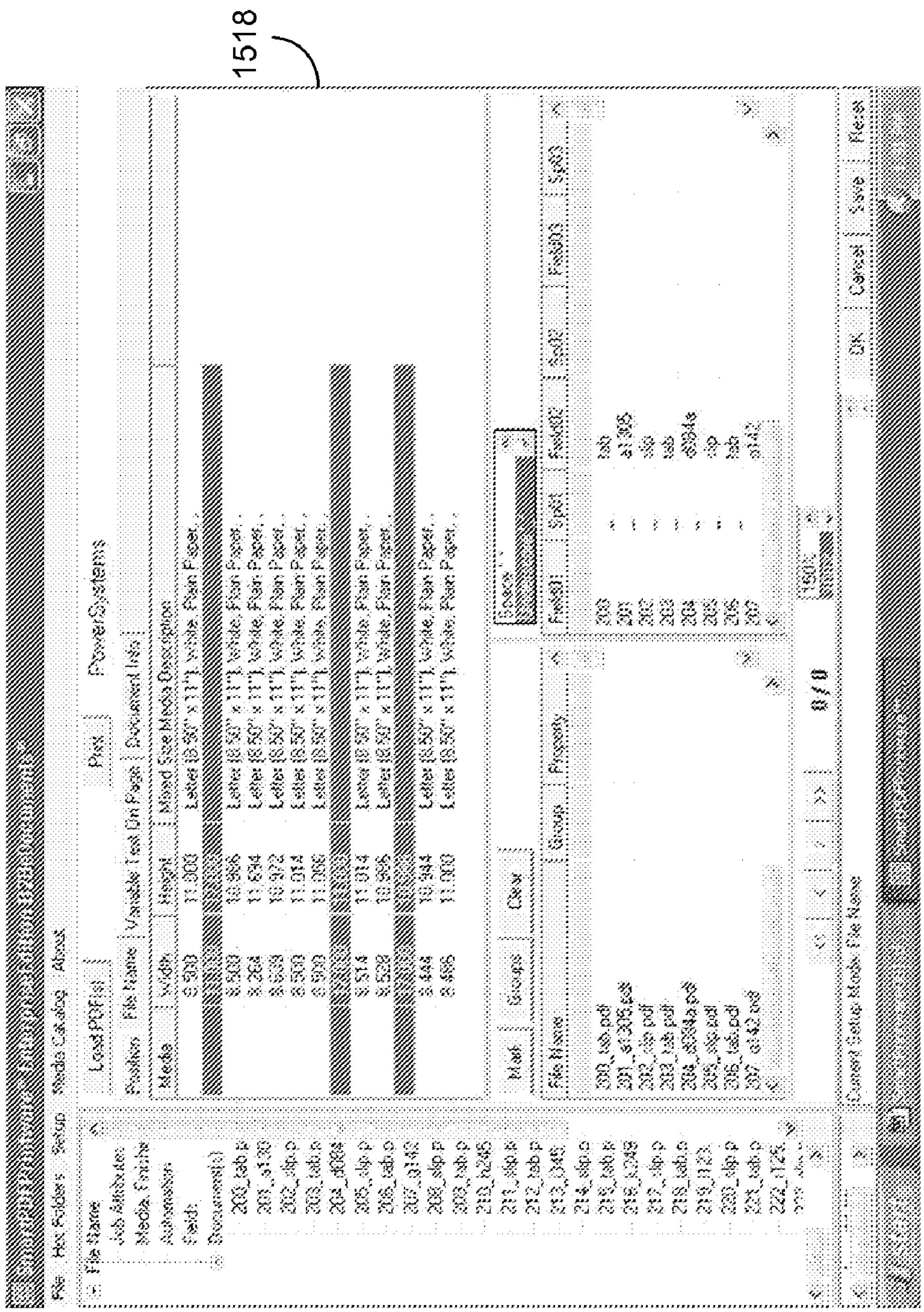
Figure 17H:
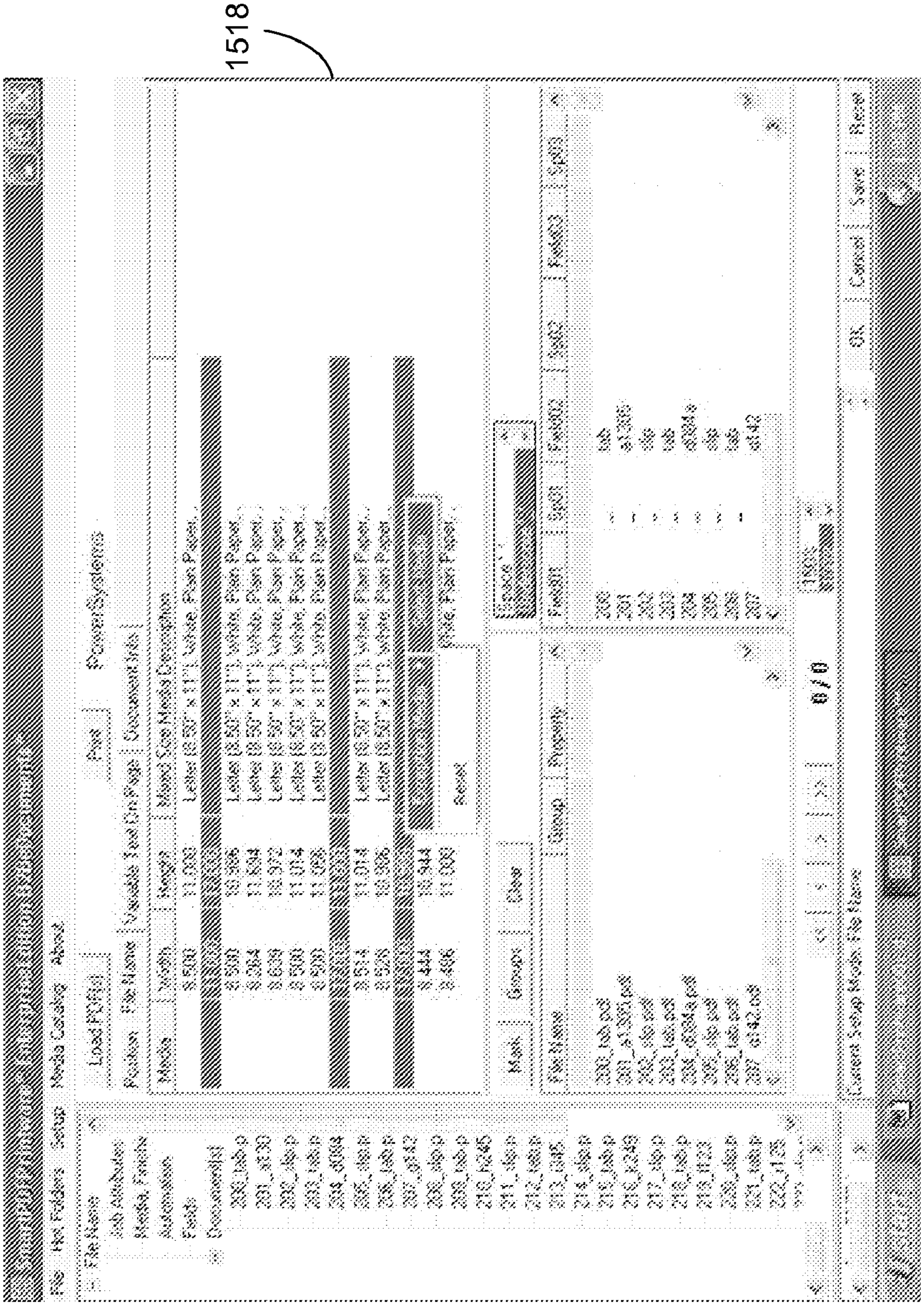
Figure 17I:
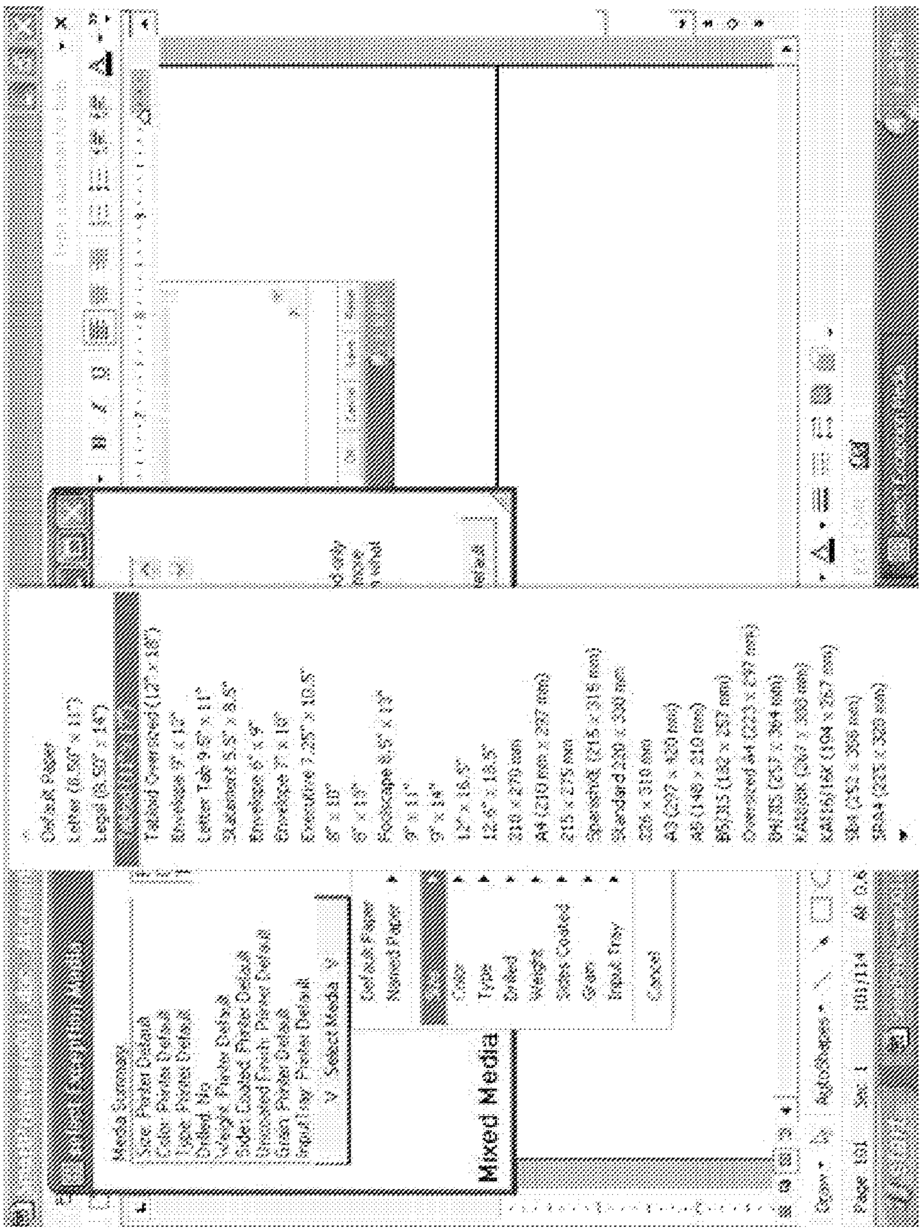
Figure 17J:
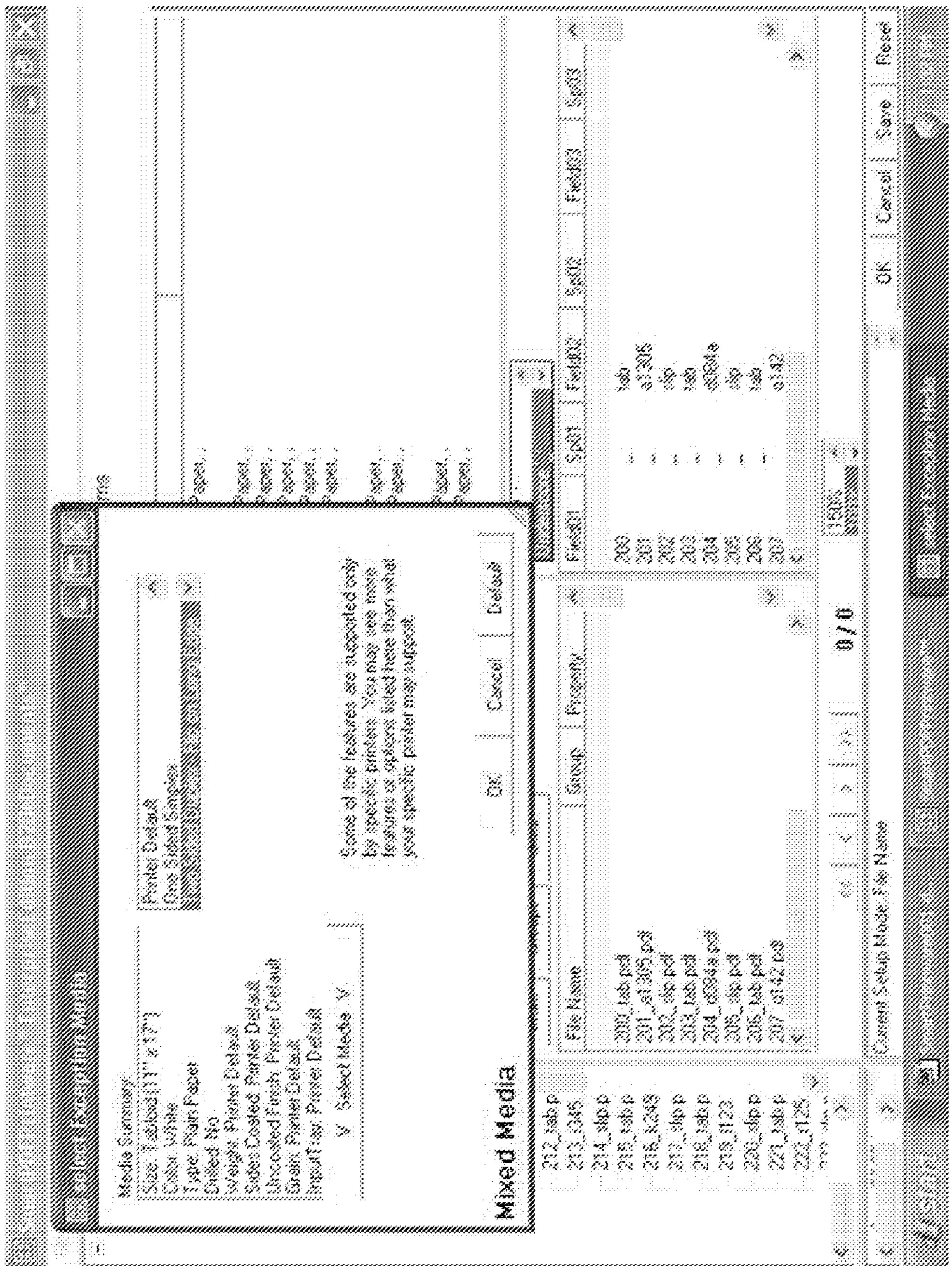
Figure 17K:
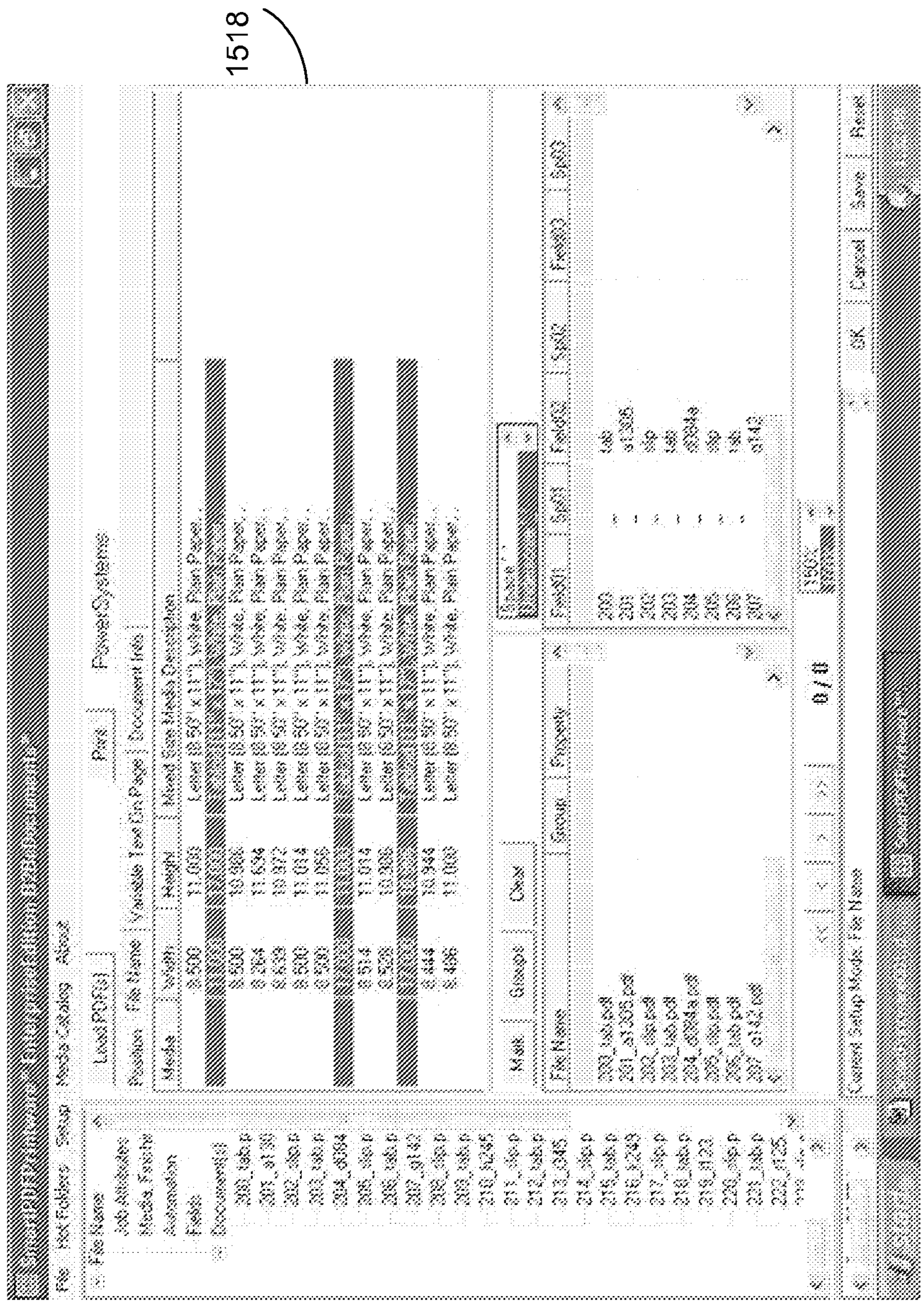

FIGS. 17A through 17K provide screens illustrating the association between page sizes and media's in the context of defining print and finish parameters using file names. As illustrated in panel 1518 of FIG. 17B, there may be instances where several of the listed page sizes in a print job are very similar, but not exactly the same. In the example of FIG. 17B, there are multiple instances of pages that are about 8.5 by 11 inches in size. This situation may result, for example, where pages in the documents have been scanned and the scanning did not result in a completely accurate representation of the page size. In these situations, and as illustrated in FIGS. 17C through 17G, the user may associate all of these different page sizes with a single media, which in the case of the illustrative example, is white plan 8.5 by 11 inch paper. This particular media is designated as the "normal" media type for the print job. FIGS. 17H through 17K represent an illustrative assignment of a second media type (11 by 17 white plain paper) to a second page size. This second media is identified as an "exception" media. The user's associations between the page sizes and the selected media are stored with the other printing and finishing parameters in the print jobs rules file which may be, for example, an XML file.

Figure 18A:
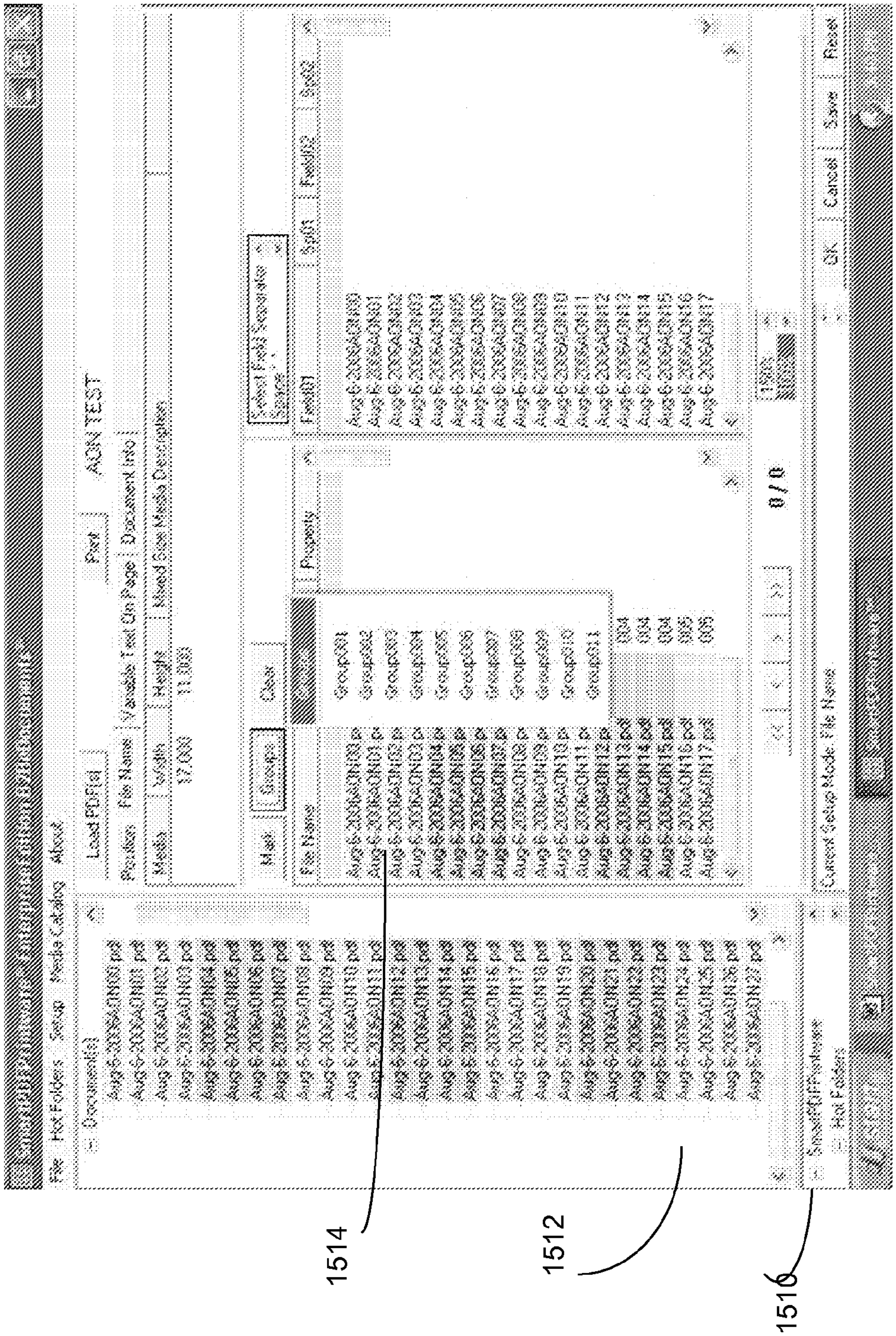
FIGS. 18A through 18D depict illustrative data screens that may be used in an exemplary system to define document groups and related print rules.

In connection with defining printing and finishing parameters using file names in a print folder, an illustrative system also provides for defining parameters for groups of files in a print folder. For example, an illustrative system provides that user may, for example: select a media for a group of documents; select finishing for a group of documents; select to print a group of documents in either simplex or duplex; insert a slip sheet between groups; and print multiple copies of a group. FIG. 18A provides an illustrative user interface screen showing that a plurality of groups of documents have been defined by the user. A user may specify groups of files by, for example, selecting the desired files with a pointing device and then depressing the button labeled "group." In the illustrative user interface screen of FIG. 18A, the individual groups are designated by the variations in shading.

Figure 18B:
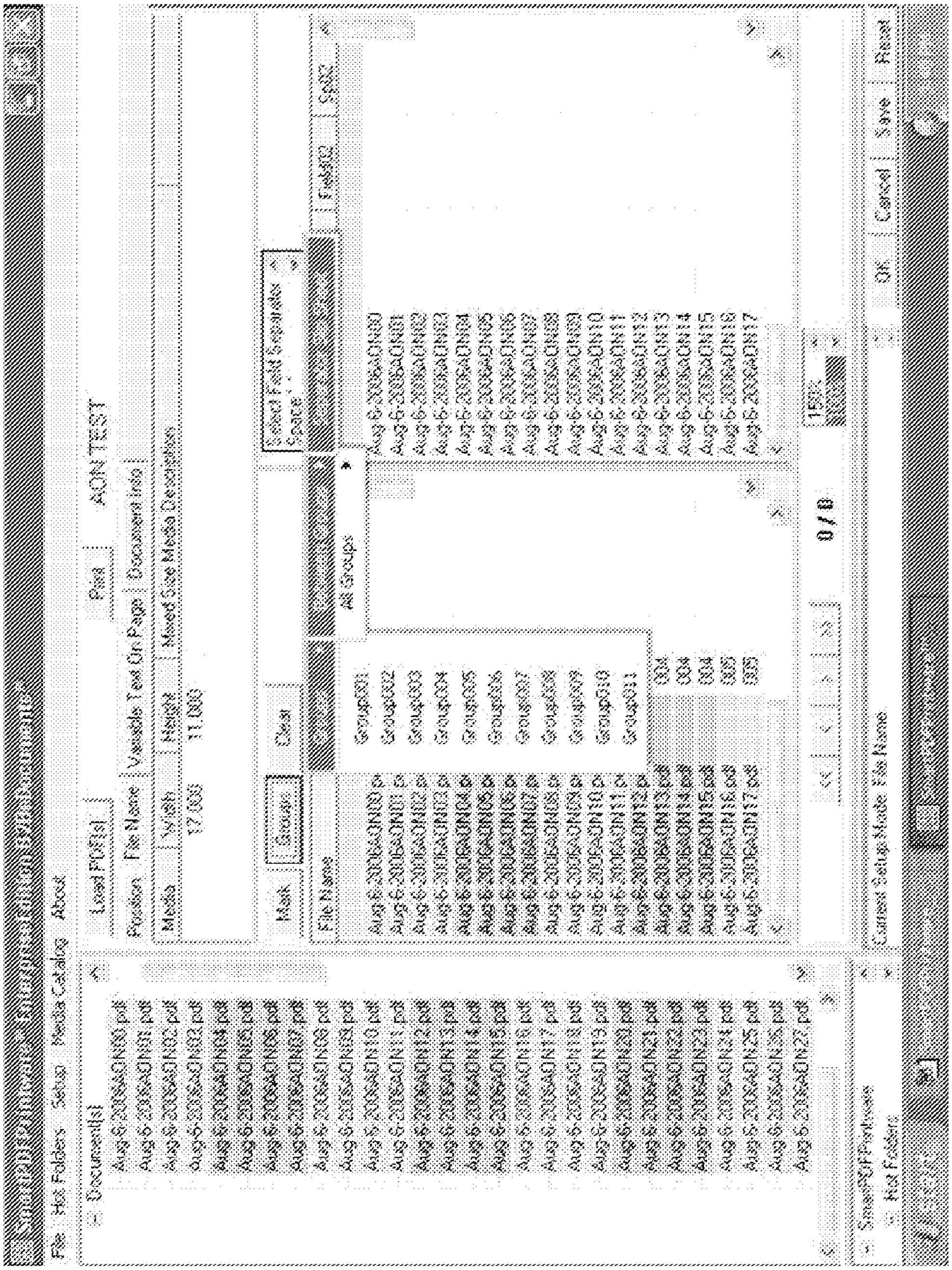
Figure 18C:
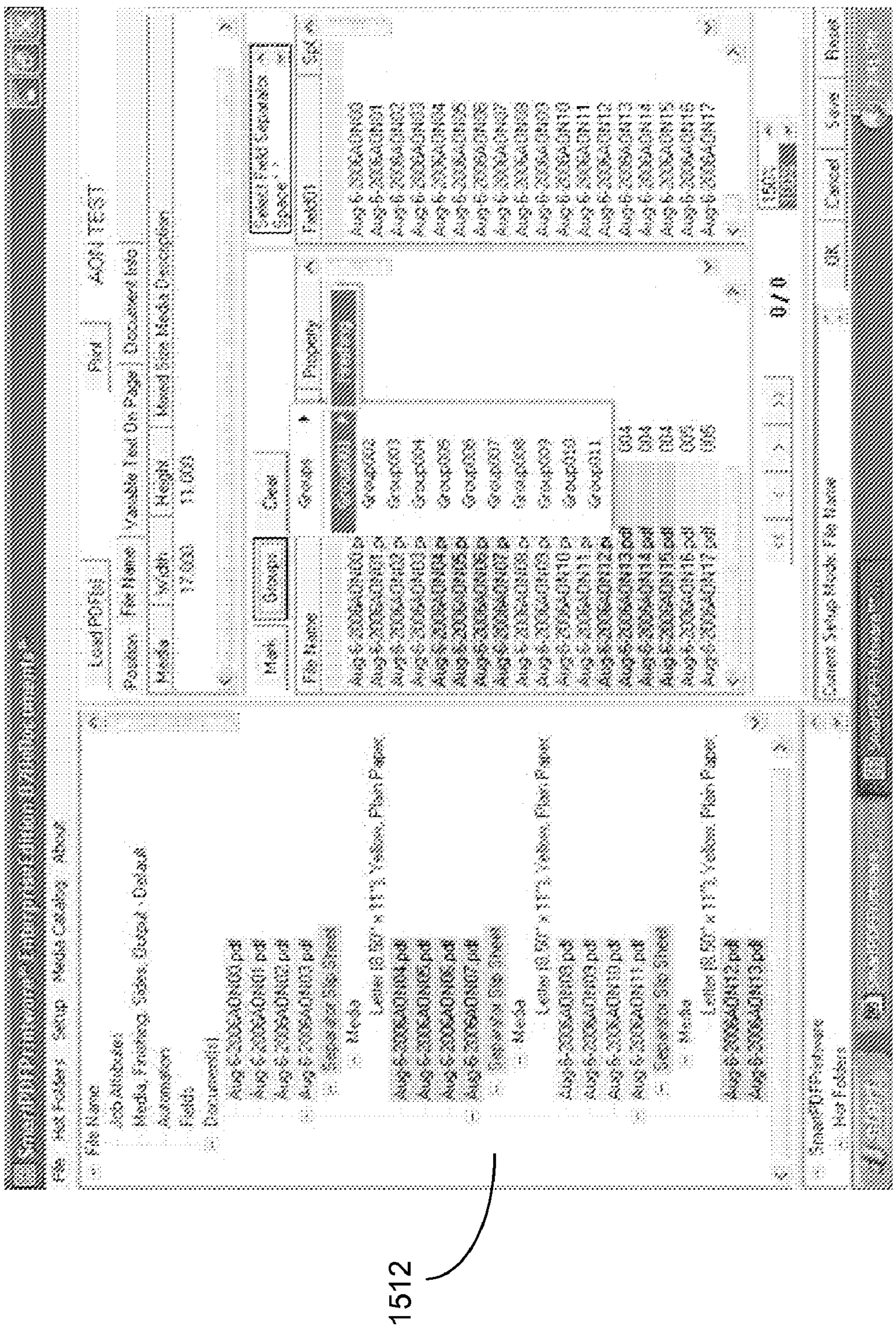
Figure 18D:
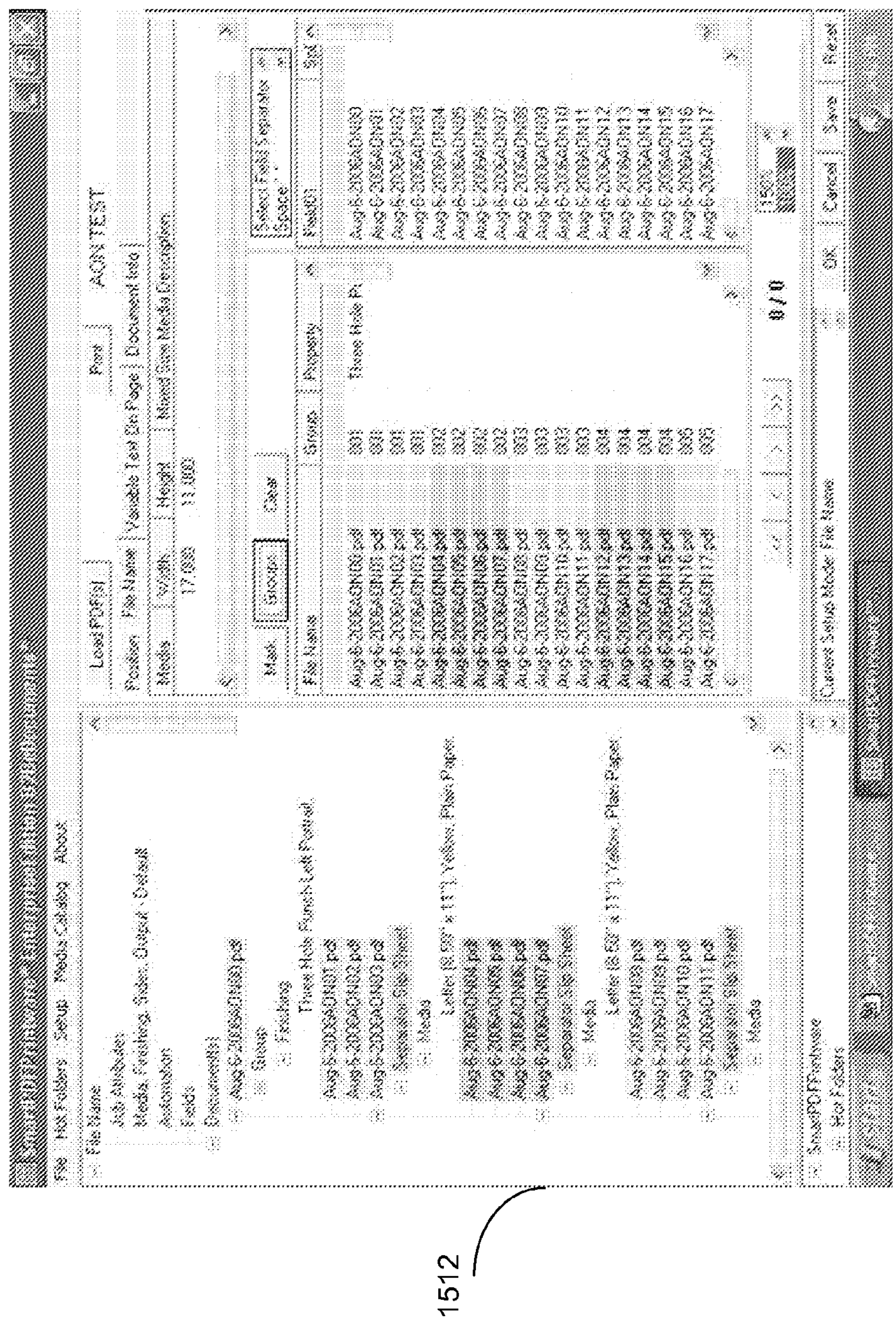

Once a group has been defined, an illustrative system provides for users to specify printing and finishing parameters. As shown in FIGS. 18B through 18D, the user may define printing parameters such as inserting a slip sheet between groups or specifying the finishing options to be applied to a group. The inputs from the user are reflected in the hierarchical representation of the documents presented in panel 1512.

Thus, an illustrative system provides a user interface that allows the user to define printing and finishing parameters for a print job. The system allows users to set parameters to: group and concatenate documents; split documents into subsets; control the sequence of printing of documents/pages in a print job; select and identify a normal media; select and identify an exception media; identify page level override of the normal media; identify finishing parameters including document level and group level finishing; select simplex or duplex printing at the document and/or group levels; insert tabs between pages and documents; print on tabs; insert sheets between pages and documents; insert covers at desired locations in a print job.

The printing and finishing parameters that have been specified to be derived from the file names in a print job are stored for later retrieval and use in formatting a feed for printing. In an illustrative embodiment, the rules are stored in a XML file which may be stored in a print job folder with the files that are to be printed and finished as part of the print job. The file may be referred to as the print job rules file.

In an illustrative system, a third paradigm for defining print and finishing parameters involves specifying parameters as a function of the text appearing on a page. Thus, a user may specify if a particular word or phrase appears on a particular portion of the page, a selected type of finishing should applied. Formatting the printing parameters based upon the text that appears on the pages of a document is particular useful in situations wherein a large number of logically separate documents are created and/or stored in a single electronic file. For example, a single electronic file may contain the bank statements of a large number of separate customers. Often the logically separate documents can be delineated by the text that appears in the documents. This allows the logically separate documents to be separated upon printing. Further, electronic documents may be specifically formatted to include text at particular locations on pages so as to operate as triggers to perform a particular type of printing or finishing. The text on the page may be used to specify, for example, parameters defining: the splitting of an electronic file into logically separate documents; inserting covers; selecting a default normal media; selecting override media; inserting sheets; inserting tabs; inserting slip sheets; and the number of copies to be made.

Figure 19A:
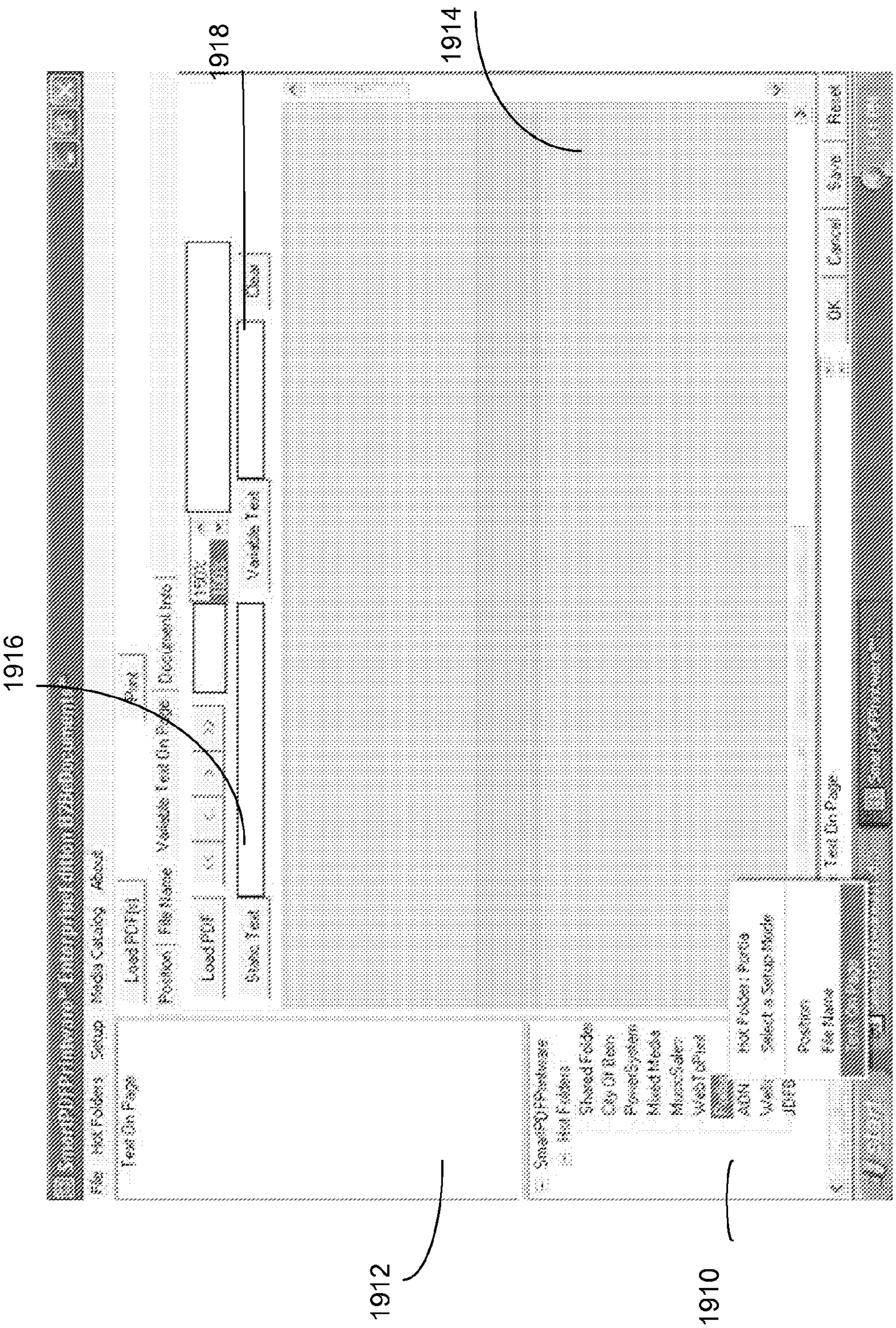
FIGS. 19A through 19F depict illustrative data screens that may be used in an exemplary system to define print rules for a print job using the values of text on pages in documents comprised in a print job.

FIG. 19A is an illustrative user interface screen used to specify printing and finishing parameters based upon the position of text on the pages in the file. The screen comprises a print job folder panel 1910 containing a hierarchical listing of print job folders. The screen further comprises a print job attributes panel 1912 for displaying the defined attributes for the print job. The print job file is displayed in file viewer area 1914. A user may specify a combination of static text and variable text to be used in identifying the beginning of logically different pages. The user's selections for static text and variable text may be displayed in text boxes 1916 and 1918 respectively.

Figure 19B:
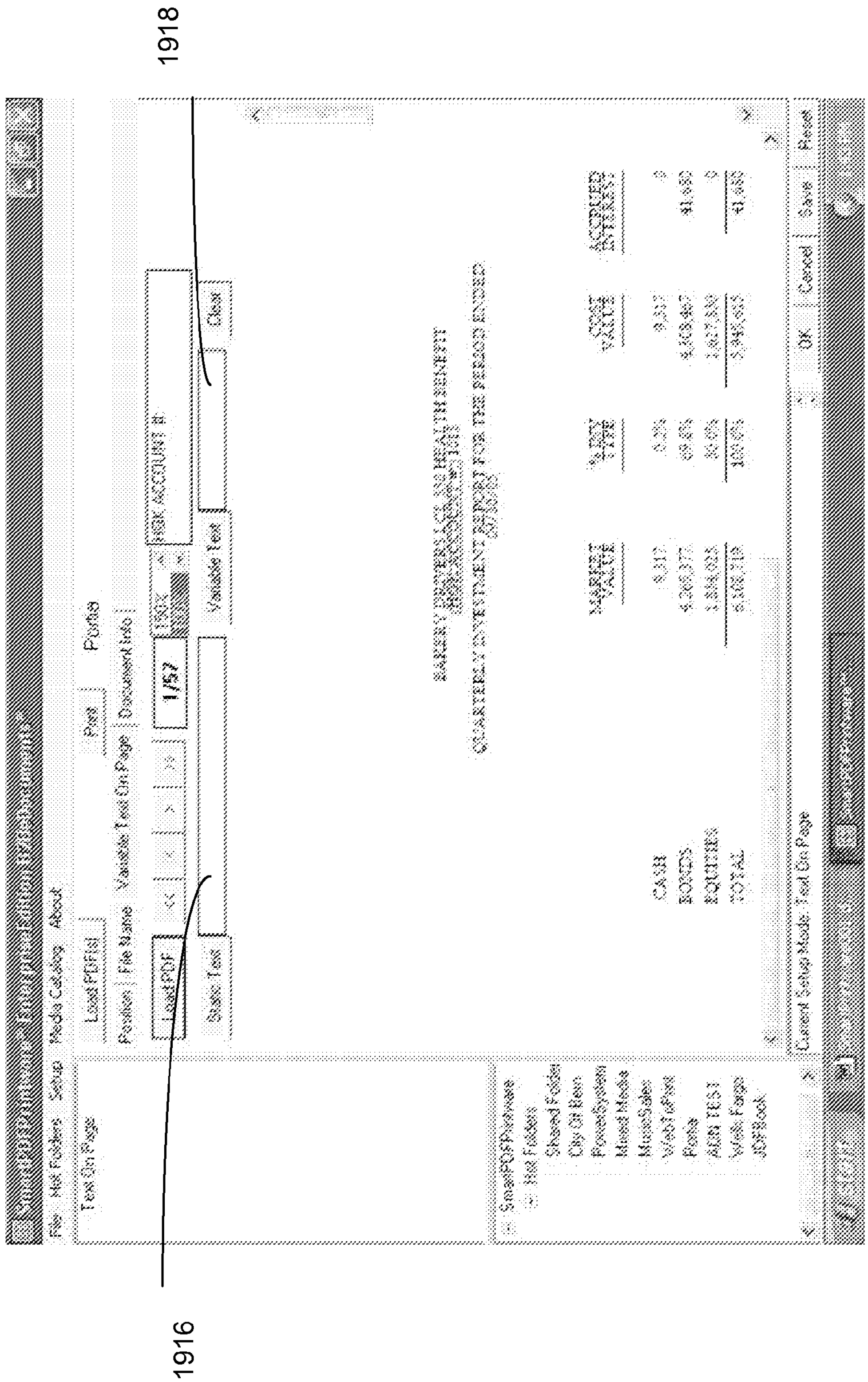
Figure 19C:
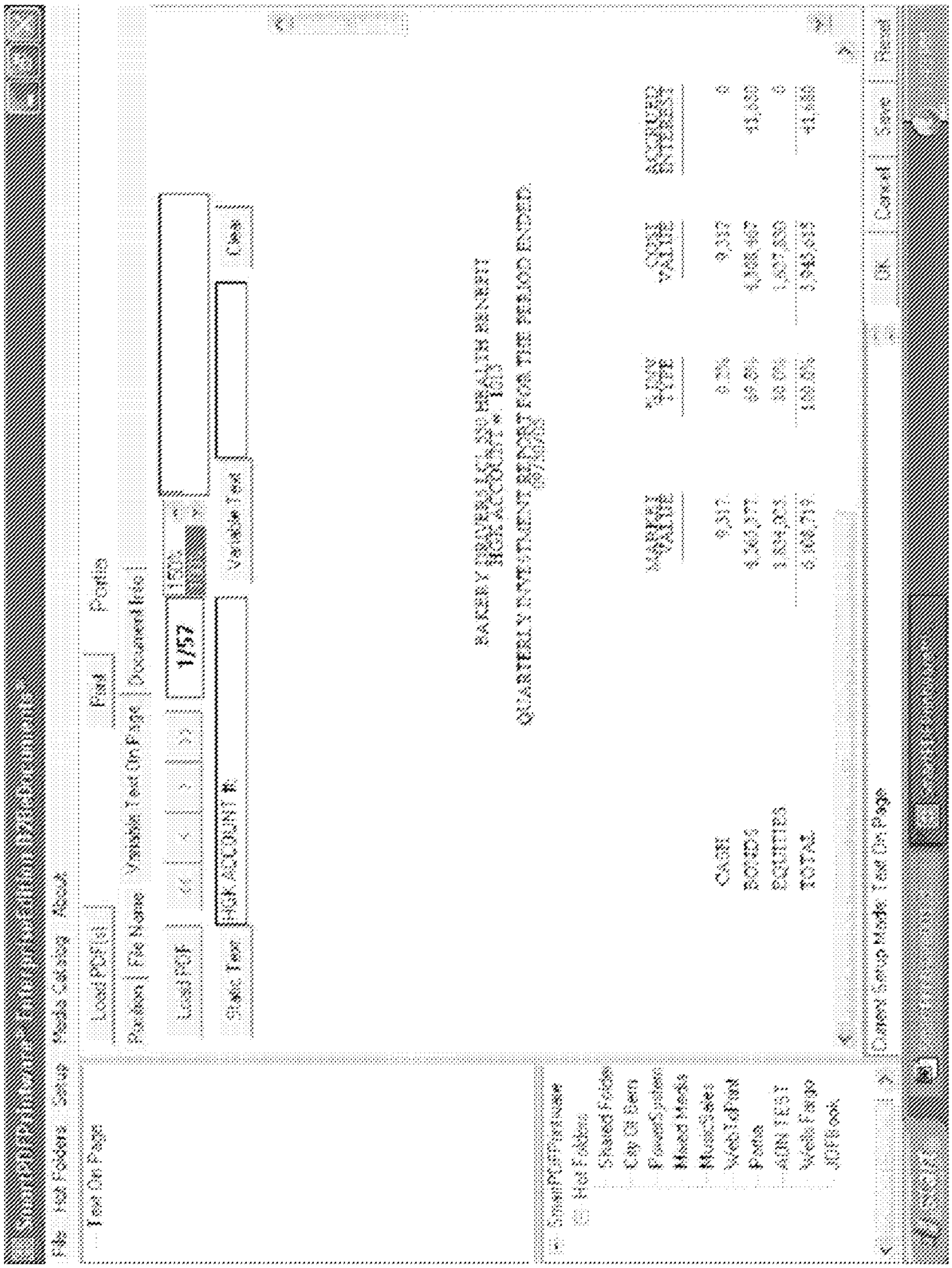

In FIG. 19B, a user has employed a pointing device to specify text located at a particular area of the displayed page. In particular, the selected text is "HGK ACCOUNT #". In this particular example, the user has selected this text and may identify it as a static text item by depressing the appropriate button next to the static text box 1916. FIG. 19C is a depiction of a screen showing the static text selection in static text box 1916. A static text item by itself is often not sufficient to distinguish between unique instances of documents. For example, in the example where a document contains a compilation of a large number of bank statements, all of which have essentially the same header information, simply identifying a static item of text in the header will not, by itself, allow for the determination of where one statement ends and the next one begins.

Figure 19D:
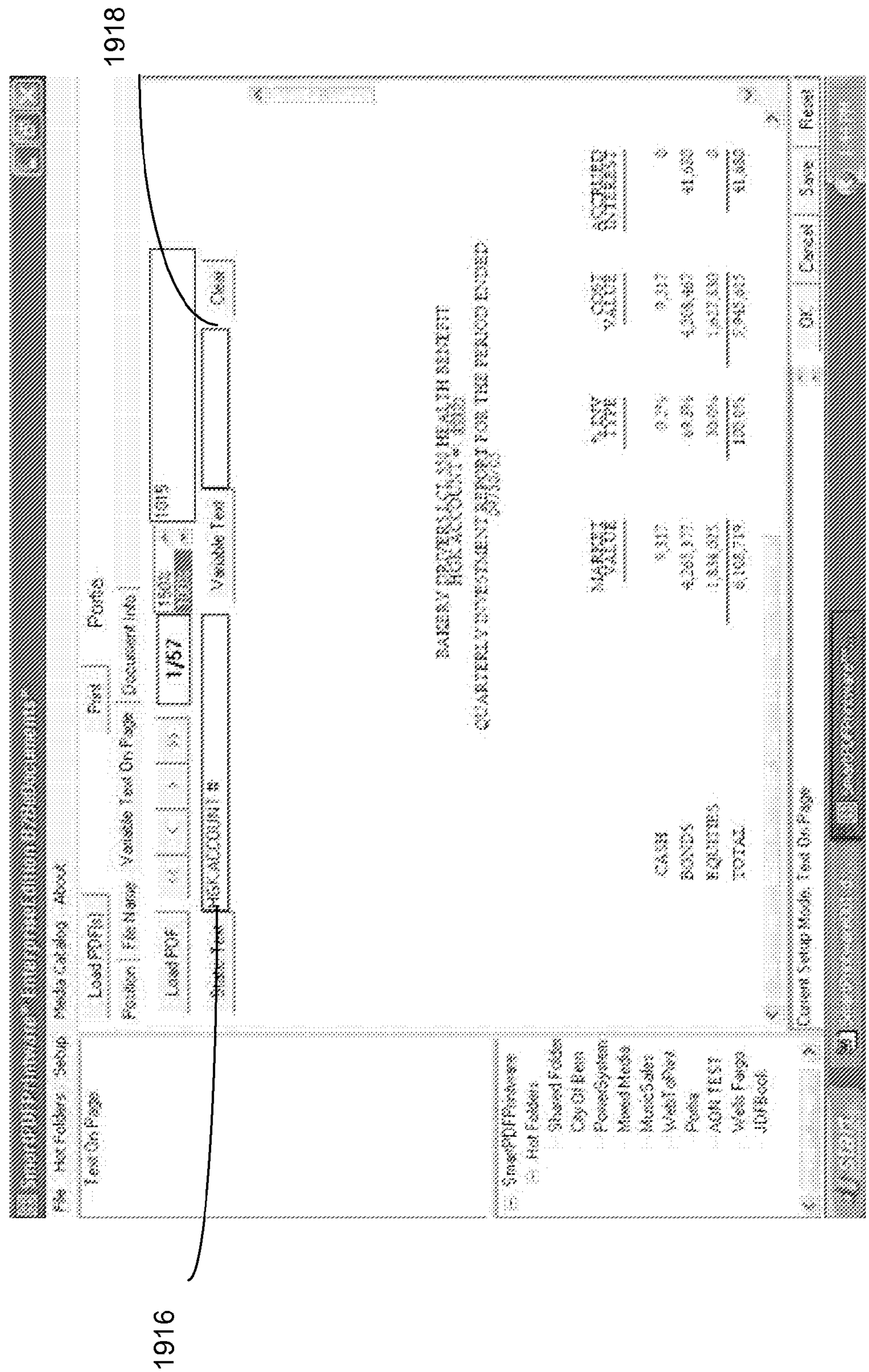
Figure 19E:
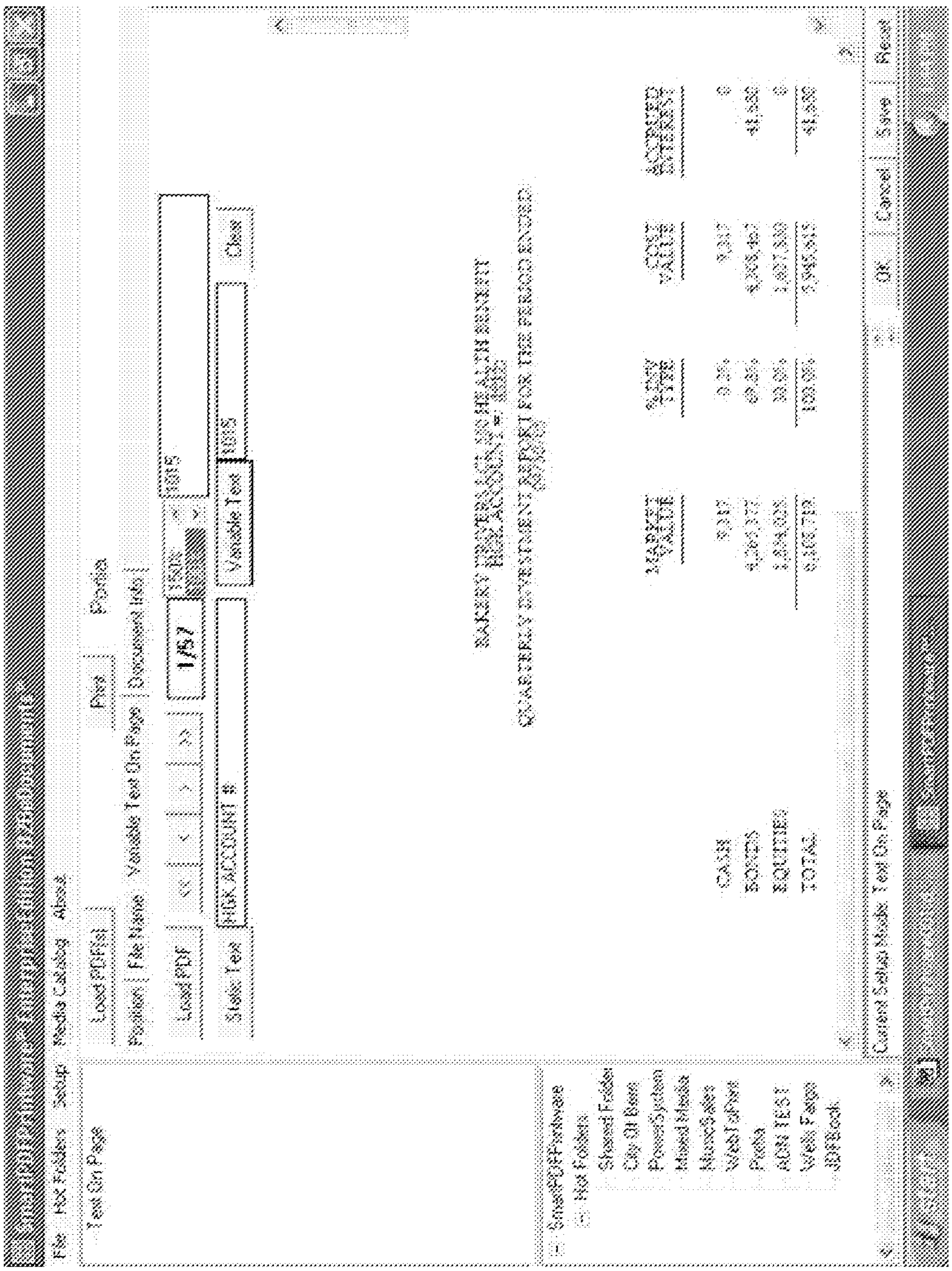
Figure 19F:
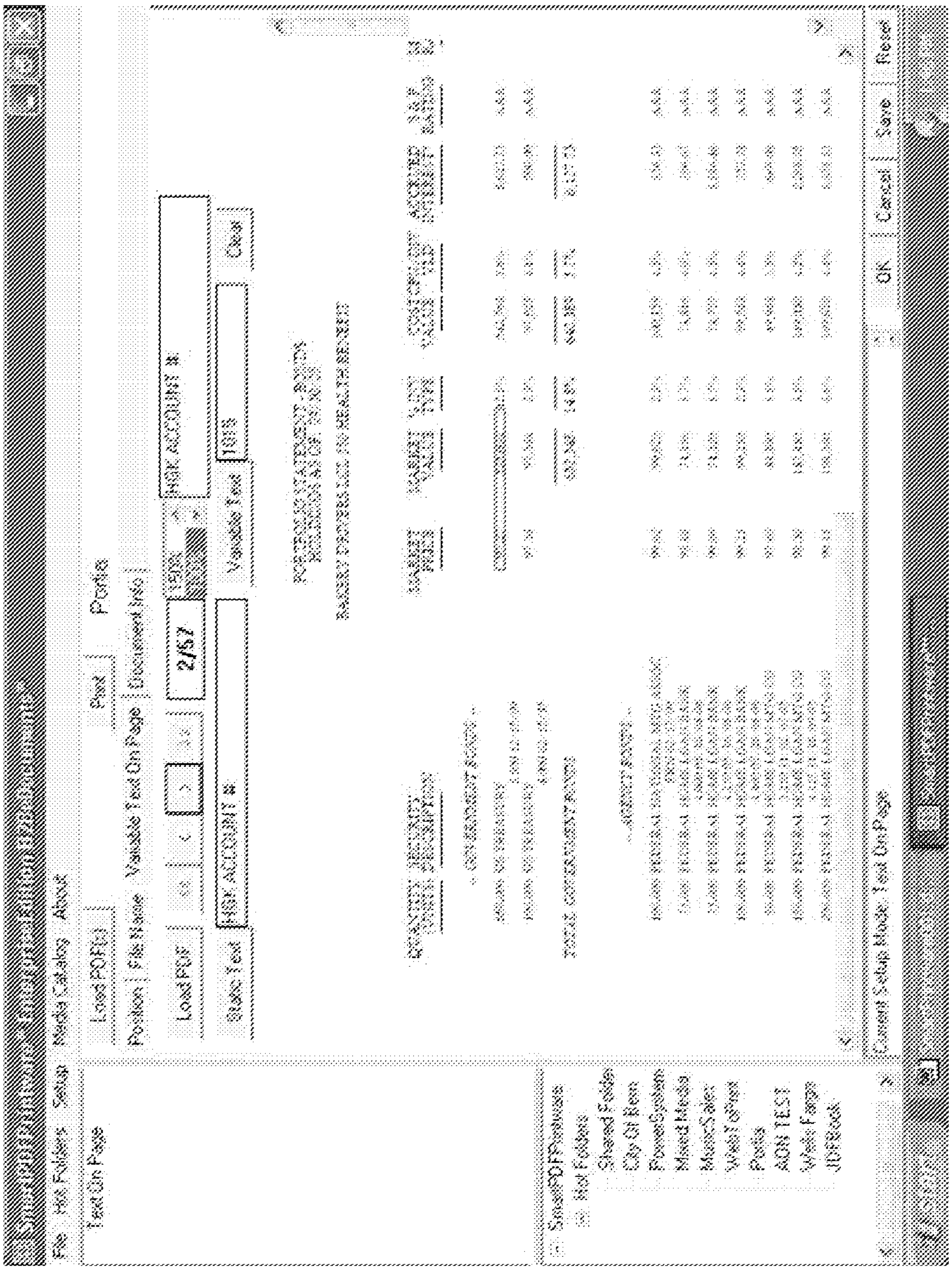

An illustrative system therefore provides that a user may specify a set of variable text, with the purpose being that the static text and variable text together will allow for distinguishing between documents. As illustrated in FIGS. 19D and 19E, the user selected the text "1015" to be the variable text portion for purposes of distinguishing between documents. It is likely that this text corresponds to the account number which logically would change from one account statement to the next. Thus, the combination of the static text and the identification of the location of the variable text will allow the illustrative system to parse the document and identify where one logical document ends and another begins Both the static and variable text and the location of the text on the pages are stored. This information is used to process each page of the file and distinguish between logically distinct documents comprised in the file. The illustrative system may be programmed to provide specialized formatting upon determination that one logical document has ended and a second has begun. For example, the illustrative system might be programmed, for example, to place each distinct document in a different envelope.

In addition to using text on the page to identify distinct documents in a file, an illustrative system may allow for using text on the page to determine media type and finishing selections such as described above. Thus, a user may specify that a particular item of text on a particular portion of a page is a signal that the media type that was defined for the document should be overridden. Alternatively, characters on the page could be identified as specifying that the document should be formatted in a particular way. Indeed, a file comprising a plurality of logically dependent documents may be printed specifically with this paradigm in mind so that text appearing in the document will specify the printing and formatting of the document similar to that discussed above in connection with the values of the fields appearing in a file name.

Similar to that described above in connection with FIG. 15C, in connection with the text-on-page method of print automation, print job rules application 310 is programmed to allow users to assign printing and finishing parameters conditioned on relative values of the text on a page. In an illustrative embodiment, a user may use the following conditional rules in the assignment of printing and finishing parameters in connection with text-on-page: if the text on the page is equal to a particular value then assign a particular print or finish parameter; if the text on the page is any other value then assign a particular print or finish parameter; use the numeric value in the text on the page to determine a particular parameter; use the text value in the text on the page to determine a particular parameter; use the same value in the text on the page to determine a particular parameter; parse the value in the text on the page to determine a particular parameter; upon receiving the static text, take a particular action; upon receiving the variable text, take a particular action. Any conditional relationships that may be established by the user are preserved in the print job rules file.

Similar to position mode and file name mode, in text-on-page mode, page sizes may be associated with a particular media. In connection with establishing printing and finishing parameters using text-on-page, page sizes found in a print job may be associated with a particular media. Thus, when a user selects to define print parameters using text-on-page, the illustrative system scans the documents in a print job folder for all unique page sizes in the documents. The unique page sizes that are identified are listed the mixed media size panel. Thereafter, a user may form associations between each page size and a particular media.

Thus, an illustrative system provides a user interface that allows the user to define printing and finishing parameters for a print job in connection with the text appearing on the pages of a documents. The system allows users to: split documents into subsets; control the sequence of printing of documents/pages in a print job; select and identify a normal media; select and identify an exception media; identify page level override of the normal media; identify finishing parameters including document level and subset level finishing; select simplex or duplex printing at the document and/or subset levels; insert tabs between pages and documents; print on tabs; insert sheets between pages and documents; insert covers at desired locations in a print job.

The printing and finishing parameters that have been specified to be derived from text appearing at a particular location on a page of a document are stored for later retrieval and use in formatting a feed for printing. In an illustrative embodiment, the rules are stored in a XML file which may be stored in a print job folder with the files that are to be printed and finished as part of the print job. The file may be referred to as the print job rules file.

An illustrative embodiment of systems and methods for defining printing and finishing parameters may further comprise a media catalogue that allows a user to assign unique, intuitive, easy to recall media names to complex media types. The user-defined names associated with a media object are stored and may be retrieved to be associated with a particular file name field or text on a page as described above. The interface to the media catalogue may comprise a hierarchical interface wherein the names of the media types can be selected from a list of media types and a new name associated with the media.

An illustrative embodiment of systems and methods for defining printing and finishing parameters may further comprise a tab catalogue that allows a user to assign a unique, intuitive tab name to precut tab media. The user-defined names associated with a tab media object are stored and may be retrieved to be associated with a particular print job. The interface to the tab catalogue may comprise a hierarchical interface wherein the names of the tab media can be selected from a list of tab media types and a new name associated with the tab media. The tab catalogue further allows users to specify text to be printed on tabs. It also allows users to specify font, point size, style, and color of text. The text printed on precut tabs can be variable or static. Variable text can be extracted from a field in the file name or from a variable trigger text in a document.

Those skilled in the art understand that computer readable instructions for performing the above described processes and presenting the above described screens can be generated and stored on a computer readable medium such as a magnetic disk or CD-ROM. Further, a computer such as that described with reference to FIG. 2 may be arranged with other similarly equipped computers in a network, and each computer may be loaded with computer readable instructions for performing the above described processes.

While the illustrative systems and methods have been described and illustrated with reference to specific embodiments, those skilled in the art will recognize that modification and variations may be made without departing from the principles of the potential embodiments. Accordingly, reference should be made to the appended claims as indicating the potential embodiments of the illustrative systems and methods.

What is claimed:

1. A computerized method for printing, comprising:

presenting on a display a graphical representation of the components of an electronic document;

receiving an input on the display identifying a rule defining how the electronic document should be printed;

storing the rule defining how the document should be printed in a file;

reading the file to identify the rule defining how the electronic document should be printed;

creating instructions for a printing system to print the electronic document using the rule defining how the electronic document should be printed.

2. A computerized method for automated printing, comprising:

identifying in an electronic document a first page having a first size and a second page having a second size;

receiving an input associating the first size and a first media;

receiving an input associating the second size and a second media;

storing an association between the first size and the first media;

storing an association between the second size and the second media; and creating instructions for printing the electronic document, said instructions comprising instructions for printing pages of the electronic document having the first size on the first media and for printing pages of the electronic document having the second size on the second media.

3. The computerized method of claim 2, wherein receiving an input associating the first size and a first media comprises receiving an identification of the features of the first media.

4. The computerized method of claim 3, wherein receiving an input associating the second size and the second media comprises receiving an input associating the second size and a media that has been designated as an exception.

5. The computerized method of claim 2, wherein receiving an input associating the second size and a second media comprises receiving an identification of the features of the second media.

6. The computerized method of claim 2, wherein receiving an input associating the first size and the first media comprises receiving an input associating the first size and a media that has been designated as normal.

7. The computerized method of claim 2, wherein creating instructions comprises creating job control language commands.

8. The computerized method of claim 7, wherein creating instructions further comprises creating page description language commands.

9. The computerized method of claim 2, further comprising:

identifying a third page having a third size;

receiving an input associating the third size and a third media; and storing an association between the third size and the third media, wherein creating instructions further comprises creating instructions for printing pages of the electronic document having the third size on the third media.

10. In a computer system having a user interface and a user interface selection device, a method for defining the rules for printing an electronic document, comprising:

identifying a plurality of page sizes of pages in an electronic document;

displaying a list of the plurality of page sizes comprised in the electronic document;

receiving an input selecting a first of the plurality of page sizes;

displaying a list of media types that may be associated with the selected first of the plurality of page sizes;

receiving an input selecting a first of the listed media types;

storing an association between the selected first of the plurality of page sizes and the selected first of the listed media types;

receiving an input selecting a second of the plurality of page sizes;

receiving an input selecting a second of the listed media types;

storing an association between the selected second of the plurality of page sizes and the selected second of the listed media types; and creating instructions for printing the electronic document, said instructions comprising instructions for printing pages of the electronic document having the first of the plurality of page sizes on the selected first of the listed media types and for printing pages of the electronic document having the second of the plurality of page sizes on the selected second of the listed media types.

11. The method of claim 10, further comprising:

receiving an input requesting to select the characteristics of the first media type;

presenting a listing of existing characteristics of the first media type;

receiving an input selecting a new characteristic for the first media type;

storing the selected new characteristic for the first media type.

12. The method of claim 10, further comprising:

receiving an input selecting a specific page comprised in the electronic document, said specific page having the first of the plurality of page sizes;

receiving an input requesting to identify a media type other than the first media type for the specific page;

receiving an input identifying a media type other than the first media type for the specific page; and storing an association between the specific page and the media type other than the first media type.

13. The method of claim 10, further comprising:

receiving an input selecting a specific page comprised in the electronic document, said specific page having the first of the plurality of page sizes;

receiving an input requesting to identify an insertion sheet for the specific page;

receiving an input identifying a media type to be inserted adjacent to the specific page;

storing an association between the specific page and the media type to be inserted adjacent to the specific page.

14. The method of claim 13, wherein receiving an input identifying a media type to be inserted adjacent to the specific page further comprises receiving an input identifying to insert a media type before the specific page.

15. The method of claim 13, wherein receiving an input identifying a media type to be inserted adjacent to the specific page further comprises receiving an input identifying to insert a media type after the specific page.

16. A computerized method of printing electronic documents, comprising:

identifying a plurality of pages comprised in an electronic document;

receiving an input identifying a first subset of the plurality of pages;

receiving an input identifying a printing option to be performed on the first subset of the plurality of pages;

storing information identifying the printing option to be performed on the first subset of the plurality of pages; and creating instructions for printing the electronic document, said instructions comprising instructions for implementing the selected printing option in connection with the first subset of the plurality of pages.

17. The method of claim 16, wherein receiving an input identifying a printing option to be performed on the first subset comprises receiving an input identifying printing the subset of the plurality of pages on a particular media type.

18. The method of claim 17, wherein receiving an input identifying printing the subset of the plurality of pages on a particular media type comprises printing the subset of the plurality of pages on a media having a selected value for at least one of the following: size, color, type, grain, weight, drilled, and paper tray.

19. The method of claim 16, wherein receiving an input identifying a printing option to be performed on the first subset comprises receiving an input identifying performing a print finishing operation on the subset of the plurality of pages.

20. The method of claim 19, wherein receiving an input identifying performing a print finishing operation on the subset of the plurality of pages comprises performing at least one of the following: stapling the subset of the plurality of pages; hole-punching the subset of the plurality of pages; folding the subset of the plurality of pages; binding the subset of the plurality of pages; and creating a booklet from the subset of the plurality of pages.

21. The method of claim 16, wherein receiving an input identifying a printing option to be performed on the first subset comprises receiving an input identifying inserting a separation sheet between the subset of the plurality of pages and adjacent pages in the electronic document.

22. The method of claim 16, wherein receiving an input identifying a printing option to be performed on the first subset comprises receiving an input identifying printing multiple copies of the subset of the plurality of pages.

23. The method of claim 22, further comprising receiving an input identifying printing at least one of the multiple copies on a media different from any other of the multiple copies.

24. The method of claim 22, further comprising receiving an input identifying printing each of the multiple copies on a different media.

25. The method of claim 22, further comprising receiving an input identifying finishing at least one of the multiple copies differently from any other of the multiple copies.

26. The method of claim 22, further comprising receiving an input identifying finishing each of the multiple copies differently.

27. The method of claim 16, wherein receiving an input identifying a printing option to be performed on the first subset comprises receiving an input identifying printing the subset of the plurality of pages using simplex printing.

28. The method of claim 16, wherein receiving an input identifying a printing option to be performed on the first subset comprises receiving an input identifying printing the subset of the plurality of pages using duplex printing.

29. The method of claim 16, wherein receiving an input identifying a printing option to be performed on the first subset of the plurality of pages comprises receiving an input identifying a printing option relating to at least one of the following: grouping documents; splitting documents into subsets; controlling the sequence of printing of documents; selecting a normal media; selecting an exception media; identifying page level override of the normal media; identifying finishing parameters for a document; identifying finishing parameters for a subset; identifying finishing parameters for a group; selecting simplex printing for a document; selecting simplex printing for a subset; selecting simplex printing for a group; inserting tabs between pages; inserting tabs between documents; printing on tabs; inserting sheets between pages; inserting sheets between documents; and inserting covers.

30. A method of controlling automated printing of electronic documents, comprising:

identifying a plurality of electronic files, each electronic file having a unique file name comprising a plurality of fields, each field comprising at least one alpha-numeric character and separated from an adjacent field by a field separation character;

displaying the file name for each of the plurality of electronic files;

receiving an input identifying the character separator employed to delineate between the plurality of fields in each of the file names of the plurality of electronic files;

for each of the plurality of electronic files, parsing the file name to identify each of the plurality of fields, identifying the at least one alpha-numeric character comprised in each of the plurality of fields, and displaying the alpha-numeric strings comprised in each field;

receiving an input identifying a first printing parameter to be controlled by the value of the at least one alpha-numeric character comprised in a first field of each file name;

receiving an input identifying a second printing parameter to be controlled by the value of the alpha-numeric character string assigned to a second field; and generating instructions for printing the plurality of files, wherein for each of the plurality of files, the value of the at least one alpha-numeric character in the first field is used to determine instructions relating to the first printing parameter and the value of the at least one alpha-numeric character in the second field is used to determine instructions relating to the second printing parameter.

31. The method of claim 30, wherein receiving an input identifying a field separator used in the file name for each of the plurality of files to separate portions of the file names comprises receiving an input identifying at least one of a space, a hyphen, a colon, a comma, a period, underscore, and a semicolon.

32. The method of claim 30, wherein receiving an input identifying a first printing parameter to be determined by the value of the alpha-numeric character comprised in a first field comprises receiving an input identifying one of the following to be determined by the value of the alphanumeric character: print sequence of a file in the plurality of files; media type on which the file will be printed; use of simplex printing; use of duplex printing; number of copies to be made of the file; and print finishing options to be used in printing the file.

33. The method of claim 30, wherein receiving an input identifying a second printing parameter to be determined by the value of the alpha-numeric character comprised in a first field comprises receiving an input identifying one of the following to be determined by the value of the alphanumeric character: print sequence of a file in the plurality of files; media type on which the file will be printed; use of simplex printing; use of duplex printing; number of copies to be made of the file; and print finishing options to be used in printing the file.

34. The method of claim 30, wherein receiving an input identifying a first printing parameter to be controlled by the value of the at least one alpha-numeric character comprised in a first field of each file name comprises receiving an input identifying a first printing parameter relating to at least one of the following: grouping and concatenating documents; splitting documents into subsets; controlling the sequence of printing of pages; controlling the sequence of documents; selecting a normal media; selecting an exception media; identifying page level override of the normal media; identifying finishing parameters; selecting simplex printing at the document level; selecting simplex printing at the group level; selecting duplex printing at the document level; selecting duplex printing at the group level; inserting tabs; printing on tabs; inserting sheets; and inserting covers.

35. A method of controlling the automated printing of electronic documents, comprising:

receiving an electronic file comprising a plurality of electronic documents;

displaying the electronic file;

receiving a first input identifying a first text item located in a first area of a first page in the file;

receiving a second input identifying the first text item as a first document delineator;

storing the first text item and the identification of the first text item as a first document delineator;

receiving a third input identifying a second text item located in a second area of the page;

receiving a fourth input identifying the second text item as a second document delineator;

storing the second text item and the identification of the second text item as a second document delineator;

identifying the first page as the beginning of a first document;

identify the first text item located in the first area of a second page in the electronic file;

confirming the existence of the second text item in the second area of the second page; and identifying the second page in the electronic file as the beginning of a second document.

36. The method of claim 35, wherein receiving a second input identifying the first text item as a first document delineator comprises receiving a second input identifying the first text item as static.

37. The method of claim 35, wherein receiving a fourth input identifying the second text item as a second document delineator comprises receiving a fourth input identifying the second text item as variable.

38. The method of claim 35, further comprising:

receiving an input identifying a third text item located in a third area; and receiving an input identifying a first printing parameter to be controlled by the value of the text in the third area of a page.

39. The method of claim 38, wherein receiving an input identifying a first printing parameter to be controlled by the value of the text in the third area of a page comprises receiving an input identifying at least one of the following to be controlled by the value of the text in the third area of a page: splitting a document into subsets; inserting covers; selecting a default media type; selecting an override media type; inserting a separation sheet; inserting tabs; inserting a slip sheet; making multiple copies.

40. The method of claim 38, wherein receiving an input identifying a first printing parameter to be controlled by the value of the text in the third area of a page comprises receiving an input identifying at least one of the following to be controlled by the value of the text in the third area of a page: splitting documents into subsets; controlling the sequence of printing; selecting a normal media; selecting an exception media; identifying page level override of the normal media; identifying finishing parameters at the document level; identifying finishing parameters at the subset level; selecting simplex printing for a document; selecting simplex printing for a subset; selecting duplex printing for a document; selecting duplex printing for a subset; inserting tabs between documents; inserting tabs between subsets; printing on tabs; insert sheets between pages; inserting sheets between documents; and inserting covers.

41. A system for automated printing, comprising:

a computing processor; and

A non-transitory computing memory communicatively coupled with the computing processor, the computing memory having stored therein computer-executable instructions that cause the system to perform operations comprising:

identifying in an electronic document a first page having a first size and a second page having a second size;

receiving an input associating the first size and a first media;

receiving an input associating the second size and a second media;

storing an association between the first size and the first media;

storing an association between the second size and the second media; and creating instructions for printing the electronic document, said instructions comprising instructions for printing pages of the electronic document having the first size on the first media and for printing pages of the electronic document having the second size on the second media.

42. The system of claim 41, wherein receiving an input associating the first size and a first media comprises receiving an identification of the features of the first media.

43. The system of claim 42, wherein receiving an input associating the second size and the second media comprises receiving an input associating the second size and a media that has been designated as an exception.

44. The system of claim 41, wherein receiving an input associating the second size and a second media comprises receiving an identification of the features of the second media.

45. The system of claim 41, wherein receiving an input associating the first size and the first media comprises receiving an input associating the first size and a media that has been designated as normal.

46. The system of claim 41, wherein creating instructions comprises creating job control language commands.

47. The system of claim 46, wherein creating instructions further comprises creating page description language commands.

48. The system of claim 41, wherein the computing memory has stored therein computer-executable instructions that when executed cause the system to perform further operations comprising:

identifying a third page having a third size;

receiving an input associating the third size and a third media; and storing an association between the third size and the third media, wherein creating instructions further comprises creating instructions for printing pages of the electronic document having the third size on the third media.

49. A computerized system for printing an electronic document, comprising:

a computing processor; and

A non-transitory computing memory communicatively coupled with the computing processor, the computing memory having stored therein computer-executable instructions that cause the system to perform operations comprising:

identifying a plurality of page sizes of pages in an electronic document;

displaying a list of the plurality of page sizes comprised in the electronic document;

receiving an input selecting a first of the plurality of page sizes;

displaying a list of media types that may be associated with the selected first of the plurality of page sizes;

receiving an input selecting a first of the listed media types;

storing an association between the selected first of the plurality of page sizes and the selected first of the listed media types;

receiving an input selecting a second of the plurality of page sizes;

receiving an input selecting a second of the listed media types;

storing an association between the selected second of the plurality of page sizes and the selected second of the listed media types; and creating instructions for printing the electronic document, said instructions comprising instructions for printing pages of the electronic document having the first of the plurality of page sizes on the selected first of the listed media types and for printing pages of the electronic document having the second of the plurality of page sizes on the selected second of the listed media types.

50. The system claim 49, wherein the computing memory has stored therein computer-executable instructions that when executed cause the system to perform further operations comprising:

receiving an input requesting to select the characteristics of the first media type;

presenting a listing of existing characteristics of the first media type;

receiving an input selecting a new characteristic for the first media type;

storing the selected new characteristic for the first media type.

51. The system of claim 49, wherein the computing memory has stored therein computer-executable instructions that when executed cause the system to perform further operations comprising:

receiving an input selecting a specific page comprised in the electronic document, said specific page having the first of the plurality of page sizes;

receiving an input requesting to identify a media type other than the first media type for the specific page;

receiving an input identifying a media type other than the first media type for the specific page; and storing an association between the specific page and the media type other than the first media type.

52. The system of claim 49, wherein the computing memory has stored therein computer-executable instructions that when executed cause the system to perform further operations comprising:

receiving an input selecting a specific page comprised in the electronic document, said specific page having the first of the plurality of page sizes;

receiving an input requesting to identify an insertion sheet for the specific page;

receiving an input identifying a media type to be inserted adjacent to the specific page;

storing an association between the specific page and the media type to be inserted adjacent to the specific page.

53. The system of claim 52, wherein receiving an input identifying a media type to be inserted adjacent to the specific page further comprises receiving an input identifying to insert a media type before the specific page.

54. The system of claim 52, wherein receiving an input identifying a media type to be inserted adjacent to the specific page further comprises receiving an input identifying to insert a media type after the specific page.

55. A system for printing electronic documents, comprising:

a computing processor; and

A non-transitory computing memory communicatively coupled with the computing processor, the computing memory having stored therein computer-executable instructions that cause the system to perform operations comprising:

identifying a plurality of pages comprised in an electronic document;

receiving an input identifying a first subset of the plurality of pages;

receiving an input identifying a printing option to be performed on the first subset of the plurality of pages;

storing information identifying the printing option to be performed on the first subset of the plurality of pages; and creating instructions for printing the electronic document, said instructions comprising instructions for implementing the selected printing option in connection with the first subset of the plurality of pages.

56. The system of claim 55, wherein receiving an input identifying a printing option to be performed on the first subset comprises receiving an input identifying printing the subset of the plurality of pages on a particular media type.

57. The system of claim 56, wherein receiving an input identifying printing the subset of the plurality of pages on a particular media type comprises printing the subset of the plurality of pages on a media having a selected value for at least one of the following: size, color, type, grain, weight, drilled, and paper tray.

58. The system of claim 55, wherein receiving an input identifying a printing option to be performed on the first subset comprises receiving an input identifying performing a print finishing operation on the subset of the plurality of pages.

59. The system of claim 58, wherein receiving an input identifying performing a print finishing operation on the subset of the plurality of pages comprises performing at least one of the following: stapling the subset of the plurality of pages; hole-punching the subset of the plurality of pages; folding the subset of the plurality of pages; binding the subset of the plurality of pages; and creating a booklet from the subset of the plurality of pages.

60. The system of claim 55, wherein receiving an input identifying a printing option to be performed on the first subset comprises receiving an input identifying inserting a separation sheet between the subset of the plurality of pages and adjacent pages in the electronic document.

61. The system of claim 55, wherein receiving an input identifying a printing option to be performed on the first subset comprises receiving an input identifying printing multiple copies of the subset of the plurality of pages.

62. The system of claim 61, wherein the computing memory has stored therein computer-executable instructions that when executed cause the system to perform further operations comprising: receiving an input identifying printing at least one of the multiple copies on a media different from any other of the multiple copies.

63. The system of claim 61, wherein the computing memory has stored therein computer-executable instructions that when executed cause the system to perform further operations comprising: receiving an input identifying printing each of the multiple copies on a different media.

64. The system of claim 61, wherein the computing memory has stored therein computer-executable instructions that when executed cause the system to perform further operations comprising: receiving an input identifying finishing at least one of the multiple copies differently from any other of the multiple copies.

65. The system of claim 61, wherein the computing memory has stored therein computer-executable instructions that when executed cause the system to perform further operations comprising: receiving an input identifying finishing each of the multiple copies differently.

66. The system of claim 55, wherein receiving an input identifying a printing option to be performed on the first subset comprises receiving an input identifying printing the subset of the plurality of pages using simplex printing.

67. The system of claim 55, wherein receiving an input identifying a printing option to be performed on the first subset comprises receiving an input identifying printing the subset of the plurality of pages using duplex printing.

68. The system of claim 55, wherein receiving an input identifying a printing option to be performed on the first subset of the plurality of pages comprises receiving an input identifying a printing option relating to at least one of the following: grouping documents; splitting documents into subsets; controlling the sequence of printing of documents; selecting a normal media; selecting an exception media; identifying page level override of the normal media; identifying finishing parameters for a document; identifying finishing parameters for a subset; identifying finishing parameters for a group; selecting simplex printing for a document; selecting simplex printing for a subset; selecting simplex printing for a group; inserting tabs between pages; inserting tabs between documents; printing on tabs; inserting sheets between pages; inserting sheets between documents; and inserting covers.

* * * * *